US008169639B2

(12) United States Patent
Aoki et al.

(10) Patent No.: US 8,169,639 B2
(45) Date of Patent: May 1, 2012

(54) COMMUNICATION SYSTEM PROVIDING SERVICES FROM A SERVER TO A CLIENT DEVICE

(75) Inventors: Kazuma Aoki, Kasugai (JP); Satoru Yanagi, Nagoya (JP); Masatoshi Kokubo, Ama-gun (JP); Makoto Matsuda, Aisai (JP); Kiyotaka Ohara, Nagoya (JP); Masafumi Miyazawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1447 days.

(21) Appl. No.: 11/267,595

(22) Filed: Nov. 7, 2005

(65) Prior Publication Data
US 2006/0143286 A1 Jun. 29, 2006

(30) Foreign Application Priority Data

| Nov. 5, 2004 | (JP) | 2004-322937 |
| Nov. 5, 2004 | (JP) | 2004-322942 |
| May 17, 2005 | (JP) | 2005-144232 |

(51) Int. Cl.
*G06F 3/12* (2006.01)
(52) U.S. Cl. .............. 358/1.15; 358/1.13; 399/8; 399/9; 399/15; 709/204; 709/205
(58) Field of Classification Search .................. 358/1.15
See application file for complete search history.

(56) References Cited

U.S. PATENT DOCUMENTS 5,909,602 A 6/1999 Nakai et al.
5,946,457 A * 8/1999 Nakai et al. ................... 358/1.13
7,056,039 B2 * 6/2006 Mokuya et al. ................ 400/76
7,292,859 B2 11/2007 Park
2001/0050782 A1 12/2001 Nitsuma et al.
2003/0117642 A1 * 6/2003 Haraguchi .................... 358/1.15
2003/0187965 A1 * 10/2003 Enomoto et al. ............. 709/221
2004/0162890 A1 * 8/2004 Ohta ............................. 709/218
2004/0190046 A1 * 9/2004 Ilda .............................. 358/1.15

(Continued)

FOREIGN PATENT DOCUMENTS
EP 0 782 326 7/1997
(Continued)

OTHER PUBLICATIONS

JP Office Action dtd Jan. 12, 2010, JP Appln. 2005-144232, English translation.

(Continued)

*Primary Examiner* — James A Thompson
*Assistant Examiner* — Benjamin O Dulaney
(74) *Attorney, Agent, or Firm* — Banner & Witcoff, Ltd.

(57) ABSTRACT

An image processing device is configured to provide a service relating to at least one of (1) the image data generated by the function of the image processing device and (2) image data representing the image to be formed, in response to a request from the image processing device. The image processing device may include a parameter designating unit, a service request unit, and a function implementation unit that is adapted to implement the function of the image processing device based on the service providing parameter designated by the parameter designating unit. The service providing device is provided with a service provision executing unit that is adapted to execute a process to provide the service to the image processing device after receiving the request from the service request unit provided to the image processing device.

16 Claims, 64 Drawing Sheets

U.S. PATENT DOCUMENTS

| | | | |
|---|---|---|---|
| 2006/0103874 A1* | 5/2006 | Aoki et al. | 358/1.15 |
| 2006/0103875 A1* | 5/2006 | Aoki et al. | 358/1.15 |
| 2006/0110171 A1* | 5/2006 | Miyazawa et al. | 399/8 |
| 2006/0114498 A1* | 6/2006 | Yanagi et al. | 358/1.15 |
| 2006/0117092 A1* | 6/2006 | Yanagi et al. | 709/217 |
| 2006/0126110 A1* | 6/2006 | Ohara et al. | 358/1.15 |
| 2006/0136566 A1* | 6/2006 | Ohara et al. | 709/217 |
| 2006/0173998 A1* | 8/2006 | Ohara | 709/224 |
| 2006/0209359 A1* | 9/2006 | Kadowaki | 358/474 |

FOREIGN PATENT DOCUMENTS

| | | |
|---|---|---|
| EP | 1041808 A2 | 10/2000 |
| EP | 1229719 A2 | 8/2002 |
| JP | 9-238215 A | 9/1997 |
| JP | 11-225239 A | 8/1999 |
| JP | 11-232058 A | 8/1999 |
| JP | 2000-069452 A | 3/2000 |
| JP | 2001-333237 A | 11/2001 |
| JP | 2003-288336 A | 10/2003 |
| JP | 2004-106518 A | 4/2004 |
| JP | 2004-220564 A | 8/2004 |
| JP | 2004-288187 A | 10/2004 |
| JP | 2004-312302 A | 11/2004 |
| WO | WO 02/08860 | 1/2002 |
| WO | WO 2004/091188 | 10/2004 |

OTHER PUBLICATIONS

EP Search Report dtd Apr. 5, 2007, EP Appln. 07000868.5-1228.
EP Search Report, Jun. 20, 2006, EP Appln. 05256869.
"Rabbit Ticker" http://www.work-at.co.jp/rabbit/, printed Aug. 23, 2005, 2 pages.
JP Office Action dtd Sep. 16, 2008, JP Appln. 2004-322942.
European Search Report based on European Patent Application No. 05256869.8.
JP Office Action dtd Nov. 30, 2010, JP Appln. 2005-144232, English Translation.

* cited by examiner

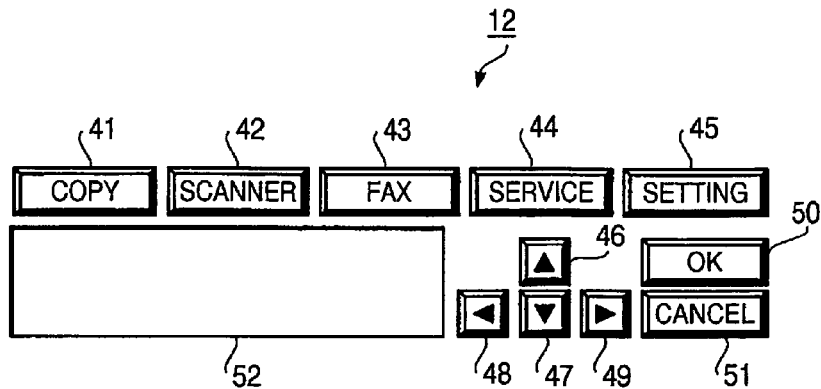

FIG. 2

| | DATA NAME | DATA TYPE | DESCRIPTION |
|---|---|---|---|
| BASIC DATA | ID | INTEGER | IDENTIFICATION INFORMATION OF SERVICE DEFINITION INFORMATION |
| | Title | CHARACTER STRING | DISPLAY TITLE |
| | Type | "MENU" OR "FORM" | BODY DATA TYPE |
| BODY DATA TYPE (WHEN TYPE IS "MENU") | Num_Link | INTEGER | THE NUMBER OF LINK DATA |
| | Link[ ] | – | ACTUAL LINK DATA (EXPLAINED LATER) |
| LINK DATA | Link_Title | CHARACTER STRING | DISPLAYED CHARACTER STRING FOR EXPLAINING SERVICE OF OR INFORMATION ON THE LINK DESTINATION |
| | Link_Location | CHARACTER STRING | URL FOR SERVICE OR ID FOR OTHER SERVICE DEFINITION INFORMATION |

FIG. 3

|  | DATA NAME | DATA TYPE | DESCRIPTION |
|---|---|---|---|
| BASIC DATA | ID | INTEGER | IDENTIFICATION INFORMATION OF SERVICE I/F INFORMATION |
|  | Title | CHARACTER STRING | DISPLAY TITLE |
|  | Type | "MENU" OR "FORM" | BODY DATA TYPE |
| BODY DATA (WHEN TYPE IS "FORM") | Action | URL CHARACTE STRING | URL OF PROGRAM FOR RECEIVING AND PROCESSING INPUT DATA |
|  | Num_Form_Elem | INTEGER | THE NUMBER OF Form_Elem |
|  | Form_Elem[ ] | – | TYPE-DEPENDENT Form ELEMENT DATA |
| Form_Elem DATA (FORM ELEMENT DATA) | Form_Type | "TEXT", OR "PASSWORD" OR "SELECT" | THE TYPE OF FORM ELEMENT |
|  | Form_Data | – | TYPE-DEPENDENT DATA |
| FORM_DATA DATA ("TEXT" OR "PASSWORD") | Disp_Name | CHARACTER STRING | CHARACTER STRING EXPLAINING INPUT ITEMS |
|  | Value_Name | CHARACTER STRING | VARIABLE NAME WHEN TRANSMITTING AS DATA |
|  | Max_Byte | INTEGER | MAXIMUM NUMBER OF BYTES OF CHARACTER STRING WHICH CAN BE INPUT |
|  | Default_String | CHARACTER STRING | CHARACTER STRING INITIALLY DISPLAYED IN INITIAL STATE |
| Form_DATA DATA (SELECT) | Disp_Name | CHARACTER STRING | CHARACTER STRING EXPLAINING INPUT ITEMS |
|  | Value_Name | CHARACTER STRING | VARIABLE NAME WHEN TRANSMITTING AS DATA |
|  | Multi_Select | 0 OR 1 | 0: MULTIPLE SELECTIONS PROHIBITED<br>1: MULTIPLE SELECTIONS ALLOWED |
|  | Num_Option | INTEGER | THE NUMBER OF SELECTION ITEMS |
|  | Option[ ] | – | INFORMATION RELATED TO SELECTION ITEMS (EXPLAINED HEREAFTER) |
| OPTION DATA | Disp_Select | CHARACTER STRING | DISPLAYED CHARACTER STRING SHOWING CHOICES |
|  | Disp_Value | CHARACTER STRING | VALUE WHEN TRANSMITTED AS DATA WHEN SELECTED |
|  | Default_Select | 0 or 1 | 0: NOT SELECTED IN INITIAL STATE<br>1: SELECTED IN INITIAL STATE |

FIG. 4

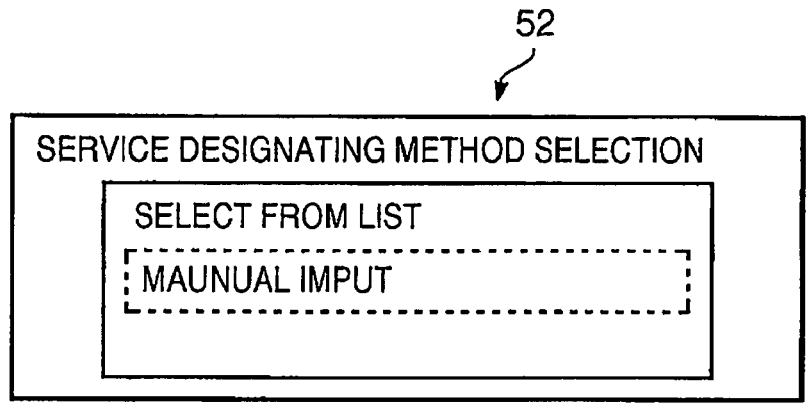

FIG. 6

```
<ID>11111110</ID>
<Title>DIRECTORY SERVICE</Title>
<Type>MENU</Type>
<Num_Link>3</Num_Link>
<Link>
 <Link_Title>DATA STORAGE SERVICE</Link_Title>
 <Link_Location>11111111</Link_Location>
</Link>
<Link>
 <Link_Title>PRINT SERVICE </Link_Title>
 <Link_Location>11111112</Link_Location>
</Link>
<Link>
 <Link_Title>COPY APPLICATION SERVICES</Link_Title>
 <Link_Location>11111113</Link_Location>
</Link>
```

FIG. 7

```
<ID>11111113</ID>
<Title>COPY APPLICATION SERVICES</Title>
<Type>MENU</Type>
<Num_Link>4</Num_Link>
<Link>
 <Link_Title>COPY WITH WATERMARK</Link_Title>
  <Link_Location>http://suk.example.co.jp/cgi_bin/suktop</Link_Location>
</Link>
<Link>
 <Link_Title>TRANSLATION COPY </Link_Title>
  <Link_Location>http://hon.example.co.jp/cgi_bin/top</Link_Location>
</Link>
<Link>
 <Link_Title>READ ALOUD</Link_Title>
  <Link_Location>http://example.yomiage.com/cgi_bin/yomi</Link_Location>
</Link>
<Link>
 <Link_Title>VOICE-TEXT CONVERSION</Link_Title>
  <Link_Location>http://ototeki.com/cgi_bin/oo</Link_Location>
</Link>
```

```
<ID>11111110</ID>
<Title>TRANSLATION COPY</Title>
<Type>FORM</Type>
<Action>
http://hon.example.co.jp/cgi_bin/service
</Action>
<Num_Form_Elem>4</Num_Form_Elem>
<Form_Elem>
  <Form_Type>Select</Form_Type>
  <Form_Data>
    <Disp_Name>LANGUAGE SELECTION</Disp_Name>
    <Value_Name>lang</Value_Name>
    <Multi_Select>0</Multi_Select>
    <Num_Option>2</Num_Option>
    <Option>
      <Disp_Select>ENGLISH→JAPANESE</Disp_Select>
      <Disp_Value>en_ja</Disp_Value>
      <Default_Select>1</Default_Select>
    </Option>
    <Option>
      <Disp_Select>JAPANESE→ENGLISH</Disp_Select>
      <Disp_Value>ja_en</Disp_Value>
      <Default_Select>0</Default_Select>
    </Option>
  </Form_Data>
</Form_Elem>
<Form_Elem>
  <Form_Type>Select</Form_Type>
  <Form_Data>
    <Disp_Name>SCANNER SETTING</Disp_Name>
    <Value_Name>scan_res</Value_Name>
    <Multi_Select>0</Multi_Select>
    <Num_Option>2</Num_Option>
    <Option>
      <Disp_Select>NORMAL FONT</Disp_Select>
      <Disp_Value>300</Disp_Value>
      <Default_Select>1</Default_Select>
    </Option>
    <Option>
      <Disp_Select>SMALL FONT</Disp_Select>
      <Disp_Value>600</Disp_Value>
      <Default_Select>0</Default_Select>
    </Option>
  </Form_Data>
</Form_Elem>
<Form_Elem>
  <Form_Type>Select</Form_Type>
  <Form_Data>
    <Disp_Name>PRINT SETTING</Disp_Name>
    <Value_Name>print_res</Value_Name>
    <Multi_Select>0</Multi_Select>
    <Num_Option>3</Num_Option>
    <Option>
      <Disp_Select>PRINT SPEED PRIORITIZED</Disp_Select>
      <Disp_Value>200</Disp_Value>
      <Default_Select>0</Default_Select>
    </Option>
    CONTINUED
    <Option>
      <Disp_Select>NORMAL</Disp_Select>
      <Disp_Value>300</Disp_Value>
      <Default_Select>1</Default_Select>
    </Option>
    <Option>
      <Disp_Select>FINE</Disp_Select>
      <Disp_Value>600</Disp_Value>
      <Default_Select>0</Default_Select>
    </Option>
  </Form_Data>
</Form_Elem>
<Form_Elem>
  <Form_Type>Text</Form_Type>
  <Form_Data>
    <Disp_Name>COMMENT</Disp_Name>
    <Value_Name>comment</Value_Name>
    <Max_Byte>100</Max_Byte>
    <Default_String>
JAPANESE TRANSLATION OF ENGLISH TECHNICAL
REPORT 0010 WITH TRANSLATION COPY SERVICE
    </Default_String>
  </Form_Data>
</Form_Elem>
```

```
<ID>11111110</ID>
<Title>TRANSLATION COPY</Title>
<Type>FORM</Type>
<Action>http://hon.exmple.co.jp/cgi_bin/
service</Action>
<Num_Form_Elem>4</Num_Form_Elem>
<Form_Elem>
  <Form_Type>Select</Form_Type>
  <Form_Data>
    <Disp_Name>LANGUAGE SELECTION</Disp_Name>
    <Value_Name>lang</Value_Name>
    <Multi_Select>0</Multi_Select>
    <Num_Option>2</Num_Option>
    <Option>
      <Disp_Select>ENGLISH → JAPANESE</Disp_Select>
      <Disp_Value>en_ja</Disp_Value>
      <Default_Select>1</Disp_Select>
    </Option>
    <Option>
      <Disp_Select>JAPANESE → ENGLISH</Disp_Select>
      <Disp_Value>ja_en</Disp_Value>
      <Default_Select>0</Disp_Select>
    </Option>
  </Disp_Name>
  </Form_Data>
</Form_Elem>

TO BE CONTINUED
```

```
CONTINUED

<Form_Elem>
  <Ferm_Type>Device</Form_Type>
  <Form_Data>
    <Divce_Type>scanner</Device_Type>
  </Form_Data>
</Form_Elem>
<FORM_Elem>
  <Form_Type>Device</Form_Type>
  <Form_Data>
    <Device_Type>printer</Device_Taype>
  </Form_Data>
</Form_Elem>
<Form_Elem>
  <Form_Type>Text</Form_Type>
  <Form_Data>
    <Disp_Name>COMMENT</Disp_Name>
    <Value_Name>comment<Value_Name>
    <Max_Byte>100</Max_Byte>
    <Default_String></Default_String>
  </Form_Data>
</Form_Elem>
```

FIG.14

```
lang=en_ja
scan res=300
print res=300
comment=
```

FIG.16

```
<Num_Device>4</Num_Device>
<Device_Info>
  <Device_Type>scanner</Device_Type>
  <Device_Spec>
    <Num_Scan_Res>3</Num_Scan_Res>
    <Scan_Res>200,200</Scan_Res>
    <Scan_Res>300,300</Scan_Res>
    <Scan_Res>600,600</Scan_Res>
  </Device_Spec>
</Device_Info>
<Device_Info>
  <Device_Type>printer</Device_Type>
  <Device_Spec>
    <Num_Print_Res>4</Num_Print_Res>
    <Print_Res>200,200</Print_Res>
    <Print_Res>300,300</Print_Res>
    <Print_Res>600,600</Print_Res>
    <Print_Res>1200,1200</Print_Res>
  </Device_Spec>
</Device_Info>

TO BE CONTINUED
```

```
CONTINUED

<Device_Info>
  <Device_Type>voice</Device_Type>
  <Device_Spec>
    <Voice_Max_Volume>10</Voice_Max_Volume>
    <Num_Voice_Frequency>2</Num_Voice_Frequency>
    <Voice_Frequency>8</Voice_Frequency>
    <VoiceFrequency>32</Voice_Frequency>
    <Num_Voice_Bit>2</Num_Voice_Bit>
    <Voice_Bit>8</Voice_Bit>
    <Voice_Bit>16</Voice_Bit>
  </Device_Spec>
</Device_Info>
<Device_Info>
  <Device_Type>speaker</Device_Type>
  <Device_Spec>
    <Speaker_Max_Volume>100</Speaker_Max_Volume>
    <Speaker_Max_Ch>2</Speaker_Max_Volume>
    <Num_Speaker_Frequency>2</Num_Speaker_Frequency>
    <Speaker_Frequency>8</Speaker_Frequency>
    <Speaker_Ferquency>44</Speaker_Frequency>
    <Num_Speaker_Bit>2</Num_Speaker_Bit>
    <Speaker_Bit>8</Speaker_Bit>
    <Speaker_Bit>16</Speaker_Bit>
  </DEVICE_Spec>
</Device_Info>
```

FIG.17

|  | DATA NAME | DATA TYPE | DESCRIPTION |
|---|---|---|---|
| BASIC DATA | Num_Device | INTEGER | THE NUMBER OF DEVICES |
|  | Device_Info[ ] | – | SPECIFICATION INFORMATION OF EACH DEVICE |
|  | Type | "MENU" OR "FORM" | BODY DATA TYPE<br>Menu:LINK LIST TO OTHER INFORMATION<br>Form:DATA INPUT FORM<br>"FORM" FOR SERVICE I/F INFORMATION |
| Device_Info | Device_Type | "scanner" OR "printer" OR "voice" OR "speaker" | DEVICE TYPE |
|  | Device_Spec[ ] | – | TYPE-DEPENDENT DEVICE INFORMATION |
| Device_Spec FOR SCANNER | Scan_Color | 0 OR 1 | 0: BLACK AND WHITE<br>1: COLOR |
|  | Num_Scan_Res | INTEGER | THE NUMBER OF TYPE OF RESOLUTION |
|  | Scan_Res[ ] | ARGUMENT(X,Y) | RESOLUTION |
| Device_Spec FOR PRINTER | Print_Color | 0 OR 1 | 0: BLACK AND WHITE<br>1: COLOR |
|  | Num_Print_Res | INTEGER | THE NUMBER OF TYPE OF RESOLUTION |
|  | Print_Res[ ] | ARGUMENT(X,Y) | RESOLUTION |
| Device_Spec FOR VOICE | Voice_Max_Volume | INTEGER | MAXIMUM VOLUME (MIN: 0) |
|  | Num_Voice_Frequency | INTEGER | THE NUMBER OF TYPES OF SAMPLING FREQUENCIES |
|  | Voice_Frequency | INTEGER ARGUMENT | SAMPLING FREQUENCY |
|  | Num_Voice_Bit | INTEGER | THE NUMBER OF TYPES OF THE NUMBER OF BITS |
|  | Voice_Bit[ ] | INTEGER ARGUMENT | THE NUMBER OF BITS |
| Device_Spec FOR SPEAKER | Speaker_Max_Volume | INTEGER | MAXIMUM VOLUME (MIN: 0) |
|  | Speaker_Max_Ch | INTEGER | THE NUMBER OF CHANNELS |
|  | Num_Speaker_Frequency | INTEGER | THE NUMBER OF TYPES OF SAMPLING FREQUENCIES |
|  | Speaker_Frequency | INTEGER ARGUMENT | SAMPLING FREQUENCY |
|  | Num_Speaker_Bit | INTEGER | THE NUMBER OF TYPES OF THE NUMBER OF BITS |
|  | Speaker_Bit[ ] | INTEGER ARGUMENT | THE NUMBER OF BITS |

FIG.18

```
<Spec_Info>
<Firmware Version>1.0<Firmware Version>
<Option_Info>
  <Option>DuplexUnit</Option>
</Option_Info>

<Num_Device>4</Num_Device>
<Device_Info>
  <Device_Type>scanner</Device_Type>
  <Device_Spec>
    <Num_Scan_Res>3</Num_Scan_Res>
    <Scan_Res>200,200</Scan_Res>
    <Scan_Res>300,300</Scan_Res>
    <Scan_Res>600,600</Scan_Res>
  </Device_Spec>
</Device_Info>
<Device_Info>
  <Device_Type>printer</Device_Type>
    <Num_Print_Res>4</Num_Print_Res>
    <Print_Res>200,200</Print_Res>
    <Print_Res>300,300</Print_Res>
    <Print_Res>600,600</Print_Res>
    <Print_Res>1200,1200</Print_Res>
  </Device_Spec>
</Device_Info>

TO BE CONTINUED
```

```
CONTINUED

<Device_Info>
  <Device_Type>voice</Device_Type>
  <Device_Spec>
    <Voice_Max_Volume>10</Voice_Max_Volume>
    <Num_Voice_Frequency>2</Num_Voice_Frequency
    <Voice_Frequency>8</Voice_Frequency>
    <VoiceFrequency>32</Voice_Frequency>
    <Num_Voice_Bit>2</Num_Voice_Bit>
    <Voice_Bit>8</Voice_Bit>
    <Voice_Bit>16</Voice_Bit>
  </Device_Spec>
</Device_Info>
<Device_Info>
  <Device_Type>speaker</Device_Type>
  <Device_Priority>2</Device_Priority>
  <Device_Spec>
    <Speaker_Max_Volume>100</Speaker_Max_Volume>
    <Speaker_Max_Ch>2</Speaker_Max_Volume>
    <Num_Speaker_Frequency>2</Num_Speaker_Frequency>
    <Speaker_Frequency>8</Speaker_Frequency>
    <Speaker_Ferquency>44</Speaker_Frequency>
    <Num_Speaker_Bit>2</Num_Speaker_Bit>
    <Speaker_Bit>8</Speaker_Bit>
    <Speaker_Bit>16</Speaker_Bit>
  </Device_Spec>
</Device_Info>
<Spec_Info>
```

FIG.35

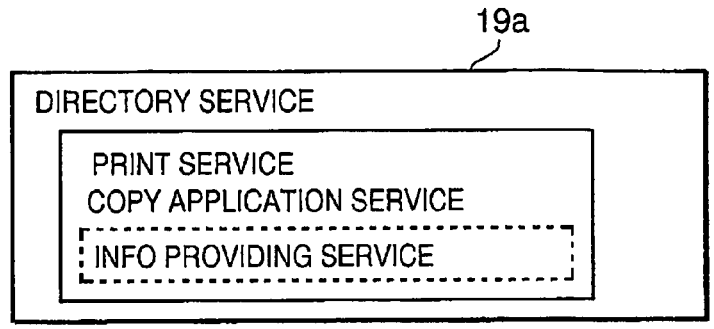

FIG.39A

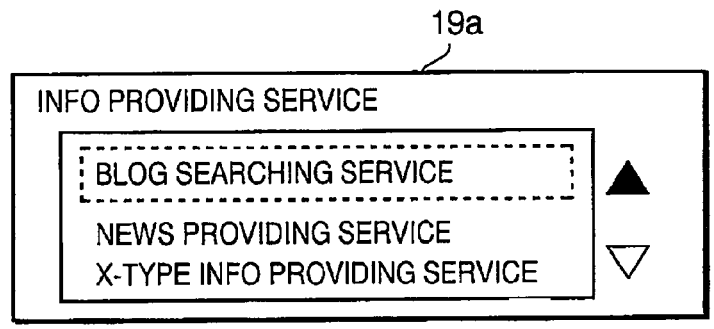

FIG.39B

```
<ID>11111110</ID>
<Title>DIRECTORY SERVICE</Title>
<Type>MENU</Type>
<Num_Link>3</Num_Link>
<Link>
  <Link_Title>PRINT SERVICE</Link_Title>
  <Link_Location>11111111</Link_Location>
</Link>
<Link>
  <Link_Title>COPY APPLICATION SERVICE</Link_Title>
  <Link_Location>11111112</Link_Location>
</Link>
<Link>
  <Link_Title>INFO PROVIDING SERVICE</Link_Title>
  <Link_Location>11111113</Link_Location>
</Link>
```

```
<ID>11111113</ID>
<Title>INFO PROVIDING SERVICE</Title>
<Type>MENU</Type>
<Num_Link>4</Num_Link>
<Link>
  <Link_Title>BLOG SEARCHING SERVICE</Link_Title>
  <Link_Location>http://aaa.*****.co.jp/cgi bin/top</Link_Location>
</Link>
<Link>
  <Link_Title>NEWS PROVIDING SERVICE</Link_Title>
  <Link_Location>http://bbb.*****.co.jp/cgi bin/top</Link_Location>
</Link>
<Link>
  <Link_Title>X-TYPE INFO PROVIDING SERVICE</Link_Title>
  <Link_Location>http://ccc.*****.co.jp/cgi bin/top</Link_Location>
</Link>
<Linh>
  <Link_Title>Y-TYPE INFO PROVIDING SERVICE</Link_Title>
  <Link_Location>http://ddd.*****.co.jp/cgi bin/top</Link_Location>
</Link>
```

```
<ID>11111110</ID>
<Title>BLOG SERACHING SERVICE</Title>
<Type>FORM</Type>
<Action>http://aaa.*****.co.jp/cgi_bin/service</Action>
<Num_Form_Elem>3</Num_Form_Elem>
<Form_Elem>
  <Form_Type>Text</Form_Typ>
  <Form_Data>
    <Disp_Name>SEARCH KEY 1</Disp_Name>
    <Value_Name>key1</Value_Name>
    <Max_Byte>100</Max_Byte>
    <Default_String></Default_String>
  </Form_Data>
</Form_Elem>
<Form_Elem>
  <Form_Type>Text</Form_Type>
  <Form_Data>
    <Disp_Name>SEARCH KEY 2</Disp_Name>
    <Value_Name>key2</Value_Name>
    <Max_Byte>100</Max_Byte>
    <Default_String></Default_String>
  </Form_Data>
</Form_Elem>
<Form_Elem>
  <Form_Type>Text</Form_Type>
  <Form_Data>
    <Disp_Name>SEARCH KEY 3</Disp_Name>
    <Value_Name>key3</Value_Name>
    <Max_Byte>100</Max_Byte>
    <Default_String></Default_String>
  </Form_Data>
</Form_Elem>
```

```
<ID>11111110</ID>
<Title>LOCAL NEWS PROVIDING SERVICE</Title>
<Type>FORM</Type>
<Action>http://bbb.*****.co.jp/cgi_bin/service</Action>
<Num_Form_Elem>3</Num_Form_Elem>
<Form_Elem>
 <Form_Type>Select</Form_Typ>
 <Form_Data>
   <Disp_Name>AREA</Disp_Name>
   <Value_Name>Address</Value_Name>
   <Multi_Select>0</Multi_Select>
   <Num_Option>8</Num_Option>
   <Option>
     <Disp_Select>HOKKAIDO</Disp_Select>
     <Disp_Value>1</Disp_Value>
     <Default_Select>1</Disp_Select>
   </Option>
   ...
   <Option>
     <Disp_Select>KANTO</Disp_Select>
     <Disp_Value>3</Disp_Value>
     <Default_Select>0</Disp_Select>
   </Option>
   <Option>
     <Disp_Select>TOKAI</Disp_Select>
     <Disp_Value>4</Disp_Value>
     <Default_Select>0</Disp_Select>
   </Option>
   ...
 </Form_Data>
</Form_Elem>
<Form_Elem>
 <Form_Type>Text</Form_Type>
 <Form_Data>
   <Disp_Name>PRE-PAID CARD NO.</Disp_Name>
   <Value_Name>PrePaid</Value_Name>
   <Max_Byte>100</Max_Byte>
   <Default_String></Default_String>
 </Form_Data>
</Form_Elem>
<Form_Elem>
 <Form_Type>Text</Form_Type>
 <Form_Data>
   <Disp_Name>THE NUMBER OF RECORDING SHEETS</Disp_Name>
   <Value_Name>NumPages</Value_Name>
   <Max_Byte>2</Max_Byte>
   <Default_String></Default_String>
 </Form_Data>
</Form_Elem>
```

(REQUEST SERVICE ID MANAGEMENT)

| REQUEST SERVICE ID | PARAMETER INFORMATION |
|---|---|
| 11111111 | key1="IT",key2="software".key3="robot" |
| 11111112 | key1="music",key2="rock".key3="" |
| 11111113 | key1="restaurant",key2="new".key3="French" |
| ... | ... |

| REQUEST SERVICE ID | PARAMETER INFORMATION |
|---|---|
| 12111111 | Address="1",Prepaid=" ✱✱✱ 1".Numpage="1" |
| 12111112 | Address="3",Prepaid=" ✱✱✱ 2".Numpage="2" |
| 12111113 | Address="4",Prepaid=" ✱✱✱ 3".Numpage="4" |
| ... | ... |

FIG.51A (REQUEST INQUIRY REPLY MANAGEMENT TABLE)

| REQUEST SERVICE ID | SERVICE START | SERVICE URL | SERVICE STATUS | SERVICE CANCEL |
|---|---|---|---|---|
| 11111111 | TRUE | http://... | 0 | FALSE |
| 11111112 | FALSE | http://... | 0 | FALSE |
| 11111113 | FALSE | http://... | 0 | FALSE |
| ... | ... | ... | ... | ... |
| 12111111 | FALSE | http://... | 0 | FALSE |
| ... | ... | ... | ... | ... |
| 13111111 | FALSE | http://... | 0 | FALSE |
| ... | ... | ... | ... | ... |
| 14111111 | FALSE | http://... | −3 | TRUE |
| ... | ... | ... | ... | ... |

(REPLY MANAGEMENT INGORMATION)

FIG.51B (REGULAR INQUIRY MANAGEMENT TABLE)

| REQUEST SERVICE ID | REQUEST STATUS | INQUIRY INTERVAL | REMAINING TIME | IMMEDIATE PROCESSING | USAGE DEVICE |
|---|---|---|---|---|---|
| 11111111 | TRUE | 3000 | 0 | FALSE | Printer |
| 11111112 | FALSE | 1800 | 0 | FALSE | Printer |
| 11111113 | FALSE | 3600 | 0 | FALSE | Printer |
| ... | ... | ... | ... | ... | ... |
| 12111111 | FALSE | 86400 | 325043 | FALSE | Scanner,Printer |
| ... | ... | ... | ... | ... | ... |
| 13111111 | FALSE | 60 | 5 | FALSE | Speaker |
| ... | ... | ... | ... | ... | ... |
| 14111111 | FALSE | 10 | 8 | TRUE | Microphone |
| ... | ... | ... | ... | ... | ... |

(INQUIRY MANAGEMENT INFORMATION)

FIG.52

(INTEGRATED INQUIRY INFO)

```
POST: https://•••/•••/•••/ HTTP/1.1
HOST: hostname
Content-Type: text/xml
Content-Length: length of content <NumRequest>2</NumRequest>
<Request_Service>
<Request_Status>FALSE</Request_Status>
<NumRequest>8</NumRequest>
<Request_Service_ID>11111111</Request_Service_ID>
<Request_Service_ID>11111113</Request_Service_ID>
<Request_Service_ID>11111114</Request_Service_ID>
<Request_Service_ID>11111115</Request_Service_ID>
(•••)
</Request_Service>
<Request_Service>
<Request_Status>TRUE</Request_Status>
<Num Service_ID>2</Num_Service_ID>
<Request_Service_ID>11111112</Request_Service_ID>
<Request_Service_ID>11111121</Request_Service_ID>
</Request_Service>
```

FIG.57

(INTEGRATED RESPONSE INFO)

```
HTTP/1.1 200 OK
Content-Type: text/xml
Content-Length: length of content

<Num_Pattern>2</Num_Pattern>
<Response_Service>
<Service_Start>TRUE</Service_Start>
<Service_URL>http://aa.brother.co.jp/bin/aa</Service_URL>
<Service_Status></Service_Status>
<Service_Canceled>FALSE</Service_Canceld>
<Num_Service_ID>1</Num_Service_ID>
<Request_Service_ID>11111111</Request_Service_ID>
</Request_Service>
<Request_Service>
<Service_Start>FALSE</Service_Start>
<Service_URL><Service_URL>
<Service_Status>0<Service_Status>
<Service_Canceled>FALSE</Service_Canceld>
<Num_Servuce_ID>2</Num_Servuce_ID>
<Request_Service_ID>11111112</Request_Service_ID>
<Request_Service_ID>11111121</Request_Service_ID>
</Request_Service>
```

FIG.61

```
POST: https://•••/•••/•••/ HTTP/1.1
HOST: hostname
Content-Type: text/xml
Content-Length: length of content <NumRequest>3</NumRequest>
<Request_Service>
<Request_Service_ID>11111111</Request_Service>
<Request_Service>FALSE</Request_Service>
</Request_Service>
<Request_Service>
<Request_Service_ID>11111112</Request_Service>
<Request_Service>TRUE</Request_Service>
</Request_Service>
<Request_Service>
<Request_Service_ID>11111112</Request_Service>
<Request_Service>FALSE</Request_Service>
</Request_Service>
```

FIG.68

```
HTTP/1.1 200 OK
Content-Type: text/xml
Content-Length: length of content

<NumRequest>3</NumRequest>
<Request_Service>
<Request_Service_ID>11111111</Request_Service_ID>
<Service_Start>TRUE</Service_Start>
<Service_URL>http://aa.*****.co.jp/bin/aa</Service_URL>
<Service_Status></Service_Status>
<Service_Canceled>FALSE</Service_Canceld>
</Request_Service>
<Request_Service>
<Request_Service_ID>11111112</Request_Service_ID>
<Service_Start>FALSE</Service_Start>
<Service_URL><Service_URL>
<Service_Status>0<Service_Status>
<Service_Canceled>FALSE</Service_Canceld>
</Request_Service>
<Request_Service>
<Request_Service_ID>11111112</Request_Service_ID>
<Service_Start>FALSE</Service_Start>
<Service_URL><Service_URL>
<Service_Status>0<Service_Status>
<Service_Canceled>FALSE</Service_Canceld>
</Request_Service>
```

FIG.69

COMMUNICATION SYSTEM PROVIDING SERVICES FROM A SERVER TO A CLIENT DEVICE

CROSS REFERENCE TO RELATED APPLICATIONS

This application claims priority from Japanese Patent Applications No. 2004-322937 and No. 2004-322942, both filed on Nov. 5, 2004, and No. 2005-144232, filed on May 17, 2005. The entire subject matters of the applications are incorporated herein by reference.

TECHNICAL FIELD

Aspects of the invention relate to a communication device including a server configured to provide services, and a client device that receives the services provided by the server. Aspects of the invention also relate to the server and the client device constituting a communication system. Aspects of the invention also relate particularly to an image processing system including an image processing device and a server constituting the image processing system.

BACKGROUND

Conventionally, a communication system configured as follows has been known. The communication system is configured with a server that transmits data regarding services that the server can provide to a client in response to a request for such data from the client. Then, data is transmitted from the client to the server that has been generated by the client based on the data regarding the services. Then, the server processes the transmitted data subject to the service, thereby providing the service.

An example of conventionally known techniques can be found at a web site entitled "RSS Reader Rabbit Ticker" at <http://www.work-at.cojp> (the site exists as of Oct. 20, 2004). In this site, a client device is disclosed that periodically transmits inquiries to the server for news information. When there is news information, a client can access the server to obtain the news information.

Another example can be found in Japanese Patent Provisional Publication No. HEI 9-238215 (hereinafter, referred to as '215 publication). According to the '215 publication, there are a digital copier and a host computer, both connected to a network. A function that is not implemented in the digital copier is implemented in the host computer. According to the '215 publication, control command codes and/or image data such as image density data is transmitted, through the network, from the digital copier to the host computer. Then, the host computer analyzes the received control commands, and then applies image processing to the received image data using a function designated by the received (and analyzed) command codes. The image data thus processed is then transmitted from the host computer to the digital copier through the network. The digital copier then prints the thus received processed image data. As a result, the digital copier utilizes the service provided by the host computer for processing the image data.

Further, in the system disclosed in '215 publication, when new functions are implemented in the host computer, information regarding the new functions is transmitted from the host computer to the digital copier. Then, the user can select, from among the new functions, only the functions that the user intends to register with the copier.

However, the system disclosed in '215 publication is not applicable to an environment where the services to be provided are increased/decreased irregularly. That is, according to such a system, when a new function is added to the host computer, it can be used only when the function is registered with the digital copier. However, as with a server on the Internet, if a variety of services are frequently and irregularly increased/decreased, a registration operation to the digital copier is very troublesome and the amount of such information is considerably large. Therefore, the technique disclosed in the '215 publication may not be suitable for a system utilizing the Internet.

Incidentally, the service providing system as described above is typically configured such that the digital copier, or a client, which is connected with a LAN (Local Area Network), and the LAN is connected to a WAN (Wide Area Network) such as the Internet through a router. The router is used for improving network traffic efficiency, and for strengthening security of the system. In such a network employing a router, unnecessary packets will not go out of the LAN, and unnecessary packets will not come in the LAN from outside.

Generally, according to the above configuration, the LAN accepts data which is transmitted as a response to a request that has been transmitted from a device inside the LAN. In such a network, it is impossible to receive data which has been positively transmitted from a server outside the LAN without a request from a device inside the LAN. That is, to any device of a network that is connected to the WAN (e.g., the Internet) through a router, the server on the WAN cannot positively provide a service.

Thus, when there is a service the server can provide to the client connected to the LAN, a system employing a polling communication may be usable. Such a system may be very effective particularly when new services are constantly provided to the client.

However, in such a system, if the number of the services to be provided by the server increases and/or when the number of clients increases, the amount of data to be transmitted using the polling communication (the amount of inquiry data) increases, which increases the network traffic. Further, since access by the client increases, a relatively large burden may be applied to the server.

SUMMARY

Aspects of the invention provide a configuration of the network system in which inquiries are received from the client service registration system through which the user can submit a registration application for services to be used by a peripheral device using a terminal device having a sufficient user interface. In such aspects, it becomes possible that the peripheral device can also use the service provided by the server.

Aspects of the invention also provide a communication system that is configured such that the client can transmit inquiry data to the server more effectively.

BRIEF DESCRIPTION OF THE ACCOMPANYING DRAWINGS

FIG. 2 shows a configuration of an operation unit according to aspects of the invention.

FIG. 3 shows a table providing a definition of each tag in the service definition information according to aspects of the invention.

FIG. 4 shows a table indicating the definition of each tag in a service I/F information according to aspects of the invention.

FIG. 6 is a flowchart illustrating a method selection window in a directory server process according to aspects of the invention.

FIG. 7 shows a data configuration of service definition information.

FIG. 9 shows another example of a service definition information data according to aspects of the invention.

FIG. 13 shows an example of service I/F information in which parameters have been set.

FIG. 14 shows an example of the service I/F information before the parameters have been set.

FIG. 16 shows a data structure of transmission data.

FIG. 17 shows a data structure of specification data according to aspects of the first embodiment.

FIG. 18 shows tag definition according to aspects of the first embodiment.

FIG. 35 shows a data structure of the specification data according to the second embodiment.

FIGS. 39A and 39B show examples of service selection windows.

FIG. 40 shows a top item of service definition information according to aspects of the invention.

FIG. 41 shows an item lower than the top item of the service definition information according to aspects of the invention.

FIG. 43 shows a data configuration of the service I/F information according to aspects of the invention.

FIG. 44 shows another data configuration of the service I/F information according to aspects of the invention.

FIG. 51A shows examples of request service ID management tables stored in the storage area.

FIG. 51B shows an example of a regular inquiry reply management table according the third embodiment.

FIG. 52 shows an example of a regular inquiry management table according to the third embodiment.

FIG. 57 shows an exemplary configuration of the integrated inquiry information according to the third embodiment.

FIG. 61 shows an exemplary configuration of the integrated reply information.

FIG. 68 shows an exemplary configuration of integrated inquiry information according to a modification of the third embodiment.

FIG. 69 shows an exemplary configuration of integrated reply information according to the modification of the third embodiment.

DETAILED DESCRIPTION

General Overview

Figure 1:
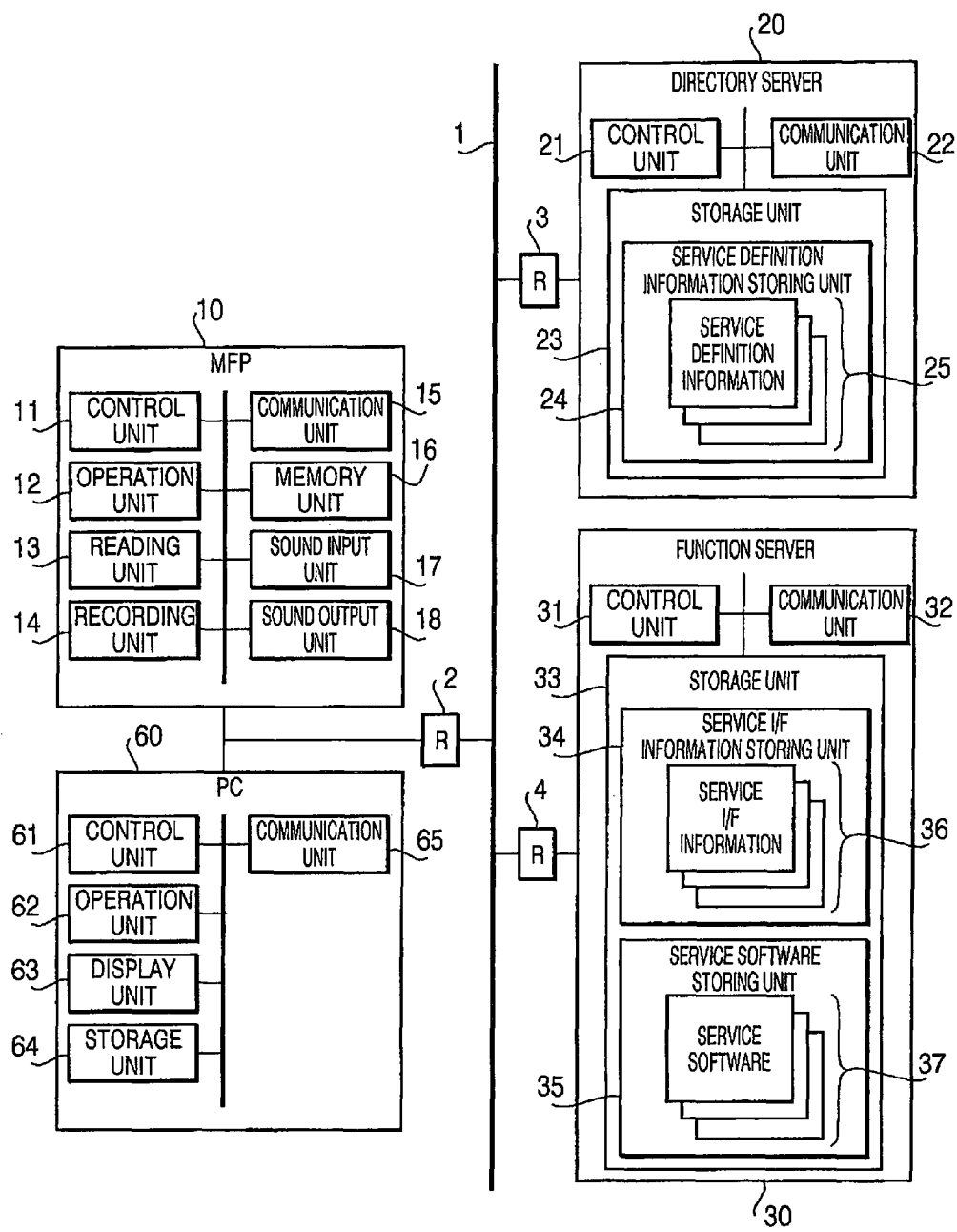
FIG. 1 is a block diagram showing a configuration of an image processing system according to aspects of a first embodiment of the invention.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, Flash memory, EEPROMs, CD-media, DVD-media, temporary storage, hard disk drives, floppy drives, permanent storage, and the like.

According to aspects of the invention, there is provided an image processing system including an image processing device having at least one of an image reading function to scan an image and generate image data representing the image and an image forming function to form an image represented by image data, and a service providing device adapted to provide a service in response to a request from the image processing device, the service relating to at least one of the image data generated by the function of the image processing device and image data representing the image to be formed.

The image processing device may include a parameter designating unit that is adapted to allow a user to designate a function parameter as a service providing parameter, which is required for receiving a service from the service providing device, among function parameters depending on functions provided to the image processing device, a service request unit that is adapted to request the service providing device for a service, and a function implementation unit that is adapted to implement the function of the image processing device based on the service providing parameter designated by the parameter designating unit.

The service providing device may be provided with a service provision executing unit that is adapted to execute a process to provide the service to the image processing device after receiving the request from the service request unit.

The image processing device may be provided with a designation request unit, which is adapted to request the image processing device to designate the service providing parameter. Further, the parameter designating unit may be adapted to allow the user to designate the function parameter as the service providing parameter depending on the functions provided to the image processing device when the designation request unit of the service providing device requests the parameter designating unit to designate the service providing parameter.

The parameter designating unit may be adapted to display on a display unit of the image processing device a parameter list that includes registered function parameters concerning the functions provided to the image processing device when the designation request unit of the service providing device requests the parameter designating unit to designate the function parameter, and allow the user to designate the function parameter, which is to be the service providing parameter, among the function parameters registered in the parameter list.

The service providing device may be provided with a first list generating unit, which is adapted to generate the parameter list, the designation request unit being adapted to transmit a designation request command for the service providing parameter to the image processing device along with the parameter list generated by the first list generating unit. Further, the parameter designating unit may be adapted to display the parameter list on the display unit when the parameter designating unit receives the designation request command and the parameter list from the designation request unit, and to allow the user to designate the function parameter, which is to be the service providing parameter, among the function parameters registered in the parameter list.

The service providing device is provided with a device-side setting notification unit, which is adapted to notify the image processing system of a settable parameter, the service providing device is provided with a service-end parameter storage unit, which is adapted to store in a storage unit the settable parameter corresponding to the image processing device, the first list generating unit is adapted to generate a parameter list wherein the function parameter is designated based on the settable parameter corresponding to the image processing device.

The service providing device may be provided with a first notification request unit, which is adapted to request the image processing device to indicate a settable parameter that is to designate the function parameter concerning the function provided to the image processing device, the settable parameter being designated to the function provided to the image processing device. Further, the first list generating unit may be adapted to generate a parameter wherein the function parameter is registered, the function parameter being designated by the settable parameter, which is indicated by the image processing system as being requested by the first notification request unit.

The image processing device may be provided with a device-side setting notification unit, which is adapted to indicate the settable parameter to the service providing device, and the parameter designating unit may be adapted to display the parameter list on the display unit when the parameter designating unit receives the designation request command and the parameter list transmitted from the designation request unit.

The image processing system may further include an information managing unit, which is adapted to store the settable parameter in a storage unit, and at least one of the service providing devices. The service providing device may be provided with a second notification request unit, which is adapted to request the information managing unit to indicate the settable parameter of the image processing device. Further, the first list generating unit may be adapted to generate a parameter list wherein the function parameter is registered, the function parameter being designated by the settable parameter, which is indicated by the image managing unit as being requested by the second notification request unit, and the information managing unit may be provided with a manager-side setting notification unit, which is adapted to indicate the settable parameter to the service providing device in accordance with a request from the service providing device.

The image processing system may further include a device-side setting notification unit, which is adapted to indicate a settable parameter settable to the image processing system to the information managing unit. The information managing unit may be provided with a manager-side parameter storage unit, which is adapted to store the settable parameter corresponding to the image processing device, and the manager-side parameter storage unit may be adapted to indicate the settable parameter stored in the manager-side parameter storage unit, the settable parameter corresponding to the image processing device to provide the service to the service providing device in accordance with the request from the service providing device.

The device-side setting notification unit may be adapted to indicate the settable parameter in a predetermined timing after the image processing device is activated.

The device-side setting notification unit may be adapted to indicate the settable parameter to the service providing device when the settable parameter settable to the image processing device is modified.

The device-side setting notification unit may be adapted to indicate the settable parameter to the service providing device when the image processing device is activated.

The image processing device may be provided with a second list generating unit, which is adapted to generate a parameter list that includes registered function parameters concerning the functions provided to the image processing device when the designation request unit of the service providing device requests the image processing device to designate the service providing parameter. Further, the parameter designation system may be adapted to display the parameter list generated by the second list generating unit on the display unit of the image processing device, and allow the user to designate the function parameter, which is to be the service providing parameter, among the function parameters registered in the parameter list.

The parameter list may be generated by registering the function parameter concerning the functions provided to the image processing device to a format list. Further, the designation request unit may be adapted to transmit to the image processing device a designation request command for the service providing parameter, along with the format list and listing information indicating a registering method of the function parameter to the format list, and the second list generating unit may be adapted to generate the parameter list based on the format list and the registered method when the second list generating unit receives the designation request command from the designation request unit.

The function parameter may be at least one of: (1) a parameter corresponding to the reading function, the function parameter being adapted to include at least one of a resolution of the image forming function and a number of colors of the reading function; and (2) a parameter corresponding to the image forming function, the function parameter being adapted to include at least one of a resolution of the image forming function and a number of colors of the image forming function.

An image processing device, may include at least one of a reading function to capture an image and generate image data representing the image and an image forming function to form an image represented by image data. A parameter designation unit is adapted to allow a user to designate a function parameter as a service providing parameter, which is required for receiving a service from a server, the server providing the service concerning at least one of image data generated by a function provided to the image processing device and image data representing an image to be formed, among function parameters depending on functions provided to the image processing device. Further, a service request unit may be adapted to request the server for the service, and a function implementation unit is adapted to implement the function of the image processing device based on the service providing parameter designated by the parameter designating unit when the service is being provided by the server being requested from the service request unit.

Aspects of the invention may provide a server, which may further include a first list generating unit, which is adapted to generate a parameter list that includes registered function parameters concerning the functions provided to an image processing device, a designation request unit, which is adapted to transmit a designation request command for a service providing parameter to be designated to the image processing device along with the parameter list generated by the first list generating unit, the service providing parameter for receiving the service from the server, and a service provision executing unit, which is adapted to execute a process to provide the service to the image processing device by implementing the function provided to the image processing device based on the designation request command and the service providing parameter designated by a user among the function parameters in the parameter list.

Aspects of the invention may provide a computer program product comprising computer-readable instructions that cause a computer system to execute processes to function as an image processing system. The image processing system may include an image processing device having at least one of a reading function to capture an image and generate image data representing the image and an image forming function to form an image represented by image data, and a service providing device adapted to provide a service concerning at least one of the image data generated by the function provided to the image processing device and the image data representing the image to be formed in response to a request from the image processing device. The image processing device may include a parameter designating unit that is adapted to allow a user to designate a function parameter as a service providing parameter for receiving the service from the service providing device, among function parameters depending on functions provided to the image processing device, a service request unit that is adapted to request the service providing device for the service, and a function implementation unit that is adapted to implement the function of the image processing device based on the service providing parameter designated by the parameter designating unit. The service providing device may be provided with a service provision executing unit that is adapted to execute a process to provide the service to the image processing device after receiving the request from the service request unit.

According to aspects of the invention, there is provided a computer program product comprising computer-readable instructions that cause a computer system to execute processes to function as an image processing device, which includes at least one of a reading function to capture an image and generate image data representing the image and an image forming function to form an image represented by image data. A parameter designation unit may be adapted to allow a user to designate a function parameter as a service providing parameter, which is required for receiving a service from a server, the server providing the service concerning at least one of image data generated by a function provided to the image processing device and image data representing an image to be formed, among a plurality of function parameters depending on functions provided to the image processing device. Further, a service request unit may be adapted to request the server for the service, and a function implementation unit may be adapted to implement the function of the image processing device based on the service providing parameter designated by the parameter designating unit when the service is being provided by the server being requested from the service request unit.

Aspects of the invention may provide a computer program product comprising computer-readable instructions that cause a computer system to execute processes to function as a server. The server may include a first list generating unit, which is adapted to generate a parameter list that includes registered function parameters concerning the functions provided to a image processing device, a designation request unit, which is adapted to transmit a designation request command for a service providing parameter to be designated to the image processing device along with the parameter list generated by the first list generating unit, the service providing parameter for receiving the service from the server, and a service provision executing unit, which is adapted to execute a process to provide the service to the image processing device by implementing the function provided to the image processing device based on the designation request command and the service providing parameter designated by a user among the function parameters in the parameter list.

According to aspects of the invention, there is provided a communication system, which includes a server that is adapted to provide types of services, and a client device that is adapted to have a communication unit to communicate with the server and to receive the services provided by the server by communicating with the server. The server may be provided with a receiving unit, which is adapted to receive an inquiry signal concerning the services transmitted from the client device, and a replying unit, which is adapted to generate reply information concerning a service when the receiving unit receives the inquiry signal and to transmit a response signal including reply information to the client device, based on identifying information included in the inquiry signal. The client device may include a storage unit, in which information indicating timing to inquire for each service to be received by the client device among the services provided by the server is stored, a timing judging unit, which is adapted to judge when an appropriate timing to transmit the inquiry signal for each service occurs based on the information indicating the timing to inquire for each service, an inquiring unit, which is adapted to generate the inquiry signal, the inquiry signal storing the identifying information of the service that is determined to be at the appropriate timing for transmitting the inquiry signal and to transmit the inquiry signal to the server, and a receiving unit adapted to receive the response signal transmitted from the server to the client device in response to the inquiry signal. The inquiring unit may be adapted to generate converged inquiry information as the identifying information of the service to be inquired when services are determined to be at the appropriate timing for transmitting the inquiry signals, the converged inquiry information collectively describing the identifying information of the services and to transmit the inquiry signal including the converged inquiry signal to the server.

The storage unit may be adapted to store inquiry timing information, which indicates a next time to inquire for each service and immediate inquiry information, which indicates necessity of an immediate inquiry. The timing judging unit may include a first judging unit, which is adapted to judge when an inquiry time to inquire the server for each service based on the inquiry timing information, a second judging unit, which is adapted to judge whether the immediate inquiry is required for each service provided from the server based on the immediate inquiry information, and a third judging unit, which is adapted to judge whether a predetermined extension period to transmit the inquiry signal to the server has expired The communication system may determine the appropriate timing for transmitting the inquiry signal to the server for all the services provided by the server to the client device has not occurred, in at least one of cases when the first judging unit has judged that no service is at the appropriate timing for transmitting the inquiry signal to the server, and when the second judging unit has judged that no service is required for the immediate inquiry and the predetermined extension period is in process, and the communication system may determine that the appropriate timing for transmitting the inquiry signal to the server for all the services provided by the server to the client device has occurred, in at least one of cases when the first judging unit has judged that a service is at the appropriate timing for transmitting the inquiry signal to the server and the second judging unit has judged that a service is required for the immediate inquiry, and the predetermined extension period to transmit the inquiry signal to the server is judged to be expired.

The storage unit may be adapted to store a value for a parameter indicating a content of the inquiry associated with the inquiry time of the service provided by the server, and the inquiring unit may be adapted to store the value of the parameter stored in the storage unit associated with the identifying information of the service to be inquired along with the identifying information.

The inquiring unit may be adapted to generate the converged inquiry information in which identifying information of the services to be inquired is described based on the identifying information of a group of services, each of which includes an identical value for the parameter stored in the storage unit and the group of the identifying information with the identical value of the parameter associated with the value of the parameter is described, when services are determined to be at the appropriate timing for transmitting the inquiry signals.

The client device including input/output units excluding the communication unit may be adapted to receive the service from the server by utilizing the communication unit and at least one of the types of input/output units, and the inquiring unit may be provided with a device operation judging unit, which is adapted to judge whether the at least one of the input/output units is required to be driven to receive the service for each service that is judged to be at the appropriate timing for transmitting the inquiry signal by the timing judging unit. Further, the inquiring unit may be adapted to selectively include the identifying information of the service wherein the input/output units to receive the service are motionless to the inquiry signal as the identifying information of the service to be inquired, and to transmit the inquiry signal to the server when a service that is determined to be at the appropriate timing for transmitting the inquiry signals based on a result from the device operation judging unit exists, and the input/output units required to be driven to receive the service are motionless.

The replying unit may be adapted to judge whether the server is ready to provide the service inquired by the client device, to generate reply information when the server is determined to be ready, and to include the reply information in a response signal. Further, the client device may be provided with a readiness judging unit, which is adapted to judge, based on the response signal from the replying unit, whether the service indicated in the reply information in the response signal is the service that is ready to be provided by the server. Further, the client device may be adapted to execute a process required to receive the service, which is judged to be ready by the readiness judging unit, when the server judges the service is ready to be provided.

The replying unit may be adapted to generate converged reply information, which collectively describes the reply information of services to be inquired when the inquiry signal received by the receiving unit of the server includes identifying information of the services as the identifying information of the service to be inquired, and to transmit a response signal including the converged reply information to the client device that transmitted the inquiry signal.

The converged reply information may include reply information of each service of the services to be inquired, which is associated with identifying information of each of the services to be inquired corresponding to the reply information.

The replying unit may be adapted to generate the converged reply information in which identifying information of the services to be inquired is described based on the identifying information of a group of services, each of which includes identical reply information and the group of the identifying information with the identical reply information associated with the reply information being described, when identifying information of services is included as the identifying information of the service to be inquired in the inquiry signal received by the receiving unit of the server.

The replying unit may be adapted to judge whether the server is ready to provide the service inquired by the client device, to generate reply information when the server is determined to be ready, and to include the reply information in a response signal. Further, the client device may be provided with a readiness judging unit, which is adapted to judge, based on the response signal from the replying unit, whether the service indicated in the reply information in the response signal is the service that is ready to be provided by the server, and the client device may be adapted to execute a process for receiving the service, which is judged to be ready by the readiness judging unit, when the server judges the service is ready to be provided.

The replying unit may be adapted to generate the response signal, which includes only reply information that is a predetermined reply concerning the services being stored and transmitted to the client device.

The client device may be adapted to execute each process in parallel, the processes for receiving each of the services, which are determined to be ready to be provided by the server, when the reply signal received by the receiving unit of the client device includes reply information and the readiness judging unit determines that the services are ready to be provided by the server.

The client device including input/output units excluding the communication unit may be adapted to receive the service from the server by utilizing the communication unit and at least one of the input/output units, and the response signal received by the client device may include reply information, and services that are judged to be ready to be provided by the readiness judging unit exists, the client device is adapted to execute each of the processes in parallel, the processes being required to receive each of the services, which utilizes an input/output unit that is required by one service, and to execute processes sequentially, the processes being required to receive each of the services, which utilizes an input/output unit that is required by more than one service.

The client device may be provided with at least two input/output units including at least one image processing device, which is adapted to form an image on a recording medium.

The client device may be provided with at least two input/output units including at least one image processing device, which is adapted to form an image on a recording medium.

According to aspects of the invention, there is provided a communication device including a storage unit, in which information indicating timing to inquire for each service to be received by the communication unit among the services provided by the server is stored, a timing judging unit, which is adapted to judge when an appropriate timing to transmit the inquiry signal for each service occurs based on the information indicating the timing to inquire for each service, an inquiring unit, which is adapted to generate the inquiry signal, the inquiry signal storing the identifying information of the service that is determined to be at the appropriate timing for transmitting the inquiry signal as the identifying information of the service to be inquired and to transmit the inquiry signal to the server, and a receiving unit adapted to receive the response signal transmitted from the server to the communication unit in response to the inquiry signal. Further, the inquiring unit may be adapted to generate converged inquiry information as the identifying information of the service to be inquired when services are determined to be at the appropriate timing for transmitting the inquiry signals, the converged inquiry information collectively describing the identifying information of the services and to transmit the inquiry signal including the converged inquiry signal to the server.

According to aspects of the invention, there is provided a computer program product comprising computer-readable instructions that cause a computer system to execute processes to function as a communication system. The communication system may include a server that is adapted to provide types of services, and a client device that is adapted to have a communication unit communicate with the server and to receive the services provided by the server by communicating with the server. Further, the server may be provided with a receiving unit, which is adapted to receive an inquiry signal concerning the services transmitted from the client device, and a replying unit, which is adapted to generate reply information concerning a service when the receiving unit receives the inquiry signal and to transmit a response signal including reply information to the client device, based on identifying information included in the inquiry signal. Furthermore, the client device may include a storage unit, in which information indicating timing to inquire for each service to be received by the client device among the services provided by the server is stored, a timing judging unit, which is adapted to judge when an appropriate timing to transmit the inquiry signal for each service occurs based on the information indicating the timing to inquire for each service, an inquiring unit, which is adapted to generate the inquiry signal, the inquiry signal storing the identifying information of the service that is determined to be at the appropriate timing for transmitting the inquiry signal as the identifying information of the service to be inquired and to transmit the inquiry signal to the server, and a receiving unit adapted to receive the response signal transmitted from the server to the client device in response to the inquiry signal. The inquiring unit may be adapted to generate converged inquiry information as the identifying information of the service to be inquired when services are determined to be at the appropriate timing for transmitting the inquiry signals, the converged inquiry information collectively describing the identifying information of the services and to transmit the inquiry signal including the converged inquiry signal to the server.

According to aspects of the invention, there is provided a computer program product comprising computer readable instructions that cause a computer system to function as a communication system, which includes a storage unit, in which information indicating timing to inquire for each service to be received by the communication unit among the plurality of services provided by the server is stored, a timing judging unit, which is adapted to judge when an appropriate timing to transmit the inquiry signal for each service occurs based on the information indicating the timing to inquire for each service, an inquiring unit, which is adapted to generate the inquiry signal, the inquiry signal storing the identifying information of the service that is determined to be at the appropriate timing for transmitting the inquiry signal as the identifying information of the service to be inquired and to transmit the inquiry signal to the server, and a receiving unit adapted to receive the response signal transmitted from the server to the communication unit in response to the inquiry signal, and wherein the inquiring unit is adapted to generate converged inquiry information as the identifying information of the service to be inquired when a plurality of services are determined to be at the appropriate timing for transmitting the inquiry signals, the converged inquiry information collectively describing the identifying information of the plurality of services and to transmit the inquiry signal including the converged inquiry signal to the server.

Illustrative Embodiments

Hereinafter, referring to the accompanying drawings, illustrative embodiments will be described.

Entire Configuration

FIG. 1 shows a configuration of an image processing system according to a first illustrative embodiment of the invention. As shown in FIG. 1, the image processing system includes an MFP (Multi Function Peripheral) 10, a directory server 20, a function server 30, etc., which are interconnected to each other so that data communication can be performed via a network 1. According to this illustrative embodiment, the network 1 may be a WAN (Wide Area Network) such as the Internet. Specifically, the MFP 10, the directory server 20 and the function server 30 are connected to the network 1, respectively, via the routers 2 to 4. In this illustrative embodiment, the routers are known as broadband routers.

The MFP 10 according to the illustrative embodiment has functions including a telephone (voice-communicating) function, a scanner function, a printer function, a copier function and a facsimile function. The MFP 10 is controlled by the function server 30 to actuate the input/output functions using the above operational functions Specifically, the MFP 10 includes, as shown in FIG. 1, a control unit 11, an operation unit 12, a reading unit 13, a recording unit 14, a communication unit 15, a storage unit 16, a sound input unit 17, a sound output unit 18, etc. The control unit 11 includes CPU, ROM, RAM, etc., and the CPU of the control unit 11 controls the entire operation of the MFP 10 in accordance with programs stored in the ROM of the control unit 11.

In addition, the operation unit 12 serves as a user interface, which includes a copy key 41, a scanner key 42, a FAX key 43, a service key 44, a setting key 45, up/down/right/left direction keys 46 to 49, an OK key 50 and a cancel key 51, a user interface such as a display 52, etc.

In FIG. 1, the reading unit 13 is an input device for realizing a function of a scanner. That is, the reading unit 13 reads an image formed (e.g., printed) on a sheet-type recording medium (e.g., paper) and generates image data representing the image.

The recording unit 14, which is an output device for realizing the printer function, prints out the image represented by the image data onto a sheet-type recording medium such as paper.

The communication unit 15 connects the MFP 10 to the network 1, and also performs processes for transmitting/receiving data via the network 1.

The storage unit 16 includes a nonvolatile RAM (not shown) in which input/output data can be recorded.

The sound input unit 17 receives sound through a microphone provided to a handset (not shown), which is included in the MFP 10, and generates sound data (e.g., PCM data) corresponding to the received sound.

The sound output unit 18 outputs the sound represented by the sound data (e.g., PCM data) with a speaker provided to the handset or a speaker (not shown), which is provided to a main body of the MFP 10.

The directory server 20 includes a control unit 21, communication unit 22, and a storage unit 23. The control unit 21 includes CPU, ROM, RAM, etc., and the CPU controls the entire operation of the directory server 20 in accordance with the program stored in the ROM.

The communication unit 22 connects the directory server 20 to the network 1 and also performs processes for transmitting/receiving data via the network 1.

The storage unit 23 includes a hard disk drive (not shown), in which data is stored. A service definition information storage unit 24 for recording service definition information 25, which will be explained later, is provided in the storage unit 23. This service definition information 25 is XML (eXtensible Markup Language) data described in XML and can provide a list of services (e.g., type and request destination address (URL: Uniform Resource Locator) of each service) which can be provided by function server 30 through a service selection window (refer to FIG. 8A) in accordance with the content of the XML data. Respective tag definitions in the service definition information 25 are shown in FIG. 3.

The control unit 11 of the MFP 10 obtains the service definition information 25 from the directory server 20, via the communication unit 15, when the user has input, through the operation unit 12, a command for displaying a service selection window. Further, when the control unit 11 obtains the service definition information 25, the control unit 11 displays the service selection window (see FIG. 2) for indicating types of the services on the display 19a of the display unit 19, based on the service definition information 25.

The function server 30 includes a control unit 31, a communication unit 32, a storage unit 33, etc. The control unit 31 includes CPU, ROM, RAM, etc., and the CPU controls the entire operation of the function server 30 in accordance with programs stored in the ROM. Compared with the control unit 11 of MFP 10, the control unit 31 is configured to realize a sufficiently high performance and is capable of performing processes which could not be executed by the control unit 11.

The function server 30 executes processes necessary for providing the multiple services mentioned above (see FIG. 65: regular service providing process) in accordance with a request from the MFP 10, and provides the services to the MFP 10. That is, the MFP 10 communicates with the function server 30, and executes the processes (e.g., the service receiving process and output job) to receive the service from the function server 30. For example, the MFP 10 utilizes the data communication related to providing the services for obtaining the print data from the function server 30, and then prints out the same using the printer function (of the recording unit 14). Further, the directory server 20 is configured to provide the information regarding the services each MFP 10 can use (i.e., the services the function server 30 can provide) with the MFP 10.

The communication unit 32 connects the function server 30 to the network 1 and also performs processes for transmitting/receiving data via the network 1.

The storage unit 33 includes a hard disk drive (not shown), in which data is stored. The memory part 33 includes a service I/F information storage unit 34 for storing service I/F information 36, and a service software storage unit 35 for storing service software 37 which performs processes for providing different services. This service I/F information 36 is XML data described in XML. A parameter input window (described later) is displayed on the MFP 10 (see FIG. 16) with the I/F information 36, thereby an interface for setting information (service content and request destination address) to be used for requesting the function server 30 to provide the service is realized.

Respective tag definitions in this service I/F information 36 are indicated in FIG. 4.

Process Executed by MFP

Next, processes performed by control unit 11 of the MFP 10 will be described.

MFP Process

Figure 5:
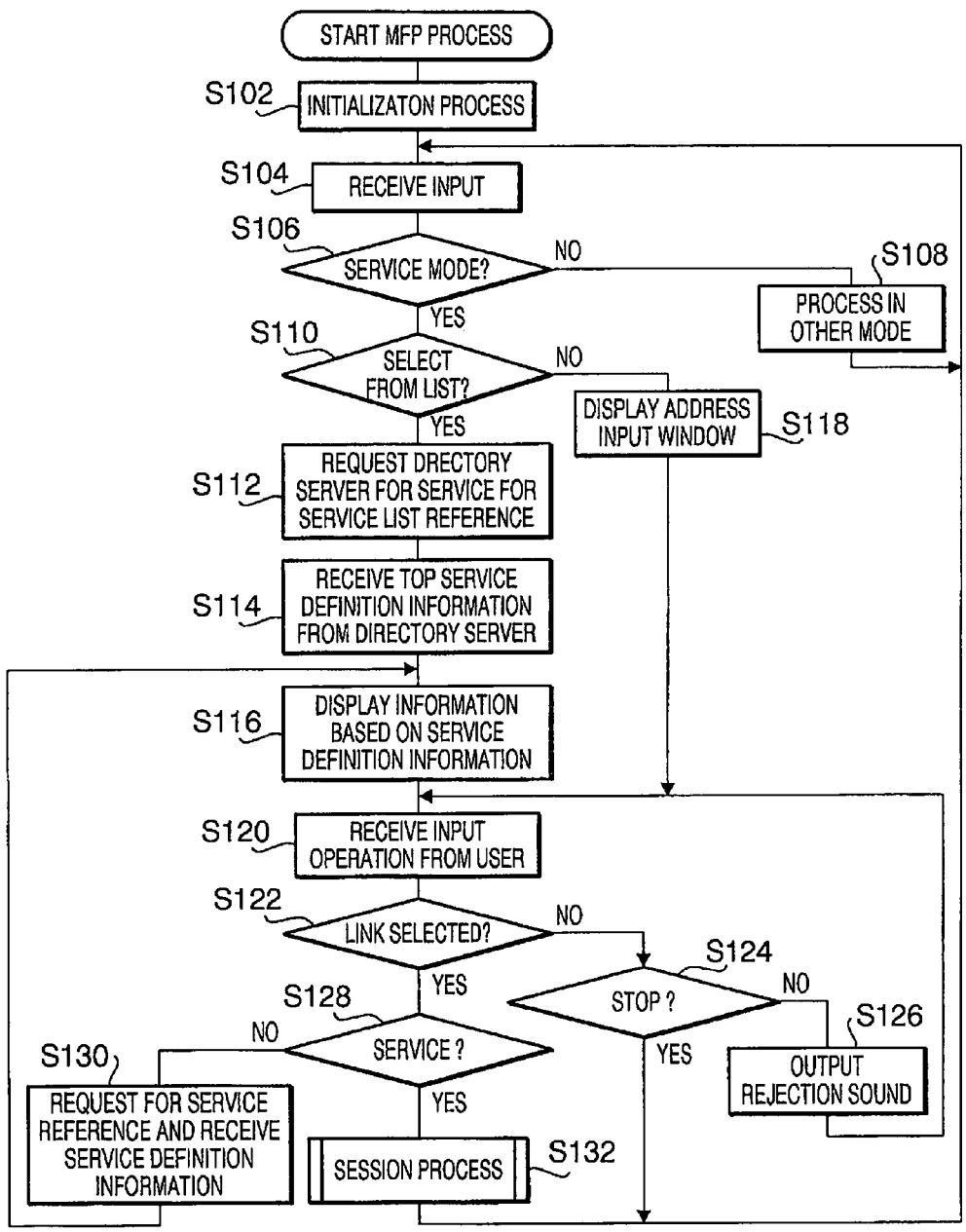
FIG. 5 is a flowchart illustrating an MFP process according to aspects of the first embodiment of the invention.

First, MFP processing which is repeatedly performed after MFP 10 has been booted is explained, referring to FIG. 5.

When the MFP process has been booted, initialization processing is performed (S102). After completion of the initialization process, if an instruction from an external source is generated, for example, an input operation using the operation unit 12 or an input of instruction signals via the network 1 (S104), whether the content of the input is for changing the operation mode to a service mode is judged (S106). In this illustrative embodiment, when the service key 44 of the operation unit 12 is depressed, it is determined that the input instruction is for changing the operation mode to the service mode. As will be described later, the "service mode" is to request the function server 30 to provide a service.

If it is determined in S106 that the content does not call for change to service mode (S106: NO), the process is returned to S104 after performing a process for another operation mode according to the input content (S108).

If it is determined in S106 that the content is for the change to the service mode (S106: YES), the process allows the user to select a method for specifying the service to be requested from the function server 30 (S110). According to the illustrative embodiment, a method selection window shown in FIG. 8 is displayed on the display 52, and the user is asked to select whether to specify the service from a list ("Select from list" in FIG. 8) or by directly entering the request destination address ("Direct input" in FIG. 8). After the selection window has been displayed, the user can select either designating method using the operation unit 12.

In S110, if the designation from the list is selected (S110: YES), the process requests the directory server 20 for the service definition information 25 (S111). In this illustrative embodiment, as an address at which a request for the top item of the service definition information 25 is transmitted, the address preliminarily stored in the storage unit 16 is used, and the HTTP request (according to HTTP 1.1) is transmitted to the directory server at the address, thereby requesting a list of the services. When an access in accordance with the address is received, the directory server 20 transmits the top item of the service definition information 25 as the HTTP response (according to HTTP 1.1), as described above.

It should be noted that the service definition information 25 includes information related to display of the service selection window for allowing the user to select items in a category of the data storage service, print service or copy application service, and information for allowing the user to select the category itself. In S112, the HTTP request is transmitted to an address for accessing the service definition information 25 for displaying the service selection window that allows the user to select a category. Such information will be referred to the top item of the service definition information 25, hereinafter.

Figure 8A:
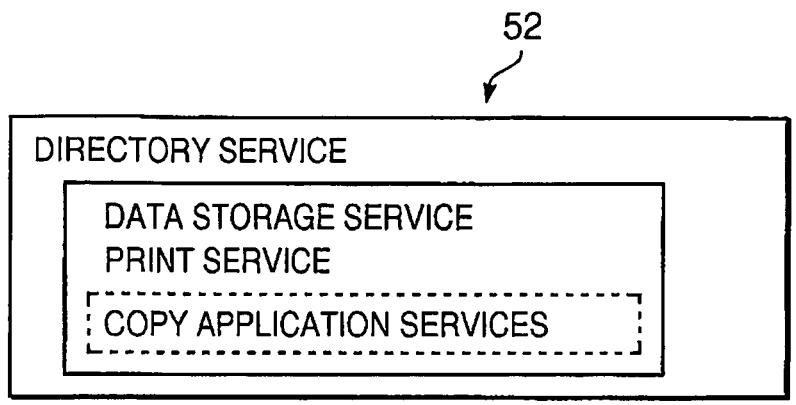
FIGS. 8A-8C show examples of a service selection window according to aspects of the invention.

After requesting for reference to the top item of the service list, when the service definition information 25 transmitted form the directory server 20 is received (S114), the process displays the service selection window on the display 25 based on the received service definition information 25 (S116). Thereafter, the process proceeds to S120. If S116 is executed after the top item of the service definition information 25 is received, a category selection window as shown in FIG. 8A is displayed based on the top item of the service definition information 25 (i.e., XML description) as shown in FIG. 7.

Specifically, in the category selection window, as a display title (Title), a character string "Directory Service" is indicated at an upper portion of a display area of the display 52, and character strings indicating selectable categories (Link_Title), i.e., "Data Storing Service", "Print Service" and "Copy Application Service" are indicated at lower portions of the display area of the display 52. To the category selection window shown in FIG. 8A, IDs of other service definition information 25 respectively corresponding to the selectable categories are assigned (see "Link_Location" of FIG. 7), and when one of the selectable categories is selected, a request for the service definition information 25 of the ID corresponding to the selected category is transmitted to the directory server 20.

Figure 8B:
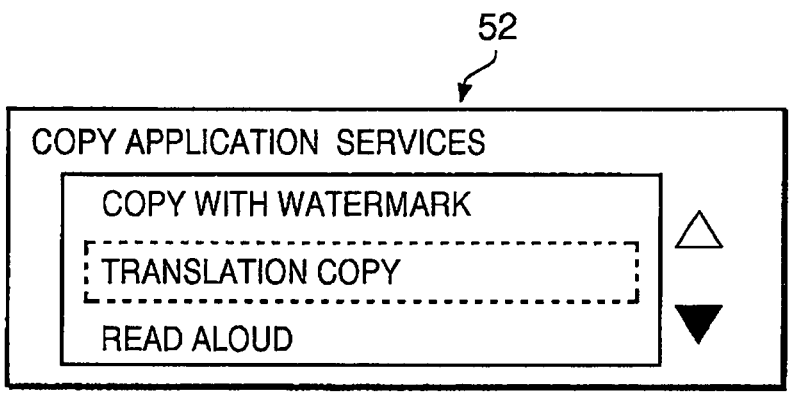
Figure 8C:
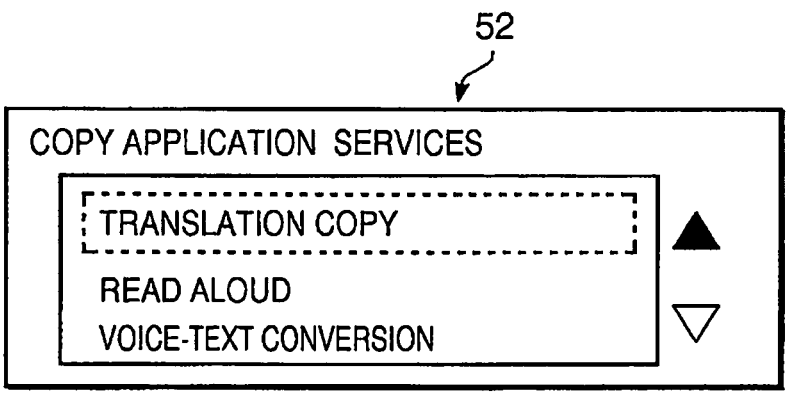

If step S116 is executed after an item of the service definition information 25 other than the top item thereof has been received, for example, if the service definition information 25 related to the "copy application service" is received, the service selection window as shown in FIG. 8B or 8C is displayed, in accordance with the service definition information 25 (XML description) shown in FIG. 9. That is, as shown in FIG. 8B or 8C, the character string "Copy Application Service" is displayed at an upper potion in the display area of the display 52, and the character strings corresponding to the selectable service items (Link_Title), i.e., "Copy with Watermark", "Translation Copy", "Read Original Aloud", "Voice/Text Conversion" are displayed at lower portions in the display area of the display 52.

In this illustrative embodiment, when all the items (selectable service items) cannot be displayed simultaneously due to a limitation of the display area, the window is configured so that the service items can be scrolled in both up-and-down directions. FIG. 8B and FIG. 8C show such a configuration, where FIG. 8C shows a state after the items shown in FIG. 8B are scrolled up by one line. To the service selection window shown in FIG. 8B or FIG. 8C, IDs of other service definition information 25 respectively corresponding to the selectable service items are assigned (see "Link_Location" of FIG. 9), and when one of the selectable service items is selected, a request for the service definition information 25 of the ID corresponding to the selected service item is transmitted to the directory server 20.

In S110, if designation by direct input of the request destination address is selected (S110: NO), the process displays an address input window (not shown) for allowing the user to directly input the address on the display 52 (S118), and the process proceeds to the next step (S120).

In this way, after the service selection screen or the address input screen has been displayed, the user can select any of the items (address input operation), depress each key, or terminate the service mode (termination operation) through the operation unit 12.

Next, the process receives the input operation by the user through the operation unit 12 (S120). In S122, the process judges whether the input operation is an operation for selecting a link. In S122, the process determines that a link has been selected when an operation of selecting an item displayed on the service selection window displayed in S116 or an operation to input an address using the address input window displayed in S118 has been performed.

When it is determined that the operation is not for selecting a link (S122: NO), if the input operation is to stop the process (S124: YES), the process returns to S104 and finishes the process in the service mode. If the input operation is not to stop the process (S124: NO), the process outputs an alarm (e.g., a buzzer sound) in S126, and returns to S120.

If it is determined that the input operation is to select a link (S122: YES), the process judges whether the selected link is a link to a service, that is, the ID to request the function server 30 to provide a service (S128).

If it is determined that the selected link is not a link to a service, that is, if the selected link is an ID for different service definition information 25 (S128: NO), the process requests the directory server 20 for reference to the list of the services. Then, after receiving the service definition information 25 (S130), the process returns to S116 and displays the service selection window on the display 52.

If it is determined that the selected link is a link to a service (S128: YES), the process executes a session process (see FIG. 10) in S132, returns to S104, and finishes the process in the service mode.

Session Process

Next, the session process, which is called at S132 in FIG. 2, will be explained in detail with reference to FIG. 10 and FIG. 11.

In the session process, first, the service to be used is selected and the service start up instruction is transmitted based on the Link_Location of service definition information 25 (or the address, if it has been directly entered) (S202). That is, by transmitting a service start-up instruction to the service address by the HTTP request, the service selected by the user is booted on the function server 30. A session ID is returned as the HTTP response from the function server 30 which has received the service start-up instruction.

Next, the process receives the session ID returned from the function server 30 in accordance with the service start-up instruction at S204. It should be noted that, unless explicitly stated, the HTTP requests and HTTP responses transmitted/received in subsequent processes are all transmitted/received with the session ID included therein. The function server 30, which is to receive the HTTP request, is configured to manage the currently communicating device in accordance with the session ID (known session management).

Next, an "MFP instruction inquiry" for inquiring about the existence of instructions for the MFP 10 is transmitted to the function server 30 as an HTTP request (S206). If an instruction for the MFP 10 has been generated, the function server 30 which received the "MFP instruction inquiry" returns an instruction indicating the generated instruction (otherwise, an instruction indicating "no instructions" if no instructions have been generated) as the HTTP response.

Next, after the instruction (i.e., the MFP instruction) returned in response to the inquiry in S206 has been received (S208), the process judges whether the received instruction is a job start-up instruction (S208). The "job start-up instruction" is generated by the function server 30 after transmitting the service start-up instruction in S202. The job start-up instruction includes instructions to start one of "UI job", "input job (scan job or voice job)", and "output job (print job or speaker job)", depending on the timing and service content. To this job start-up instruction, a job ID of the job to be activated, a type of job (UI job, input job (scan job or voice job), or output job (print job or speaker job)) and the communication destination address of the job have been added.

If it is determined in S210 that the received instruction is a job start-up instruction (S210:YES), the resources required to start up the job is secured (S212), and then the job that is instructed to start is performed in steps S252 to S266, described below.

Next, steps S252 through S266 will be described with reference to FIG. 11.

First, the process judges whether the job instructed by the job start-up instruction is a UI job (S252). If it is determined to be the UI job (S252: YES), the job is started according to the job ID and communication destination address attached to the job start-up instruction (S254). Then, the process proceeds to the next step (S214 of FIG. 10). The UI job is performed simultaneously with other process after being started-up in S254 and is described in detail in "UI Job process" with reference to FIG. 12.

If the process determines that the job designated by the job start-up instruction is not the UI job (S252: NO), but is the scan job (S256: YES) or the voice job (S256: NO, S262: YES), which belong to the input job, the process proceeds to the next step (S214 in FIG. 10) after the input job is started up in accordance with the job ID and communication destination address attached to the job start-up instruction (S260). The input job is performed in parallel with other processes after being started up in S260 and is described in further detail in "Input Job" with reference to FIG. 20.

If it has been determined that the job designated by the job start-up instruction is not any of the foregoing jobs (S258: NO), but a print job (S258:YES) or a speaker job (S262: NO, S264: YES), which belong to the output job, the process proceeds to the next step (S214 in FIG. 10) after the output job is started up in accordance with the job ID and communication destination address attached to the job start-up instruction (S266). This output job is performed in parallel with other processes after being started up in S266 and will be described in further detail in "Output Job" with reference to FIG. 21.

If it has been determined that the job instructed by the job start-up instruction is not any of the foregoing jobs (S264: NO), the process proceeds to the next step (S214 in FIG. 10) without starting up a job.

Figure 10:
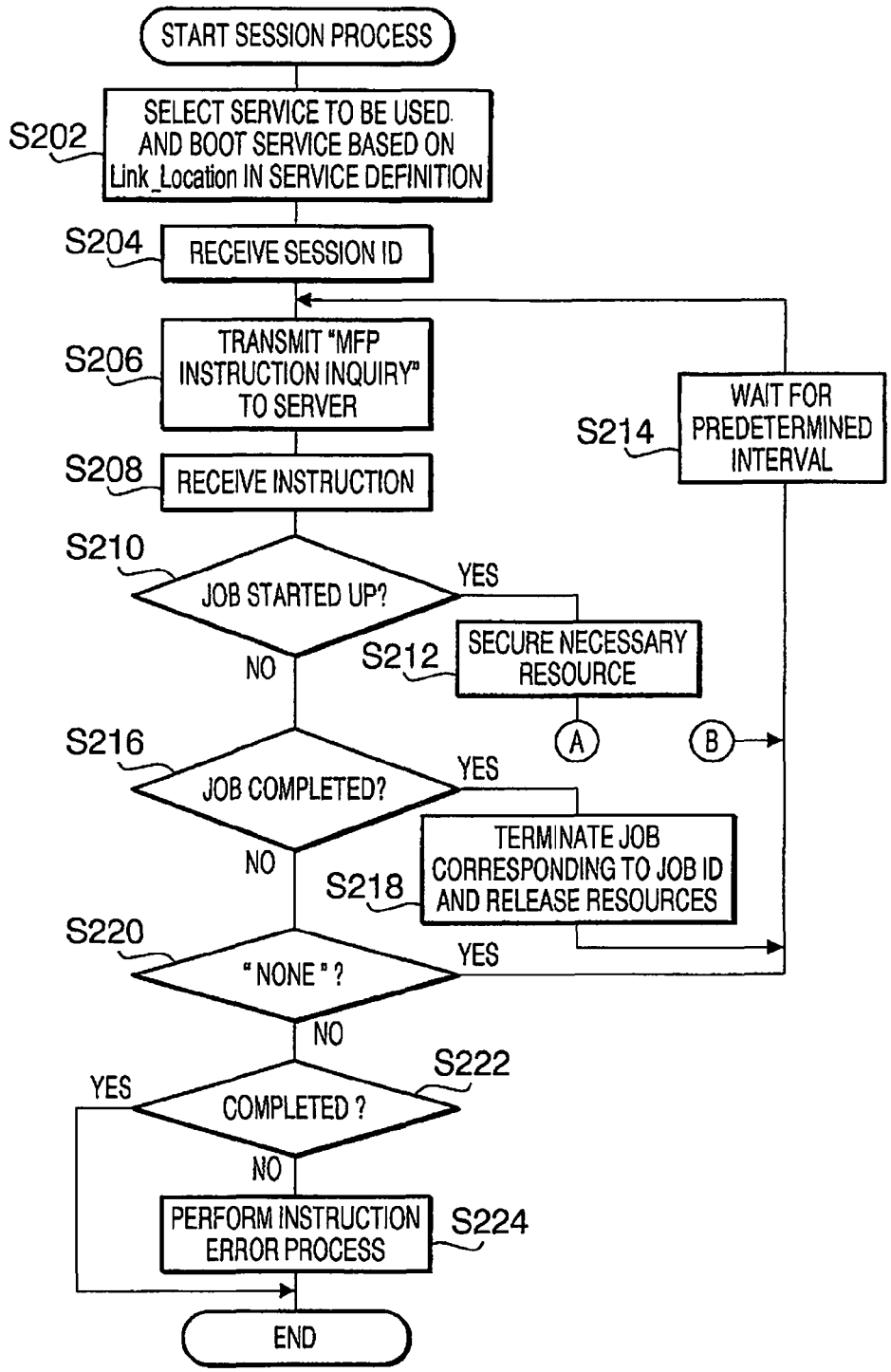
FIGS. 10 and 11 show a flowchart illustrating a session process executed by the MFP according to aspects of the invention.

After the job is started up, the process returns to FIG. 10 and, after pausing for a predetermined interval (S214), returns to S206.

If the process determines that the instruction is not the job start-up instruction (S210: NO), the process judges whether the instruction received in S208 is a job completion instruction (S216). This "job completion instruction" is generated by the function server 30 when the job is finished after having been started up in respective steps in FIG. 11. In the job completion instruction, a job ID of the completed job is attached.

If the process determines that the instruction is a job completion instruction (S216: YES), the job having the job ID attached to this job completion instruction is terminated (a completion instruction is sent to the relevant job) and the process proceeds to S214 after the resources, which were secured in S212 before the job was started up, are released (S218).

If the process determines that the received instruction is not the job completion instruction (S216: NO), the process judges whether the instruction indicates "no instructions" (S220). If "no instructions" is indicated (S220: YES), the process proceeds to S214. If "no instruction" is not indicated, the process judges whether the instruction is a session completion instruction (S222). The "session completion instruction" is generated by the function server 30 when the provision of service to the MFP 10 has been completed.

If the process determines that the instruction is a session completion instruction (S222: YES), the present session process is completed. If the instruction received in S208 is not any of the foregoing instructions, the session process is completed after a process for indicating an error (i.e., an instruction error process) is performed (S224). In S224, an error message is displayed 52.

UI Job

Figure 11:
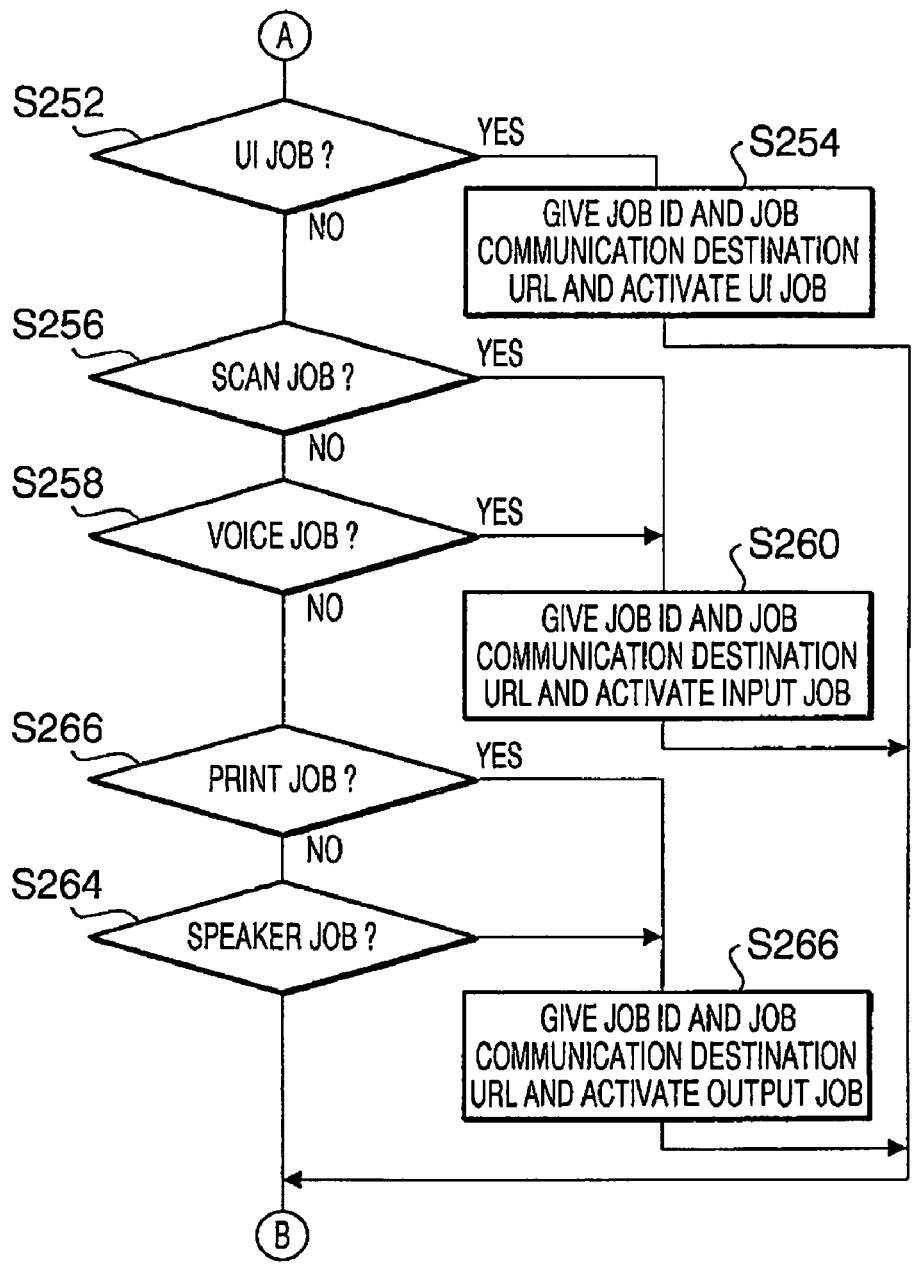

Next, the UI job started up in S254 in FIG. 11 is explained in detail with reference to FIGS. 12 and 15.

When the UI job is started, an MFP job instruction inquiry which is an inquiry for an instruction to the MFP 10 is set to the transmission data storage area (S300). Here, the MFP instruction inquiry is stored in the storage area for transmission, which is defined in the RAM of the control unit 11. The information thus set is transmitted to the function server 30 in S312 (described later) together with the session ID and job ID. When the MFP job instruction inquiry is transmitted, the function server 30 that receives the transmission data transmits back an MFP instruction (if no instruction is issued, an MFP instruction representing "no instruction").

Next, the process judges whether the completion is instructed by the session process (S302). The completion instruction is given in S218 by the session process.

If it is determined that the completion instruction is given by the session process (S302: YES), the process indicates completion of the UI job (S304) by transmitting the session completion instruction to the session process to finish the UI job. It should be noted that the session completion instruction is received in S218. Specifically, in S218, when this instruction is received, it is determined that the job is completely stopped, and the following steps are executed.

If it is determined that the completion instruction has not been received from the session process (S303: NO), the process determines whether the operation unit 12 is in a busy status (S306). In this step, a busy flag Fu is referred to. The busy flag Fu is set ("1" is set) when each job has been started up. If the busy flag Fu is set (i.e., equal to "1"), the operation unit 12 is in the busy status, while, if the busy flag Fu is not set (i.e., equal to "0"), the operation unit 12 is not in the busy status.

If the operation unit 12 is busy (S306: YES), the process returns to S306 after waiting until the operation unit 12 is released from its busy state, i.e., until the busy flag Fu is released (S308). If the operation unit 12 is not busy (S306: NO), the busy flag Fu is set (S310) and the operation unit 12 becomes busy as the present UI job is being performed.

Next, the process transmits the information stored in the transmission data storage area to the function server 30 as an HTTP request together with the session ID and job ID (S312).

Then, if the MFP instruction, which is returned in response to the inquiry in S321, is received in S314, the process judges whether the instruction is a parameter request (S316). The "parameter request" is an instruction generated by the function server 30 that receives the MFP job instruction inquiry as will be described. Based on the I/F information 36 associated with the parameter request, the process requests the MFP 10 for designation of the parameter.

It should be noted that the I/F information 36 is configured such that, depending on the setting condition of the function server 30, the service I/F information 36 after the parameter has been set (FIG. 13) or the service I/F information 36 before the parameter has been set (template) as shown in FIG. 14 is associated with the parameter request (note that FIGS. 13 and 14 show a case when the translation copy is selected). The two types of service I/F information 36 are different in that: (a) "Form_Type" tag set with "select" and a tag to which the parameter related to input device has been set are sandwiched by "Form_Elem" tag, or (b) only a "Form_Type" tag to which the "Device" has been set is sandwiched by "Form_Elem" tag. Depending whether a parameter related to the input device of the MFP 10 is to be obtained, the service I/F information 36 to be attached is different.

If it is judged that the instruction is a parameter request (S316: YES), the process transmits to the function server 30 the transmission data indicating the parameters which have been set in S352-S386 by the user.

Next, S352-S386 will be described referring to FIG. 15.

First, the process generates data containing initial values as the transmission data for transmitting the parameters to the function server 30 based on the service I/F information 36 attached to the parameter request (S352). Specifically, the process extracts parameters set as the initial values at the "Form_Elem" of the service information 36, and generates the transmission data containing the extracted values. It should be noted that, according to the illustrative embodiment, the second finest resolution is selected as the initial values for both input and output parameters.

Generation of the transmission data will be described in detail with reference to FIGS. 13 and 14.

First, as the parameter for "Value_Name=long" for the first "Form_Elem", "en_ja" is registered (see "lang=en_ja" in FIG. 16), and then, as the parameter for "Value_Name=scan_res" in the second "Form_Elem", "300" is registered (See "scan_res=300" in FIG. 16). Next, as the parameter for "Value_Name=print_res" in the third "Form_Elem", "300" is registered (see "print_res=300" in FIG. 16), and then as the parameter for the "Value_Name=comment" of the fourth "Form_Elem", a null (vacant) parameter is registered (i.e., no parameters are registered) (see "comment=" in FIG. 16).

Then, the first parameter (i.e., the parameter corresponding to the first "Form_Elem") in the service I/F information 36 is subjected to processing in the following process (S354).

Next, with respect to the "Form_Elem" of the item selected by the user which is selected as the user operates the operation unit 12 (when this step is executed firstly in the UI job process, with respect to the first "Form_Elem"), the process retrieves a portion sandwiched by the "Form_Data" tag, in the subjected "Form_Elem", from the service I/F information 36 (S356).

Then, the process judges whether the value of the "Form_Type" tag of the portion sandwiched by the "Form_Data" tag, retrieved in S356, represents the value indicating a input/output device (Device). It should be noted that the service I/F information 26 of which the "Form_Type" tag does not show the input/output device, it is the service I/F information 36 after the parameters have been set, while the service I/F information 26 of which the "From_Type" tag represents the value indicating the input/output device is the service I/F information 36 before the parameters have been set (i.e., template).

In S358, if the value of the "Form_Type" has the value representing the output device (S358: YES), the process generates a parameter input window requesting the user to designate the parameter, based on the portion sandwiched by the "Form_Data" tag retrieved in S356, and displays the parameter input window on the display 52 (S360).

The parameter input screen display is described using service I/F information 36 corresponding to the translation copy service as an example. When the translation copy service is executed, the function server 30 recognizes text information by applying an OCR (Optical Character Recognition) process to image data, which is read by the reading unit 13 of the MFP 10, then generates image data representing text translated into a predetermined language, which is printed by the recording unit 14 of the MFP 10.

Figure 19A:
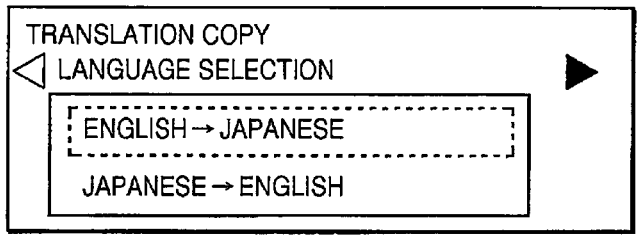
FIGS. 19A-19E show an example of parameter input windows according to aspects of the invention.
Figure 19B:
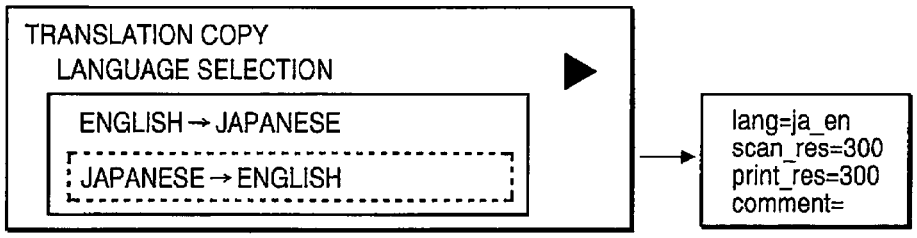

First, based on the service I/F information 36 (which is an XML description) shown in FIG. 13, a parameter input window as shown in FIG. 19A is displayed. In the parameter input window, as shown in FIG. 16A, the letters "translation copy" are indicated at the upper part of the display area as the display title (Title), the characters "language selection" are allocated below the display title as an input item (Disp_Name), and below the "language selection", the characters "English→Japanese" and "Japanese→English", which are items (Disp_Select) indicating the selectable parameters of the input item, "language selection", are indicated. Although there are further input items "scanner setting", "print setting", and "comments" related to "translation copy", in addition to the foregoing "language selection", only input items regarding "language selection" are shown at this time. This is merely due to limitations in the size of the display 52, and in this exemplary embodiment, the input items shown in the lower part of the display area can be switched between four types, including "scanner setting", "print setting", and "comments", by pressing the left and right direction keys 48 and 49 (switching operation, described hereafter) from this state.

With regards to the selectable parameters of the input items, the characters "normal font" and "small font" are shown as the items (Disp_Select) indicating selectable parameters for "scanner setting" (see FIG. 16B). The "normal font", in this illustrative embodiment, means that the resolution (reading resolution), which is a parameter of reading unit 13, is 300×300 dpi, and the "small font" means the resolution is 600×600 dpi. It should be noted that, due to the limited display are of the display 52, "600×600 dpi" is not displayed in the beginning (see FIG. 19C), but by scrolling the image screen, the resolution will be displayed (see FIG. 19D).

The item "Disp_Select" showing the selectable parameter regarding the "print setting" includes "200×200", "300×300", "600×600" and "1200×1200" are to be displayed (see FIG. 19A). Due to the limited display area of the display 52, items "600×600", "1200×1200" are not displayed in the beginning, but are, similar to the above, displayed as the image is scrolled.

With regards to "comments", an entry field is shown below the characters "comment" and the set character string (Default_String) is entered. The character string entered in the entry field as a comment may be used as the header or footer of an image when printed.

If the value of the "Form_Type" is the value indicating the input/output device (S358: YES), the process retrieves the set values of the parameters regarding the input/output device (if the step is executed first time in the UI job, the input/output device at the first "Form_Elem") corresponding to the item, which is selected as the user operates the operation unit 12, from the corresponding portion of the specification information (i.e., information corresponding to the Device_Info) (S302), and then, the process generates the parameter input window based on the set values, and displays the same on the display 52 (S364).

In the MFP 10, since the specification information (see FIG. 27) containing the set values of the parameters regarding the input/output device of the MFP 10 is stored in the storage unit 16. Therefore, in S362, from among the set contents respectively corresponding to the input/output devices ("Device_Info" tag) in the specification information, values corresponding to the selected item are retrieved. It should be noted that the specification information is XML data described with XML in which predetermined tags are defined. Definitions of tags for the specification information are indicated in FIG. 18.

After the parameter input window is displayed on the display 52, the user can perform (1) a switching operation for switching the displayed items to ones which are not displayed due to the limited display are (switching to (n−1)-th or (n+1)-th item by operating left or right direction key 48 or 49), (2) a designating operation for designating a parameter (by depressing the up or down direction key 46 or 47 to designate a parameter (see rectangular by broken line in FIG. 19), (3) a scrolling operation to have not-shown parameters displayed on the display 52 by scroll (which is done by continuing the designating operation), (4) a cancel operation for canceling the service provided by the function server 30 (by depressing the cancel key 51), and (5) a completion operation for completing providing the setting of the parameters or providing the service (by depressing the OK key 50).

Figure 19C:
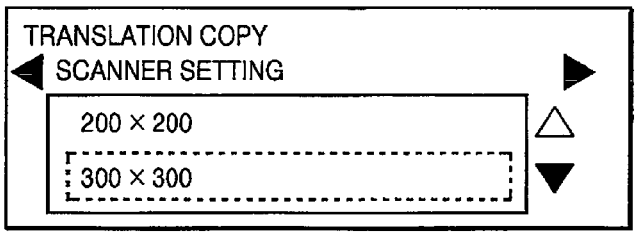
Figure 19D:
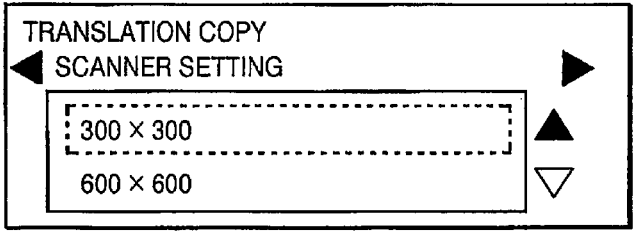
Figure 19E:
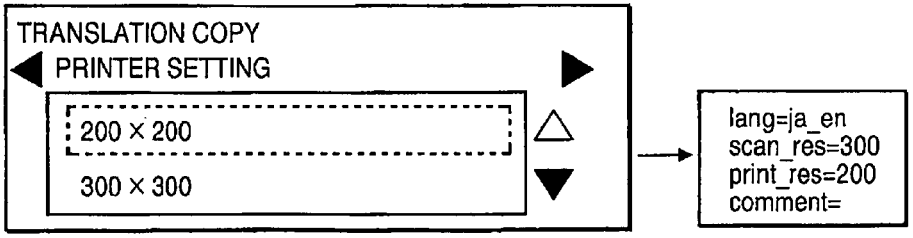

After displaying the parameter input window in S364, the process receives the operation by the user (S366). If the thus performed user's operation is the switching operation (S368: YES), the process returns to S356. Then, the process retrieves a portion at the "Form_Elem", sandwiched by the "Form_Data" tags from the service I/F information 36, and executes the following steps. When the translation copy is performed, a switching operation from the language selection item to a scanner setting item (in this case, the right key 49 is depressed) is performed, as shown in FIG. 19C, the scanner setting items are indicated on the display 52. In another switching operation for switching the present state to the print setting item (in this case, the right key 49 is depressed again), the print setting items are displayed on the display 52 as shown in FIG. 19D.

Further, if the operation performed by the user is a designating operation (S368: NO; S370: YES), the process registers, in S372, the parameters related to the designation with the transmission data generated in S352, and returns to S366. When the translation copy is being executed, if the parameter of language selection has been changed from "English→Japanese" (initial state) to "Japanese→English", from among the parameters having been registered with the transmission data, the value registered as the language selection parameter is changed to a parameter "ja_en" (see FIG. 19B).

If the user's operation is a scrolling operation (S370: NO; S374: YES), the process changes the displayed contents in accordance with the scrolled direction, and the parameters designated at this stage are registered, in S376, with the transmission data generated in S352, and returns to S366.

If the user's operation is a canceling operation (S374: NO; S378: YES), the process changes the transmission data generated in S352 to data indicating "service terminated" (S380). Then, the process sets the transmission data as the HTTP request in the transmission data storage area (S384). Thereafter, the process proceeds to S322 of FIG. 12. The transmission data is transmitted to the function server 30 later, when there is no completion instructions received from the sessions (S302: NO), and the operation panel is not busy (S306: NO), the transmission data is transmitted to the function server 30.

If the user's operation is the completion operation (S378: NO; S382: YES), the process proceeds to S384, and sets the transmission at this stage to the transmission data storage area. Thereafter, the process returns to S322 (FIG. 12).

If the user's operation is an operation other than the above (e.g., for scrolling or an operation to depress an arrow key in a direction where the operation cannot be switched) (S382: NO), the process outputs an alarm sound (e.g., buzzer sound) (S386), and returns to S366.

Figure 12:
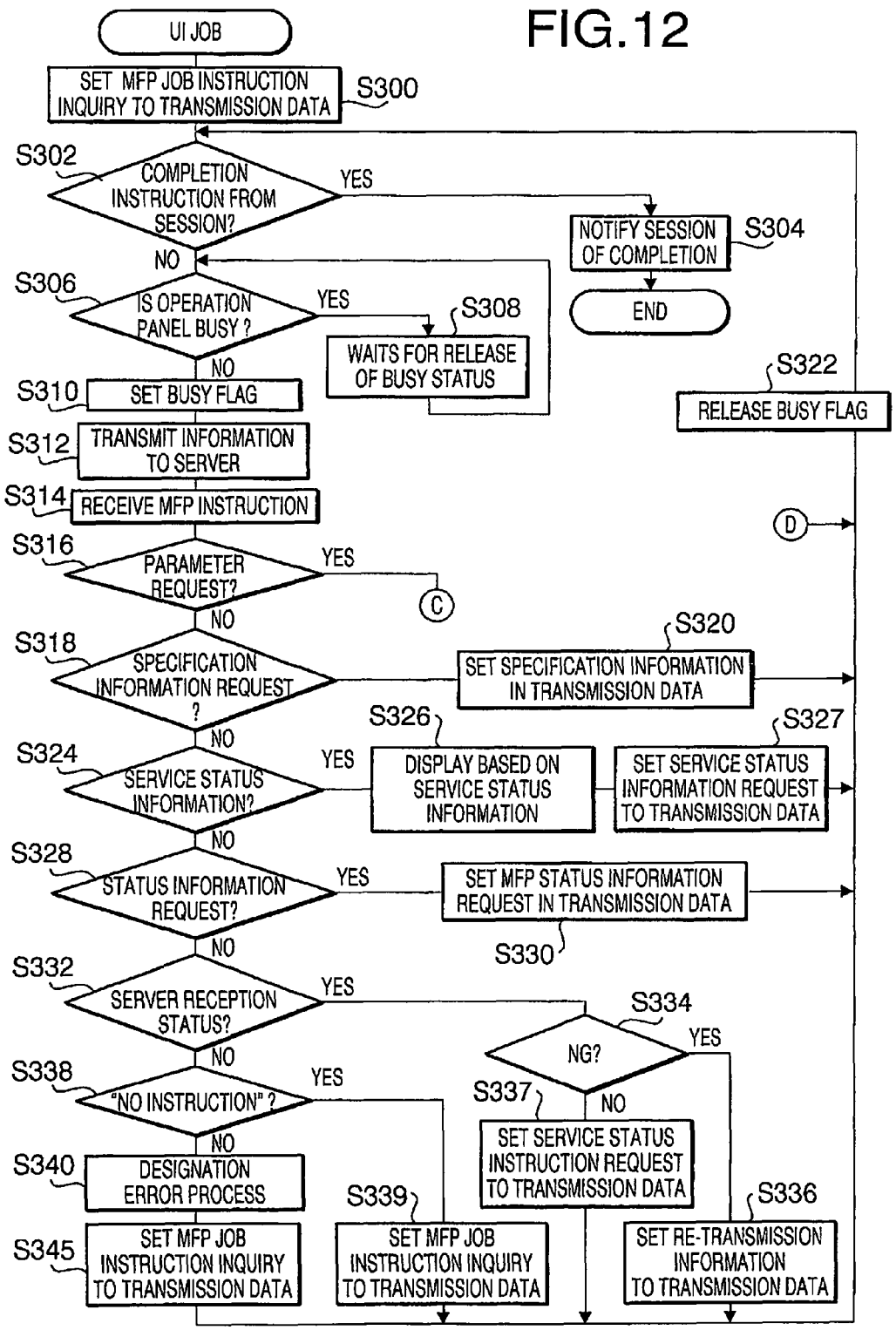
FIG. 12 is a flowchart illustrating a UI job process executed by the MFP according to aspects of the invention.

Next, in FIG. 12, if it is determined that the MFP instruction returned in response to the inquiry in S312 is not the parameter request (S316: NO), the process judges whether the MFP instruction received in S314 is a specification information request (S318). It should be noted that the "specification request" is an instruction issued by the function server 30 that has received the MFP job instruction inquiry in accordance with the setting thereof, and is for requesting the MFP 10 for the specification information described above.

If it is determined that the received instruction is the specification request (S318: YES), the process sets the specification information in the transmission data storage (S320), and proceeds to S322. The specification information is transmitted to the function server 30 in S312 if there is no completion instruction (S302: NO) and the operation panel is not in the busy status (S306: NO). Then, the function server 30 that has received the specification information returns the parameter request as the HTTP response after performing a predetermined process.

Further, in S318, if it is determined not to be the specification request (S318: NO), the process judges whether the MFP instruction received in S314 is the service status information (S324). The "service status information" is an instruction generated by the function server 30 that receives the MFP status information transmitted in the MFP job instruction inquiry or later (S330, S312). The service status information indicates that a process regarding the service is executed without any problem, or the service is terminated due to some problem.

If it is determined that the MFP instruction is the service status information (S324: YES), the process displays information corresponding to the service status information on the display 52 (S326), sets the service status information request that requests for the service performance status in the transmission data storage (S327), and proceeds to S322.

If it is determined that the MFP instruction is not the service status information (S324: NO), the process judges whether the MFP instruction received in S314 is the status information request (S328). The "status information sequence" is an instruction requesting to transmit information regarding the status of the MFP 10.

If it determined that the received instruction is the status information request (S328: YES), the process sets the MFP status information that is information related to the status of the MFP 10 to the transmission data storage (S330), and proceeds to S322. Here, the process sets the MFP status information indicating "paper empty", "cover open", and the like to the transmission data storage as the MFP status information.

If it is determined that the received instruction is not the status information request (S328: NO), the process judges whether the MFP instruction received in S314 is the server receipt status (S332). The "server receipt status" represents an instruction that indicates whether the function server 30 has received the information from the MFP 10 successfully.

When it is determined that the MFP instruction is the server receipt status (S332: YES), if the content of the server receipt status represents an irregular receipt (NG) (S334: YES), the process sets the information which has triggered the transmission of the server receipt status to the transmission data storage again (S336), and proceeds to S322. If it is determined that the server receipt status does not represent the irregular receipt (NG) (S334: NO), the process sets the service status information request which is an instruction requesting for the operation status of the service to the transmission data storage (S332), and process proceeds to S322.

If it is determined that the instruction is not the server receipt status (S332: NO), the process judges whether the MFP instruction received in S314 represents "no instruction" (S338). If the instruction represent "no instruction" (S338: YES), the process sets the MFP job instruction inquiry to the transmission data storage area (S339) as in S300, and proceeds to S322. If the instruction does not represent the "no instruction" (S338: NO), the process executes an error process (designation error) in S340, and then, similar to S300, the process sets the MFP job instruction inquiry to the transmission data storage (S345), and proceeds to S322.

Input Job

Figure 20:
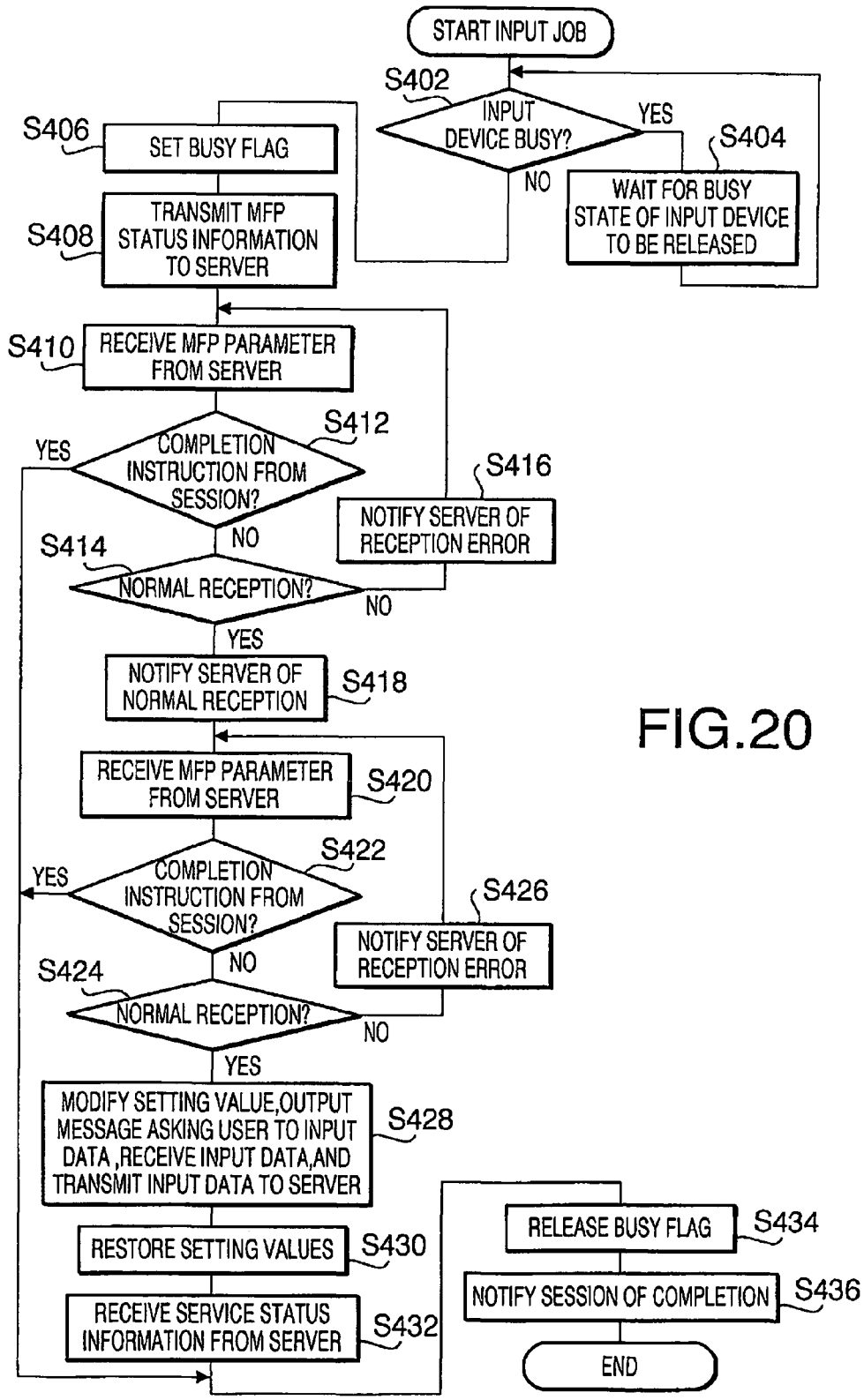
FIG. 20 shows a flowchart illustrating an input job executed by the MFP according to aspects of the invention.

Next, the input job process activated in S260 of FIG. 11 will be described in detail with reference to FIG. 20. The input job shown in FIG. 20 is executed in parallel with the session process and the UI job described above.

When the input job is started, the process judges whether the input device is in the busy state (S402). In this illustrative embodiment, the input device is determined to be in the busy state if the busy flag Fi is set (i.e., set to "1"), while the input device is determined not to be in the busy state if the flag is released (i.e., set to "0"). It should be noted that, according to the illustrative embodiment, the "input device" may be the reading unit 13 when receiving the service related to the image data generated in the reading unit 13, and may be the sound input unit 17 when receiving the service related to the sound data generated in the sound input unit 17.

If the process determines that the input device is in the busy state (S402: YES), the process waits until the input device is released from its busy state (S404), then returns to S402. If the input device is not in the busy state, the process sets the busy flag Fi (S406).

Next, the process transmits the MFP status information, related to the MFP 10 status, by the HTTP request to function server 30, together with the job ID assigned to in S260 in the session process (S408). When the MFP status information is received, the function server 30 returns the MFP parameter, which is information generated based on the parameter set in the transmission data storage in S312 and transmitted to function server 30 in S321 of FIG. 12 as the HTTP response.

If the MFP parameter is returned (S410) in response to the MFP status information transmitted in S408, the process judges whether the completion instruction has been received from the session process (i.e., whether the completion instruction is issued by the session process) in S412. The completion instruction is given from the session process to the input job when the job to be completed in S218 of FIG. 10 is the input job.

When the completion instruction has not been given from the session process (S412: NO), if the MFP parameter returned in S410 has not been received successfully (S414: NO), the MFP reception status for indicating that the information from the function server 30 cannot be received normally (i.e., abnormal reception (NG)) is transmitted to the function server 30 by the HTTP request (S416), together with the job ID given in S260 in the session process. As the function server 30 which received the MFP reception status transmits the MFP parameter again as the HTTP response, the process returns to S410 after execution of S416.

If, in S410, the MFP parameter has been received successfully (S414: YES), the MFP reception status for indicating that the information from the function server 30 was received normally (i.e., normal reception (OK)) is transmitted to the function server 30 by the HTTP request (S418), together with the job ID assigned in S260 in the session process. The function server 30 which received the MFP reception status returns an input data request requesting for transmission of data to be processed by the function server 30, as will be described later.

Next, if the input data request is returned from the function server 30 which received the MFP reception status (S420), the process judges whether the completion instruction is given by the session process (S422).

When the session process has not given the completion instruction (S422: NO), if the input data request returned in S420 has not been received successfully (S424: NO), the MFP reception status indicating the abnormal reception (NG) is transmitted to the function server 30 (S426), as in S416. When the MFP reception status has been received, the function server 30 transmits the input data request again, as explained later, and thus, the process returns to S420 after execution of S426.

If the input data request returned in S420 has been received successfully (S424: YES), the input data to be processed by the function server 30 is transmitted by the HTTP request to the function server 30 (S428), together with the job ID assigned in S260 of the session process.

Specifically, the setting values of the input device is changed to the values indicated by the MFP parameter received in S410, and then a data input window asking the user to input data to be processed by the function server 30 on the display 52, thereby asking the user to perform an input operation for inputting data in the MFP 10. Then, the data obtained from the user (i.e., input data) is transmitted to the function server 30 by the HTTP request, together with the job ID assigned in S260 in the session process. For example, messages such as "set original and press OK key", "pick up handset and speak" and the like are displayed on the display 52, and then, data acquired through the reading unit 13 and/or the sound input unit 17 is transmitted to the function server 30 subsequently. The function server 30 which received the input data may return the service status information for indicating whether the data processing according to the input data has been completed successfully.

The method for acquiring data in the process may be retrieval of data from a memory card set in a memory card slot (not shown) or readout of data from a certain storage area in the storage unit 16. In such a case, a message asking the user to specify the storage area from which the data is retrieved is to be displayed on the display 52.

After the input data is transmitted to the function server 30, the setting of the input device modified in S428 is returned to the original values (S430), and subsequently, the service status information returned from the function server 30 is received (S432).

When the service information is received in S432, or if, in S412 and S422, the session process gave the completion instruction (S412: YES; S422: YES), the busy flag Fi set in S406 is released (S434), and the completion of the input job is notified to the session process together with the job ID assigned in S260 in the session process (S436), and the input job is finished. The notification of completion of the input job is received during the step S218 of the session process shown in FIG. 12. That is, in S218, when the instruction is received, the process determines that the job has been completely terminated and the following steps are executed.

Output Job

Next, the output job process activated in S266 of FIG. 21 will be described with reference to FIG. 18. The output job operates in parallel with the session process and the UI job.

When the output job is started, the process judges whether the output device is in the busy state (S502). In this step, the output device is determined to be in the busy status if a busy flag Fo is set (i.e., set to "1") and is determined not to be in the busy state when the flag is released (i.e., set to "0"). According to the illustrative embodiment, the "output device" is the recording unit 14 when receiving the service related to image data that is to be printed by the recording unit 14, and is the sound output unit 18 when receiving the service related to sound data that is to be output from the sound output unit 18.

If the process determines that the output device is in the busy status (S502: YES), the process waits until the output device is released from its busy state (S504), and the returns to S502. If the process determines that the input device is not in the busy state (S502: NO), the busy flag Fo is set (S506).

Next, the MFP status information representing the MFP 10 status is transmitted by the HTTP request to the function server 30, together with the job ID assigned in S266 in the session process (S508). The function server 30, which received the MFP status information, returns the MFP parameter, which is information based on the parameter set to the transmission data storage in S320 and transmitted to the function server 30 in S312 of FIG. 12 as the HTTP response.

Next, when the MFP parameter is returned in response to the MFP status information transmitted in S508 (S510), the process judges whether the completion instruction has been given from the session process (i.e., whether there is a completion instruction from session) in S512. This completion instruction is given from the session process to the output job when the job to be completed in S218 of FIG. 12 is the output job.

When the process determines in S512 that the completion instruction has not been received from the session process (S512: NO), if the MFP parameter returned in S510 has not been received successfully (S514: NO), the MFP reception status for indicating that the information from function server 30 has not been received successfully (i.e., abnormal reception (NG)) is transmitted to the function server 30 by the HTTP request (S516), together with the job ID assigned to in S266 in the session process. The function server 30 which received the MFP reception status transmits the MFP parameter again, and thus, the process returns to S510 after execution of S516.

If the MFP parameter can be received successfully (S514: YES), the MFP reception status for notifying that the information from the function server 30 has been received successfully (normal reception (OK)) is transmitted to the function server 30 by the HTTP request (S518), together with the job ID assigned to in S266 in the session process. The function server 30 which has received the MFP reception status returns data (i.e., the output data) created by the process based on the input data transmitted in S428 of FIG. 20, as will be described later.

If the output data is returned from the function server 30 which has received the MFP reception status (S520), the process judges whether the session process has given the completion instruction (S522), as in S512.

When it is determined in S522 that the completion instruction has not been given by the session process (S522: NO), if the output data returned in S520 has not been received successfully (S524: NO), the MFP reception status for indicating the abnormal reception (NG) is transmitted to the function server 30 (S526), as in S516. The function server 30 which received the MFP reception status transmits the output data again, as will be described later, and thus, the process returns to S520 after execution of S526.

If the output data returned in S520 has been received successfully (S524: YES), the process outputs the output data through the output device (S528). Specifically, the setting values of the output device are modified to the values represented by the MFP parameter received in S510, and then, the output data is output through the output device (e.g., images are printed in accordance with the image data, sound waves are output in accordance with the sound data).

When the output data has been output by the output device, the setting of the output device modified by the processing in S528 is returned to the original values (S530), and the MFP status information, which is information related to the MFP 10 status, is sent to the function server 30 by the HTTP request (S532), together with the job ID assigned in S260 in the session process. The function server 30 which received the MFP status information returns the service status information, as will be described later.

After the service status information returned from function server 30 has been received (S534), or when the completion instruction has been received from the session process (S512: YES; S522: YES), the busy flag Fo set in S406 is released (S536) and the completion of the input job is notified to session processing together with the job ID assigned in S260 of the session process (S538), the present input job is finished. The notification of the completion of the input job is received during the process executed in S218 of FIG. 12. In S218, when the instruction is received, it is determined that the job has been completely terminated and the following processes are executed.

Process by Function Server 30

Each process performed by control unit 31 of the function server 30 will be described hereinafter.

Function Server Process

Figure 22:
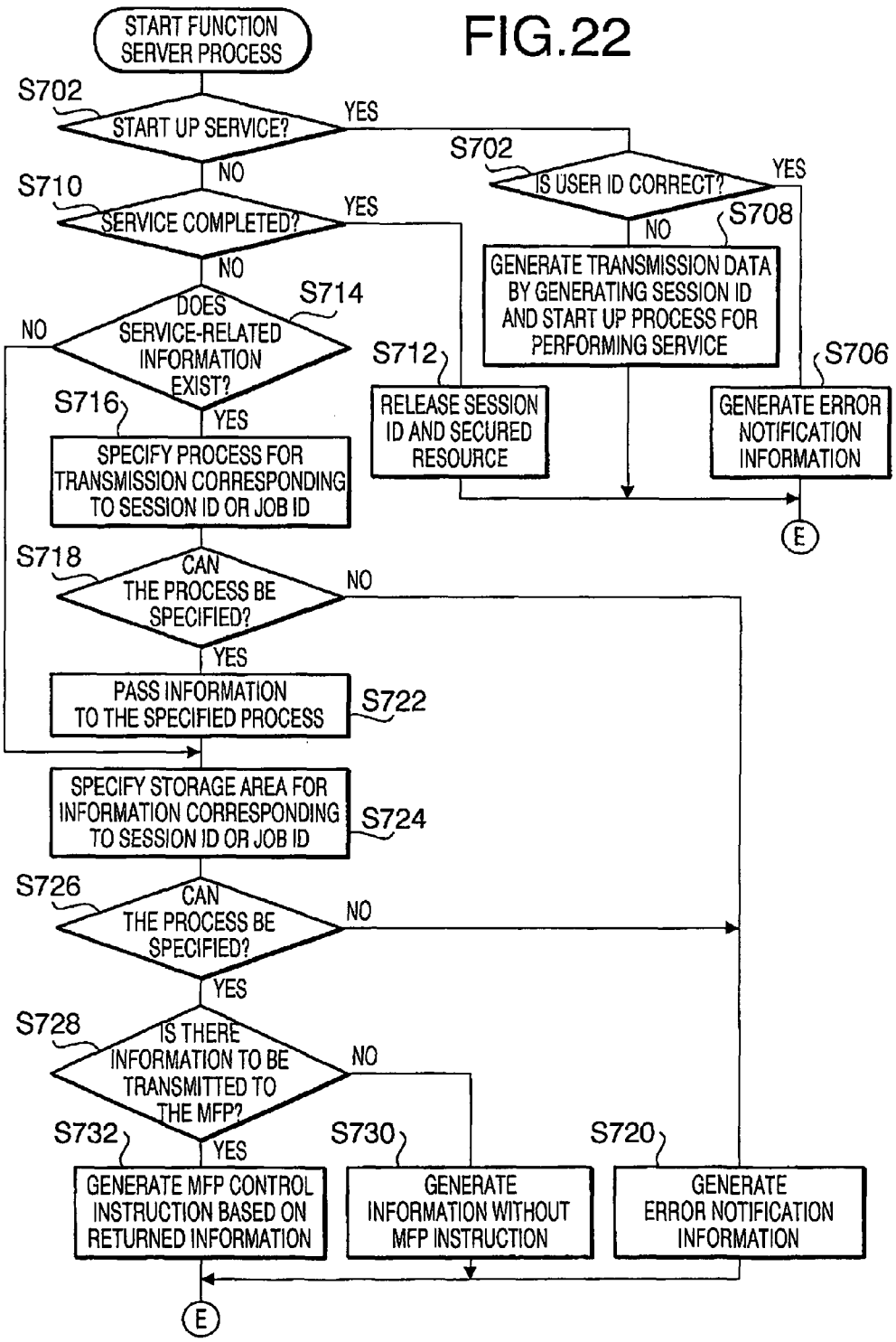
FIGS. 22 and 23 show a flowchart illustrating a function server process executed by the function server according to aspects of the invention.
Figure 23:
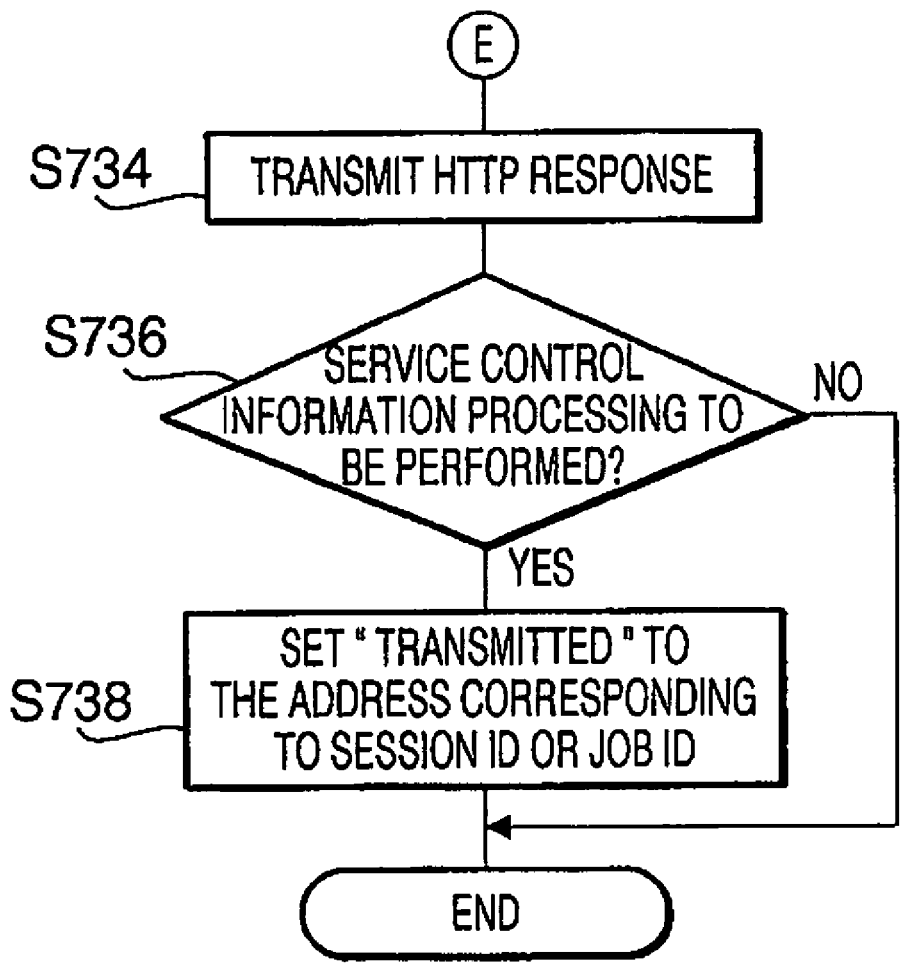

First, the function server process performed every time when the HTTP request is received is explained, referring to FIGS. 22 and 23.

When the function server process is started, the process judges whether the received HTTP request is a service start-up instruction (S702). The "service start-up instruction" is transmitted by the MFP 10 in S202 of FIG. 10.

If it is determined that the received HTTP request is the service start-up instruction (S702: YES), the process generates a session ID and transmission data representing the session ID. Then, the process secures resources for execution of the service and starts up a corresponding process (S708), and proceeds to S734. The process started up above is a session process, which will be described later, referring to FIG. 24.

If it is determined that the request is not the service start-up instruction (S702: NO), the process judges whether the HTTP request is a service completion instruction (S710). The "service completion instruction" is set by the MFP 10 to the transmission data storage area in S384 as transmission data instructing termination of the service generated in S380, and is transmitted in S312.

If it is determined that the request is the service completion instruction (S710: YES), the process releases the session ID and the resources secured in S708, creates transmission data representing the completion of the service (S712), and proceeds to execute the next procedure (S734 of FIG. 23). If it is determined that the request is not the service completion instruction (S710: NO), the process judges whether service-related information, i.e., information related to a service (session or job) is included, or more specifically, whether an HTTP request is transmitted by MFP 10 during execution of the session process or a job (UI job, input job, or output job) (S714).

If it is determined that the service-related information is included in the request (S714: YES), the process which has transmitted the HTTP request (session processing, UI job, input job, or output job) is identified (S716).

If the process cannot be identified (S718: NO), the control generates information indicating an error (i.e., error notification information), and then proceeds to S734.

If the process is identified (S718: YES), the control transfers the information transmitted by the HTTP request to the identified process (S722).

After S722 has been completed, if it is determined that the service-related information is not included (S714: NO), the storage area for information corresponding to the session ID or job ID is specified (S724).

If the storage area cannot be specified (S726: NO), the process proceeds to S720, generates the error notification information, and proceeds to S734. If the storage area has been specified (S726: YES), the process judges whether information to be returned to the MFP 10 exists in the storage area (S728).

Then, if there is no information to be returned to the MFP 10 (S728: NO), the process generates information representing "no MFP instruction" (S730) and proceeds to S734. If it is determined that information to be returned to the MFP 10 exists (S728: YES), the process generates an MFP control instruction based on the information to be returned (S732), and then the process proceeds to S734.

The process returns the information generated in S708, S712, S720, S730 and S732 to the MFP 10 as the HTTP responses (S734). Among the HTTP responses returned to the MFP 10: the transmission data generated in S708 is received by the MFP 10 in S204 of FIG. 10; the transmission data indication service completion, which is generated in S712, is received by MFP10 in S208 of FIG. 10, which is judged in S222 and is determined "YES". Furthermore, the error notification information generated in S720 is received by the MFP 10 in S208 of FIG. 10 which information is judged and determined "NO" in S222, and then step S224 is executed. The information representing "no instruction" generated in S730 is received by the MFP 10 in S208 of FIG. 10, which information is judged and determined "YES" in S220. The MFP control instruction generated in S732 has a different content in each job, and is received by the MFP 10 executing a corresponding job.

If the service control information process is performed (S736: YES), that is, if the determination at S710 is "NO", the process sets the memory address corresponding to the session ID or job ID to "transmission completed" (S738), and finishes the function server process. If the service control information process has not been executed (S736: NO), the process does not set the memory address, and finishes the function server process. The service control information process is the data exchange between the MFP 10 and the session/job of the function server 30 in steps S714-S732.

Session Process

Next, the session process which is performed in parallel with the function server processing will be described referring to FIGS. 24 and 25. In the illustrative embodiment, the session processing regarding the translation copy service will be described as an example.

When the session processing is started, the process first executes initialization (S802). Then, the process starts up the service-side UI job (S804). The service-side UI job (i.e., UI job 1 or UI job 2) is a process performed in parallel with the session process and will be described in detail later.

Next, the process outputs the UI job start-up instruction as the MFP instruction (S806). Specifically, the process stores the UI job start-up instruction, together with the job ID and communication destination address in the storage area for storing the return information. Then, based on the stored data, the MFP control instruction is generated in S732 of FIG. 22, which is transmitted as a start-up instruction to the MFP 10 in S734 of FIG. 23. The start-up instruction is received by the MFP 10 in S208 of FIG. 10, and based on the start-up instruction, the UI job is started up on the MFP 10 (S254 of FIG. 11).

Next, the process judges whether the parameter has been input from the MFP 10 (S808). As described later, in the UI job started up in S804, the parameter is obtained from the MFP 10, and a notification that the parameter is obtained is transmitted to the session process. Therefore, in S808, if the notification that the parameter is obtained is transmitted from the UI job, the process determines that parameter input from the MFP 10 has been completed.

If it is determined that parameter input is not completed (S808: NO), the process judges whether the UI job is terminated (S810). If acquisition of the parameter from the MFP 10 is not executed successfully the UI job is terminated and information representing the termination of the UI job is transmitted to the session process. Therefore, in S810, if such information is received (i.e., the termination of the UI job is notified), the process determines that the UI job is terminated.

If it is determined that the UI job is not terminated (S810: NO), the process returns to S808. If it is determined that the UI job is terminated (S810: YES), the process proceeds to S848.

If it is determined that the parameter input has been completed (S808: YES), a scan job, which is a type of service-end input job, is started up (S812). This scan job is a process performed in parallel with the session process, which will be described later.

Next, the process outputs the scan (input) job start-up instruction as the MFP instruction (S814). In this step, the process stores the scan job start-up instruction, together with the job ID and communication destination address, in the storage area for storing the return information. Then, based on the stored data, the MFP control instruction is generated in S732 of FIG. 22, and is transmitted as an activation instruction to the MFP 10 in S734 of FIG. 23. This start-up instruction is received by the MFP 10 in S208 of FIG. 10, and based on the received instruction, the input job is started up in the MFP 10.

Next, the process judges whether preparation of the scanner (reading unit 13) on the MFP 10 has been completed (S816). In the scan job started up in S812, notification of the completion of scanner preparation on the MFP 10 is received and notification of this is transmitted to the present session process. Therefore, in S816, if notification of the completion of scanner preparation is received from the scan job, it is determined that scanner preparation on the MFP 10 has been completed.

If it is determined in S816 that scanner preparation is not completed on the MFP 10 (S816: NO), the process judges whether the scan job is terminated (S818). In the scan job started up in S812, if notification that scanner preparation has been completed has not been received from the MFP 10 successfully, the scan job itself is terminated (completed), and the termination of the scan job is indicated to the session process. Therefore, if notification of termination is received from the scan job, the process determines that the scan job has been terminated.

If it is determined that the scan job is not terminated (S818: NO), the process returns to S816. If it is determined that the scan job has been terminated (S818: YES), the process proceeds to S844.

If it is determined that the scanner preparation is completed (S816: YES), the print job, which is one type of service-side output job, is started up (S820). This print job is performed in parallel with the session process, which will be described in detail later.

Next, the print (output) job start-up instruction is output as the MFP instruction (S822). In this step, the process stores the print job start-up instruction, together with the job ID and communication destination address, in the storage area which stores return information. Based on this, the MFP control instruction is generated in S732 of FIG. 22, which is transmitted as the start-up instruction to the MFP 10 in S734 of FIG. 23. This start-up instruction is received by the MFP 10 in S208 of FIG. 10, and based on this instruction, the output job is started-up on the MFP 10 (S266 of FIG. 11).

Next, the process judges whether preparation of the printer (recording unit 14) on the MFP 10 has been completed (S824). In the print job started up in S820, a notification of completion of print preparation on the MFP 10 is received, notification of which is transmitted to the session process. Therefore, if notification of the completion of print preparation has been received from this scan job, it is determined that print preparation on the MFP 10 has been completed.

If it is determined that print preparation has not been completed on the MFP 10 (S824: NO), the process judges whether the print job is terminated (S826). In the print job started up in S820, if notification that print preparation has been completed on the MFP 10 has not been received successfully, the print job itself is terminated (completed), notification of which is transmitted to the session process. Therefore, if notification of termination has not been received from the print job, it is determined that the print job is terminated.

If it is determined that the print job has not been terminated (S826: NO), the process returns to S824. If it is determined that the scan job has been terminated (S826: YES), the process proceeds to S840.

If it is determined that print preparation has been completed (S824: YES), the input data acquired from the MFP 10 is retrieved (S828). In the scan job started up in S812, the image data read by the reading unit 13 of the MFP 10 is acquired from the MFP 10. Therefore, in S828, among data (input data) acquired and stored in the predetermined storage area, data corresponding to one page is retrieved.

Next, in S830, processed image data is generated by applying OCR processing, translation processing, and print layout processing to the input data read in S828. Specifically, a text part in the image represented by the input data is recognized by applying OCR processing to the input data retrieved in S828. Then, the text part is translated into text in a designated language by applying the translation processing to this text part. This translation processing is performed according to the parameter obtained in the UI job started up in S804, and the text part is translated into the language represented by this parameter. Then, based on the recognized and translated text part, image data for printing is generated in accordance with the designated print layout.

Next, the image data generated in S830 is output (S832). In this step, the image data generated in S830 together with the job ID and communication destination address are stored in the storage area for storing the return information. Based on the data stored in the storage for storing the return information, a print command appropriate to the MFP 10 is generated in S1120, which is transmitted to the MFP 10.

Subsequently, the process judges whether readout of all the input data in S828 (data area for all pages) has been completed (S824). If the readout has not been completed (S834: NO), the process returns to S828, while, if all the input data has been read out (S834: YES), the process judges whether output of the output data in S832 (storing in the storage area) has been completed (S836).

If output of the output data has not been completed (S836: NO), the process returns to S828, while, if the output has been completed (S836: YES), the print (output) job completion instruction is output as the MFP instruction (S838). In this step, processing for storing the print job completion instruction together with the job ID in the storage area for storing the return information is performed. Based on the stored data, the MFP control instruction is generated in S732 of FIG. 22 and is transmitted to the MFP 10 as the completion instruction in S734 of FIG. 23. This completion instruction is received by the MFP 10 in S208 of FIG. 10, and based on the instruction, the output job of the MFP 10 is terminated (completed) (S218 of FIG. 10).

After print job completion instruction has been output or it is determined that the print job has been terminated (S826: YES), the service-side print job started up in S820 is finished (S840).

Next, the scan (input) job completion instruction is output as the MFP instruction (S842). In this step, the process stores the scan job completion instruction, together with the job ID, in the storage area for storing the return information. Based on the stored data, the MFP control instruction is generated in S732 (FIG. 22), which is transmitted to the MFP 10 as the completion instruction in S734 (FIG. 23). This completion instruction is received by the MFP 10 in S208 of FIG. 10, and based on the instruction, the input job is terminated (completed) on the MFP 10 (S218 of FIG. 10).

When the scan job completion instruction is output, or it is determined that the scan job has been terminated (S818: YES), the service-side scan job started up in S812 is finished (S844).

Next, the UI job completion instruction is output as the MFP instruction (S846). In this step, the process stores the scan job completion instruction, together with the job ID, in the storage area for storing the return information. Based on the stored data, the MFP control instruction is generated in S732 of FIG. 22, which is transmitted to the MFP 10 as the completion instruction in S734 of FIG. 23. This completion instruction is received by the MFP 10 in S208 of FIG. 10, and based on the instruction, the UI job is terminated (completed) on the MFP 10 (S218 of FIG. 10).

In S850, a completion process such as releasing of resources secured in each job has been performed, and then the session process is terminated. In S852, the process stores the service completion instruction in the storage area for storing the return information. Based on the instruction, the MFP control instruction is generated in S732 of FIG. 22, which is transmitted to the MFP 10 as the completion instruction in S734 of FIG. 23. This completion instruction is received by the MFP 10 in S208 of FIG. 10, and based on the instruction, the session process on the MFP 10 is finished (S222 of FIG. 10).

UI Job

Next, UI job processing which is started up in S804 of FIG. 24 will be described referring to FIG. 26. The UI job 1 is executed in response to the receipt of a startup instruction from the session process when the function server 30 is set such that the parameters related to the input devices of the MFP 10 are not managed on the function server 30 side.

When the UI job is started, the process waits until the MFP job instruction inquiry is received from the MFP 10. When received the MFP job instruction inquiry (S902), the process returns a parameter request instruction that requests parameter settings necessary for performing the service to the MFP 10 as the MFP instruction (S904). The MFP job instruction inquiry received in S902 is the HTTP request transmitted by the MFP 10 in S321 of FIG. 12. The MFP instruction transmitted in S904 is the HTTP response received by the MFP 10 in S314 of FIG. 12. Specifically, the service I/F information 36 (e.g., information corresponding to the translation copy service: see FIG. 14) has been added to the HTTP response. When received the MFP instruction, the MFP 10 sets parameters in the transmission data storage area in S316-S320, and transmits the parameter in S312 of FIG. 12 as the HTTP request.

Next, an error counter is initialized (S906). That is, a counter for counting the consecutive number of occurrences when the parameters cannot be received successfully is reset (i.e., set to "0").

Next, the process waits until the parameters are received from the MFP 10 that received the MFP instruction transmitted in S904. When the parameters are received (S908), the process judges whether the parameters have been received successfully (S910).

If it is determined that the parameter has not been received successfully (S910: NO), the process judges whether such a situation has occurred consecutively by a predetermined number of times (twice in this illustrative embodiment) based on the value of the error counter (S912). If it has not occurred consecutively by the predetermined number of times (S912: NO), the process outputs the server receipt status indicating that the parameter has not been received successfully (server reception NG; abnormal reception) in S914, and counts up the error counter (S926). Then, the process returns to S908.

In S914, the process stores the server receipt status in the storage area for storing the return information. Based on the server receipt status, the MFP control instruction is generated in S732 of FIG. 22, and transmitted as the server receipt status to the MFP 10 in S734 of FIG. 23. This server receipt status is received by the MFP 10 in S314 of FIG. 12, and based on the received information, the MFP 10 re-transmits the parameters (S334, S336, S312 in FIG. 12).

If a condition where the parameter cannot be received successfully occurs consecutively by a predetermined number of times (S912: YES), the process notifies the session process of termination (completion) of the UI job (S918), and terminates the UI job. The notification in S918 is received by the session process in S810 of FIG. 24.

If it is determined that the parameter has been received successfully (S910: YES), the process outputs the server receipt status indicating that the parameter has been received successfully (server reception OK; Normal reception)

(S920). In this step, the process stores the server receipt status in the storage area for storing the return information. Based on the stored information, the MFP control instruction is generated in S732 of FIG. 22, which is transmitted to the MFP 10 as the server receipt status in S734 of FIG. 23. This server receipt status is received by the MFP 10 in S312 of FIG. 12. Based on the thus received server receipt status, it is verified in the MFP 10 that the parameter need not be retransmitted (S334).

Next, the process notifies the session process of the completion of parameter input (parameter acquisition) (S922). This notification is received by the session process in S808 of FIG. 24.

When S922 is completed, the process waits until the MFP job instruction inquiry is received from the MFP 10. When the MFP job instruction inquiry is received (S924), the process output the service status information (S926) repeatedly until the UI job is terminated (completed) by another process (e.g., S844 of FIG. 25). In S926, the process stores the service status information in the storage for storing the return information. Based on the stored information, the MFP control instruction is generated in S732 of FIG. 22, which is transmitted to the MFP 10 in S734 of FIG. 23 as the service status information.

UI Job 2

Next, a UI job 2 which is executed in S804 of FIG. 24 will be described with reference to FIG. 27. The UI job 2 is executed when the function server 30 receives the job startup instruction from the session process when the parameters related to input devices of the MFP 10 is managed on the function server 30 side. In the following description, the step numbers which are similar to those of the UI job 1 are similar to the process in the UI job 1, and description thereof will be omitted for the brevity.

When the UI job 2 is started, first, the process waits for receipt of the MFP job instruction from the MFP 10, and upon receipt of the same (S902), the process returns the specification information request as the HTTP response (S930) to the MFP 10. The specification information request is received by the MFP 10 in S314 of FIG. 12, and the MFP 10 that received this request has transmitted the specification information in S320 by the MFP 10.

After the specification information request is returned, the process waits until the MFP 10 transmits the specification information as the HTTP request (S932), and based on the thus transmitted specification information, the service I/F information generating process is executed to generates the service I/F information 36 (S934). Then, the process proceeds to S904, where the process returns the parameter request associated with the thus generated service I/F information 36 as the HTTP response to the specification information.

Figure 28:
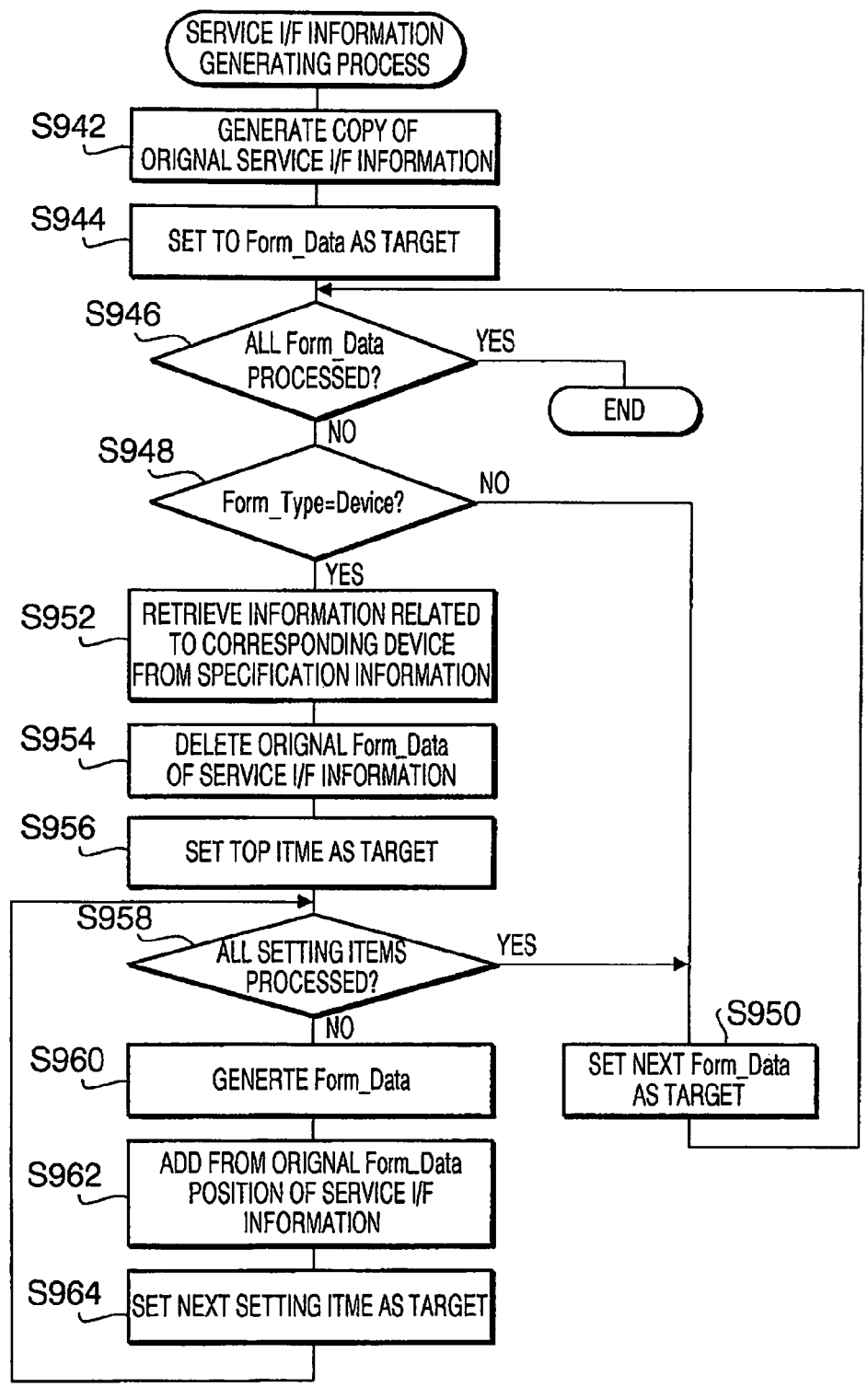
FIG. 28 shows a flowchart illustrating a service I/F information generating process executed by the function server according to aspects of the invention.

Next, the service I/F information generating process will be described with reference to FIG. 28.

Firstly, the process generates a copy of the service I/F information 36 to be transmitted to the MFP 10 (a template of the service I/F information) in S942, and "Form_Data" tag at the top of the service I/F information 36 is subjected to the following process (S944).

Next, the process judges whether all the "Form_Data" tags in the service I/F information 36 generated in S942 have been processed (S946). If not (S946: NO), the process checks whether "Form_Type" tag is sandwiched in the "Form_Data" tags and whether the value of the "Form_Type" tag indicates the input/output device (S948).

If the "Form_Type" tag is not sandwiched or the value of the "Form_Type" tag does not indicate the input/output devices (S948: NO), the process sets the next "Form_Data" tag as the tag subjected to be processed (S950), and returns to S946.

If in S948, the value of the "Form_Type" tag does not have the values indicative of the input/output device (S948: NO), the next "Form_Data" tag is subjected to be processed (S950), and returns to S946.

If the "Form_Type" tag has a value indicating the input/output device (S948: YES), the parameters related to the input/output devices are retrieved from the appropriate positions of the specification information received in S932 of FIG. 27 (information corresponding to "Device_Info") in S952. Specifically, the process retrieves a portion sandwiched by the "Device_Spec" tags in the "Device_Type" tag to which the values indicative of the input/output device are set.

Next, from the service I/F information 36 generated in S942, the process deletes the "Form_Data" tag which is currently subjected to be processed (S954). Then, from among parameters included in the portion retrieved in S952, the top parameter is subjected to be processed (S956).

Then, the process judges whether all the parameters retrieved in S952 have been processed (S958). If the all the parameters have not been processed (S958: NO), the "Form_Data" tag is generated based on the parameters subjected to be processed at this stage (S960), and the "Form_Data" tag is added at a position where the "Form_Data" was deleted in S954 (S964), and then, the next parameter is subjected to be processed (S964) and the process returns to S958.

If all the parameters have been processed (S958: YES), the process proceeds to S950. As above, steps S946-S964 area repeated until all the "Form_Data" tags are processed (S964: YES), then the process finishes the service I/F information generating process. As a result, in the service I/F information generating process, the service I/F information 36 as shown in FIG. 13 is generated. Next, in S904 of FIG. 27, the parameter request to which the generated service I/F information is added is transmitted to the MFP 10.

Scan Job

Next, a scan job process which is started in S812 of FIG. 24 will be described referring to FIG. 29.

When the scan job is started, the process waits until the MFP status information is received from the MFP 10. When the MFP status information is received (S1002), the error counter is initialized (S1004) as in S906 of FIG. 26, and the MFP parameter is output (S1006). The MFP status information received in S1002 is the HTTP request transmitted from the MFP 10 in S408 of FIG. 20. In response to the MFP status information, the process returns the MFP parameters as the HTTP response in S1006. The MFP parameter has been received in S908 of FIG. 26, and is a parameter corresponding to the MFP 10, which is the transmission source of the MFP status information received in S1002.

From the MFP 10 that received the MFP parameter, the MFP reception status indicating whether the MFP parameter was received successfully is transmitted from the MFP 10. Therefore, based on the MFP reception status, the process judges whether MFP parameter has been received successfully (S1008). Specifically, if the MFP reception status indicates the abnormal reception (NG), the process determines that the reception was failed, and if the normal reception (OK) is indicated, the process determines that reception has been performed successfully.

If it is determined that the MFP parameter has not been received successfully by the MFP 10 (S1008: NO), the process judges whether such a situation has occurred consecutively by a predetermined number of occurrence (twice in this illustrative embodiment) is checked, referring to the value of the error counter (S1010). If such a situation has not occurred consecutively by the predetermined number of times (S1010: NO), the process increments the error counter (S1012), and returns to S1006.

If the state where the parameter has not been received successfully occurs consecutively by the predetermined number of times (S1010: YES), the process notifies the session process of the termination (completion) of the scan job (S1014), and outputs the notification instruction indicating the abnormal completion as the service status information (S1016). This notification in S1014 is received by the session processing in S818 of FIG. 24. In S1016, the process stores the notification instruction in the storage area for storing the return information. Based on the thus stored information, the MFP control instruction is generated in S732 of FIG. 22, which is transmitted to the MFP 10 as the notification instruction in S734 of FIG. 23. The notification instruction is received by the MFP 10 in S410 of FIG. 20. In the MFP 10, it is determined that the completion instruction is received (S412: YES) based on the instruction transmitted in S1014 of FIG. 29 and received in S818 of FIG. 24.

If it is determined that the MFP parameter has been received successfully by the MFP 10 (S1008: YES), it is determined that scanner (reading unit 13) preparation has been completed in the MFP 10, and the process notifies the session process of the completion of the scanner preparation (S1018). The notification is received by the session process in S816 of FIG. 21.

Next, the process outputs an input data request requesting for the transmission of data to be processed by the function server 30 (S1018). That is, the process stores the input data request in the storage area for storing the return information (S1020). Based on the stored data, the MFP control instruction is generated in S732 of FIG. 22, which is transmitted to the MFP 10 as the input data request in S734 of FIG. 23. The input data request is received by the MFP 10 in S420 of FIG. 20, and then, the user operates the MFP 10 and the input data is transmitted from the MFP 10.

When the input data is received from the MFP 10, which received the input data request (S1022), if reception of the input data is completed normally (S1024: YES), a notification instruction indicating normal completion is output as the service status information (S1026), and then, the scan job is completed. In S1026, the process stores the notification instruction in the storage area for storing the return information. Based on the stored information, the MFP control instruction is generated in S732 of FIG. 22, which is transmitted as the notification instruction to the MFP 10 in S734 of FIG. 23. The notification instruction is received by the MFP 10 in S432 of FIG. 20.

If reception of the input data has not been completed normally (S1024: NO), the process proceeds to S1016, outputs the notification instruction indicating the abnormal completion as the service status information, and completes the scan job. The notification instruction is received by the MFP 10 in S423 of FIG. 20.

Print Job

Figure 30:
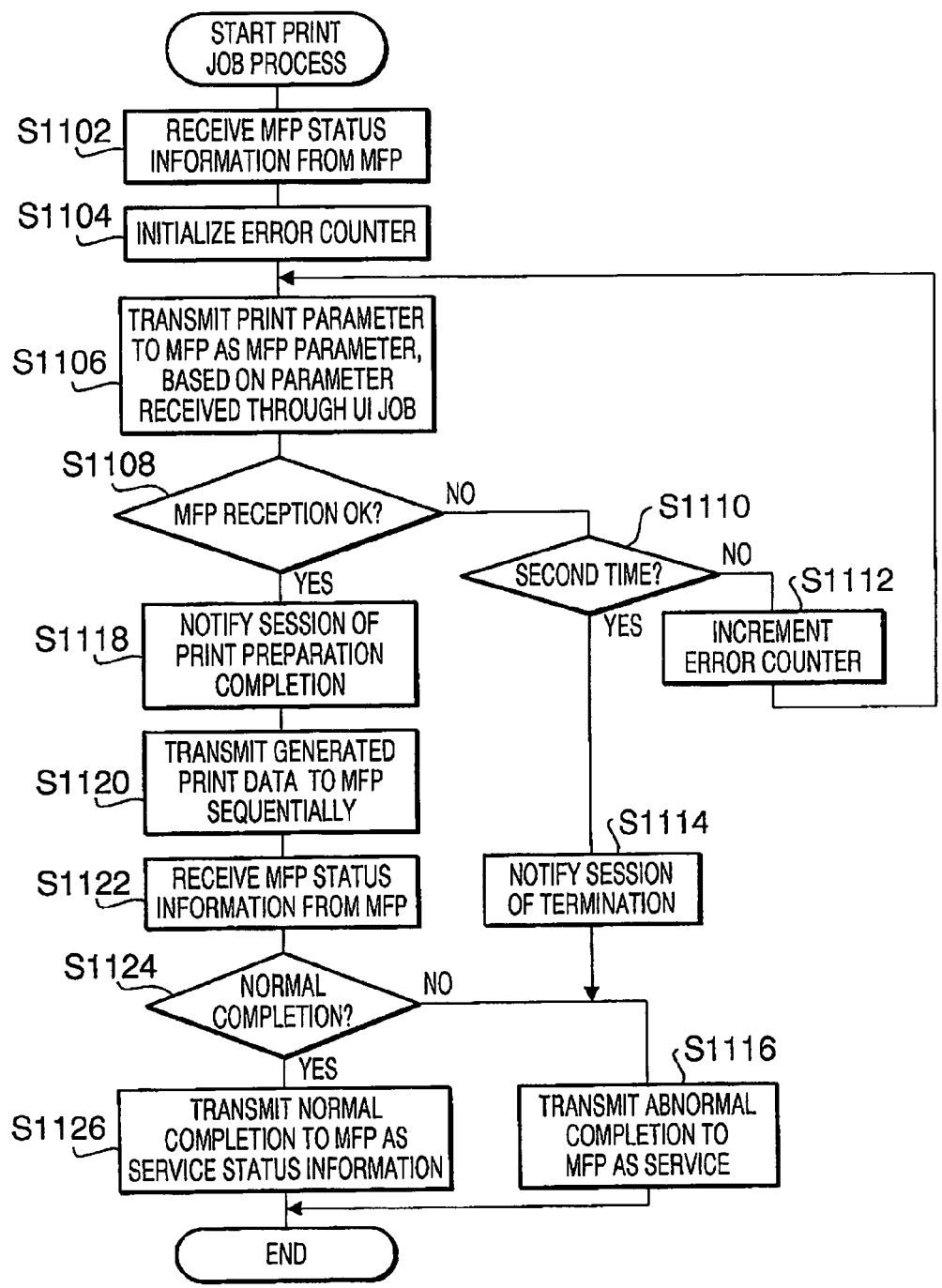
FIG. 30 shows a flowchart illustrating a print job executed by the function server according to aspects of the invention.

Next, the print job processing which is started in S820 of FIG. 24 will be described referring to FIG. 30.

When print job is started, the process waits until the MFP status information is received from the MFP 10. When the MFP status information is received (S1102), the error counter is initialized (S1104) as in S906 of FIG. 26, and then, the MFP parameter is output (S1106). The MFP status information received in S1102 is the HTTP request transmitted from the MFP 10 in S508 of FIG. 21, and the MFP parameter is returned in response to the HTTP request, as the HTTP response, in S1106. The MFP parameter is received in S908 of FIG. 26, and is a parameter corresponding to the MFP 10 which is the transmission source of the MFP status information received in S1102.

Figure 29:
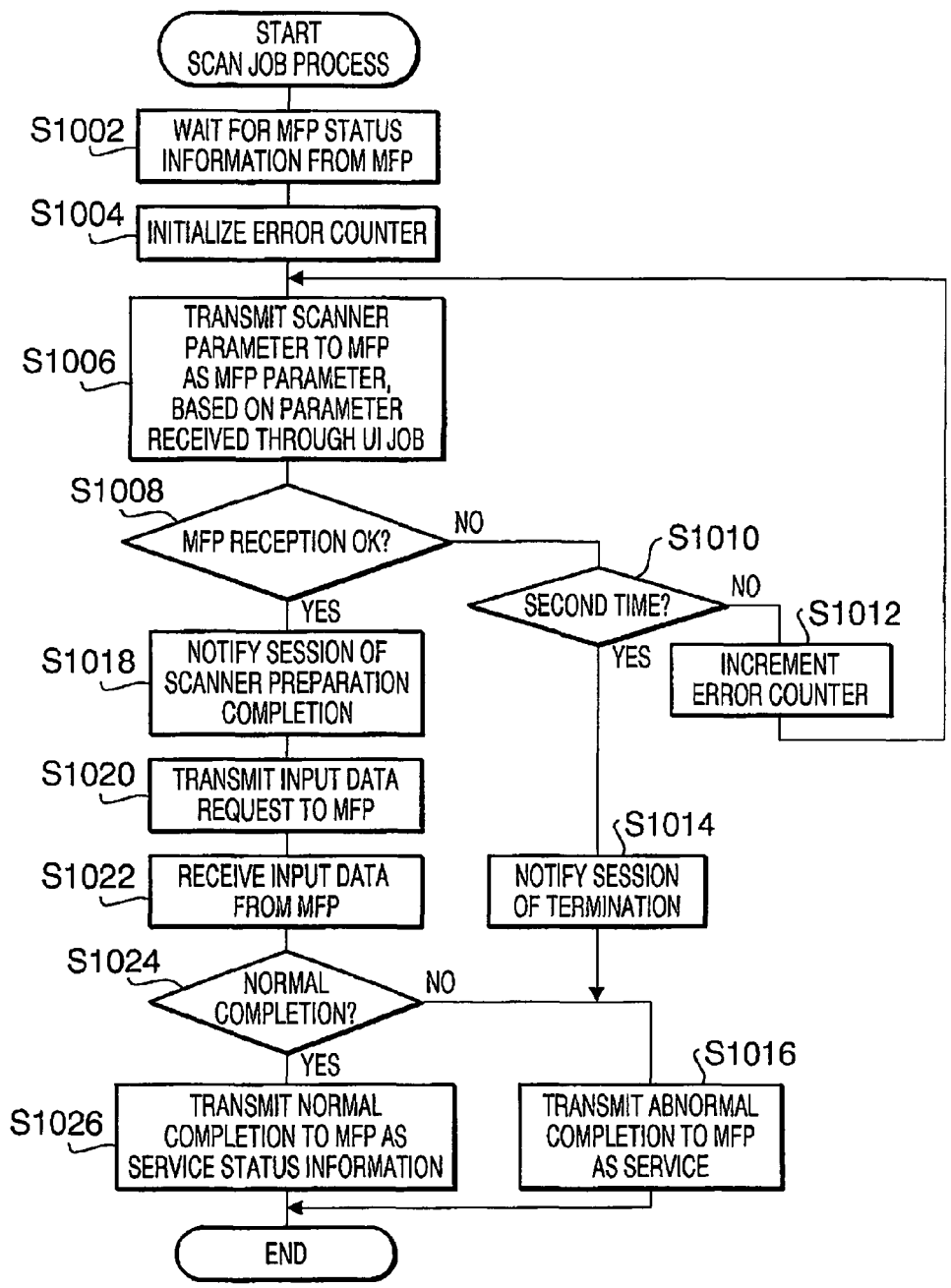
FIG. 29 shows a flowchart illustrating a scan job executed by the function server according to aspects of the invention.

Since the MFP reception status indicating whether the MFP parameter was received successfully is transmitted from the MFP 10 which received the MFP parameter, the process judges whether the MFP parameter has been received successfully by the MFP 10 (S1108) in accordance with the MFP reception status, as in S1008 of FIG. 29.

If it is determined that the MFP parameter has not been received successfully by the MFP 10 (S1108: NO), the process judges whether such a situation has occurred consecutively by a predetermined number of times (twice in the illustrative embodiment) based on the value of the error counter (S1110). If such a situation has occurred consecutively by the predetermined number of times (S1110: NO), the process increments the error counter (S1112) and returns to S1106.

If a state where the parameter cannot be received successfully occurs consecutively by the predetermined number of times (S1110: YES), termination (completion) of the print job is notified to the session process (S1114), and then, a notification instruction indicating an abnormal completion is output as the service status information (S1116). This notification in S1114 is received by the session processing in S826 of FIG. 24. Further, in S1116, the notification instruction is stored in the storage area for storing the return information. Based on the stored information, the MFP control instruction is generated in S732 of FIG. 22, which is transmitted to the MFP 10 as the notification instruction in S734 of FIG. 23. This notification instruction is received by the MFP 10 in S510 of FIG. 21. In the MFP 10, the process is determined to be finished (S512: YES) based on the information transmitted in S1114 of FIG. 30, and receive in S826.

If it is determined that the MFP parameter has been received successfully by the MFP 10 (S1108: YES), the process determines that preparation for printing (by the recording unit 14) has been completed in the MFP 10 upon receipt of the MFP parameter, and completion of print preparation is notified to the session process (S1118). This notification is received by the session process in S824 of FIG. 24. In the session process, in response to receipt of this notification, steps S828 through S836 of FIG. 25 are performed and print data is transmitted.

Next, the process converts the print data generated in the session process (S832 of FIG. 22) in to print data that can be processed by the MFP 10, and stores the converted to data in the storage area for storing the transmission information (S1120). Here, based on the image data stored in the storage area in S832 of FIG. 25, the MFP 10 generates a print command that can be output. Then the process stores the print command in the storage area for storing the return information together with the job ID and the communication address. Based on the thus stored information, the MFP control instruction is created in S732 of FIG. 22, which is transmitted to the MFP 10 as the output data in S734 of FIG. 23. The output data is received by the MFP 10 in S520 of FIG. 21. Based on the output data, the recording unit 14 forms (prints) the image represented by the output data.

Figure 21:
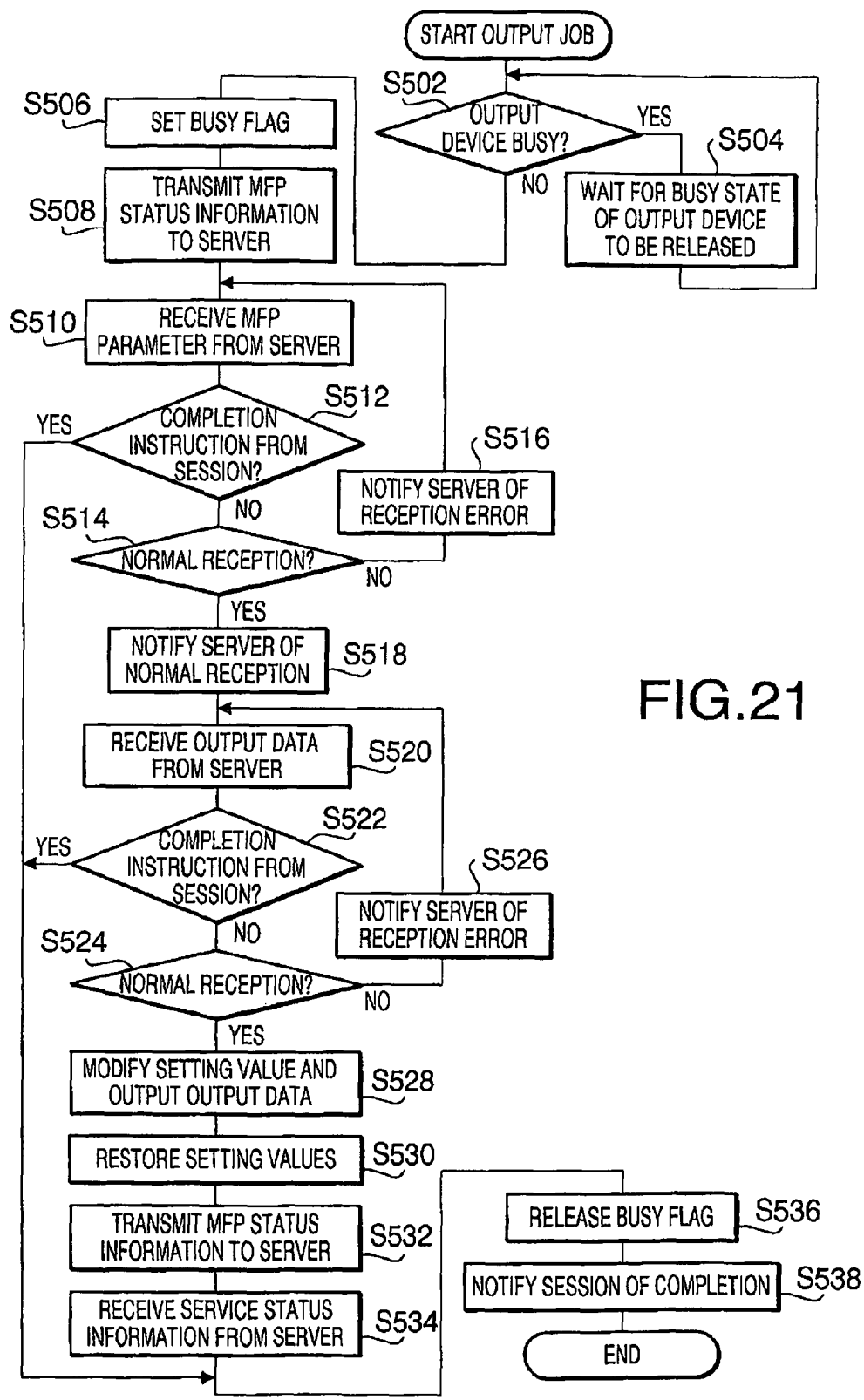
FIG. 21 is a flowchart illustrating an output job executed by the MFP according to aspects of the invention.

The MFP 10, which received the print data, transmits the MFP status information as the HTTP request (S532 of FIG. 21).

When the MFP status information is received from the MFP 10 that received the print data (S1122), if the MFP status information has been received successfully (S1124: YES), the process outputs the notification instruction indicating the normal completion as the service status information (S1126), and finishes the print job. In S1126, the notification information is stored in the storage area for storing the return information. Based on the stored information, the MFP control instruction is generated in S732 of FIG. 22, which is transmitted to the MFP 10 as the notification instruction (S734 of FIG. 23). The notification instruction is received by the MFP 10 in S534 of FIG. 21.

If the reception of MFP status information has not been completed successfully (S1124: NO), the process proceeds to S116, where the process outputs the notification instruction indicating the abnormal completion as the service status information, and then completes the print job. This notification instruction is received by the MFP 10 in S534 of FIG. 21.

In the service providing system according to the illustrative embodiment configured as above, the MFP 10 realizes its function by receiving the service from the function server 30. The function has been transmitted in S360-S386 (FIG. 15) after being designated by the user, and is realized based on the parameters received from the function server 30 in S410 of FIG. 20 or S510 of FIG. 21. Therefore, the system is applicable even in an environment where the services may increase/decrease irregularly as in a general server on the Internet.

If the information regarding a new service is to be registered with the MFP 10 as in a conventional configuration, and the services increase/decrease irregularly, if the specification of the parameter for executing the service is changed later, even if the information regarding the new service is registered with the MFP 10, it becomes impossible to receive such a service. In order to deal with such a situation, the parameter setting procedure due to change of the specification may be managed by the MFP 10. However, in such a configuration, burden to the MFP 10 becomes large, which is undesirable.

According to the above-described illustrative embodiment, the parameters designated by the user of the MFP 10 can be obtained from the function server 30, even if the specification of the parameters may be changed, and the burden to the MFP 10 can be suppressed.

Further, when the parameters are obtained, based on the service I/F information 36, the MFP 10 generates the parameter input window for allowing the user to designate the parameters from among the parameters corresponding to the function itself (S360 of FIG. 15), while in S362 and S364, by the method specified by the service I/F information 36. The parameter input windows allow the user to designate the parameters corresponding to the function of the MFP 10.

Therefore, in the parameter input window, ones corresponding to the function which cannot be executed by the MFP 10 will not be entered. Further, when the parameters corresponding to the designated function are indicated, the parameter input window may be configured such that the user can select the parameters with which the MFP 10 sufficiently functions. Then, relatively appropriate parameters can be designated by the user.

Figure 15:
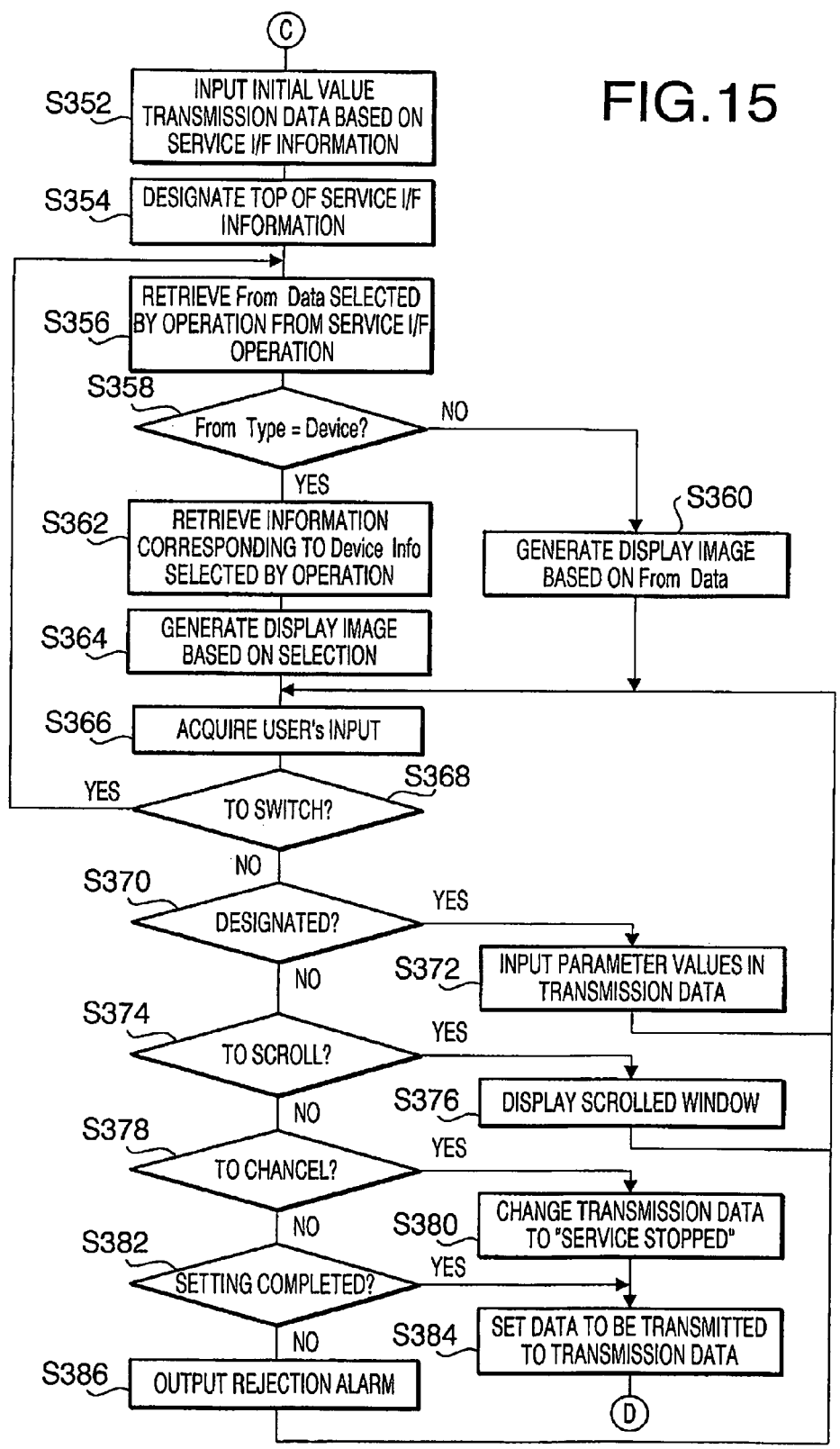
FIG. 15 is a flowchart illustrating the UI job executed by the MFP according to aspects of the invention.

The MFP 10 may allow the user to designate parameters after S352 of FIG. 15, at a timing when the parameter request is received in S314 of FIG. 12.

According to the illustrative embodiment, when the user selects the parameters, the user can designate the parameters from among the displayed parameters. Therefore, the user can designate desired parameters when confirming the indication.

If the parameters regarding the input/output device of the MFP 10 are managed on the function server 30 side, it is possible that the management thereafter can be performed by the function server 30. Therefore, it is unnecessary for the MFP 10 to store the parameters or it is unnecessary to generate the service I/F information 36. Therefore, the burden to the MFP 10 is well suppressed. Further, in such a case, the MFP 10 can generate the parameter input window based on the service I/F information 36 obtained from the function server 30. Therefore, the method for generating the parameter input window need not be managed by the MFP 10 itself. Furthermore, even if the method/process of generating the parameter input window is modified, the MFP 10 can easily follow the changes without a particular measure therefor.

Figure 26:
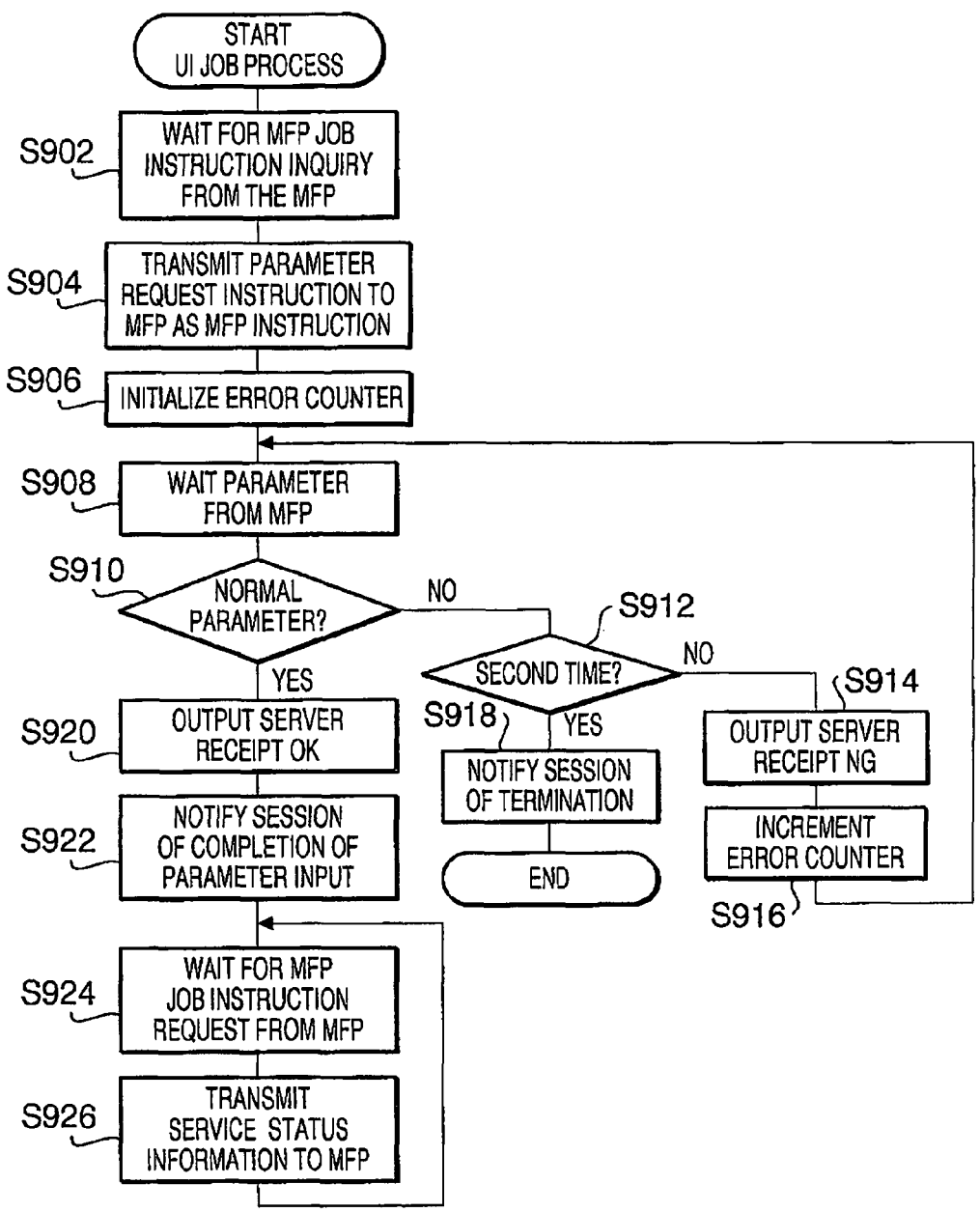
FIG. 26 shows a flowchart illustrating a UI job 1 executed by the function server according to aspects of the first embodiment of the invention.

If the MFP 10 is configured to manage the parameters regarding the input/output devices of the MFP 10, the function server 30 need not manage the parameters of the MFP 10 since such parameters can be obtained from the MFP 10 in S908 of FIG. 26. Thus, in such a configuration, even if the MFPs 10 are employed, the amount of data to be managed (or memorized) by the function server 30 will not increase.

If the MFP 10 is configured to manage the parameters regarding the input/output device of the MFP 10, the parameter input window is generated in S362 and S364 of FIG. 15. In this case, in order to generate the parameter input window allowing the user to designate parameters corresponding to the functions of the MFP 10, it is not necessary to have the function server 30 generate the service I/F information 36 corresponding thereto. Thus, the burden to the function server 30 in generating the service I/F information 36 can be suppressed. Such a suppression of the burden is particularly effective when the function server 30 is managed in the network on which the MFPs 10 are provided.

Second Embodiment

Entire Configuration

Hereinafter, an image processing system according to a second illustrative embodiment will be described.

Figure 31:
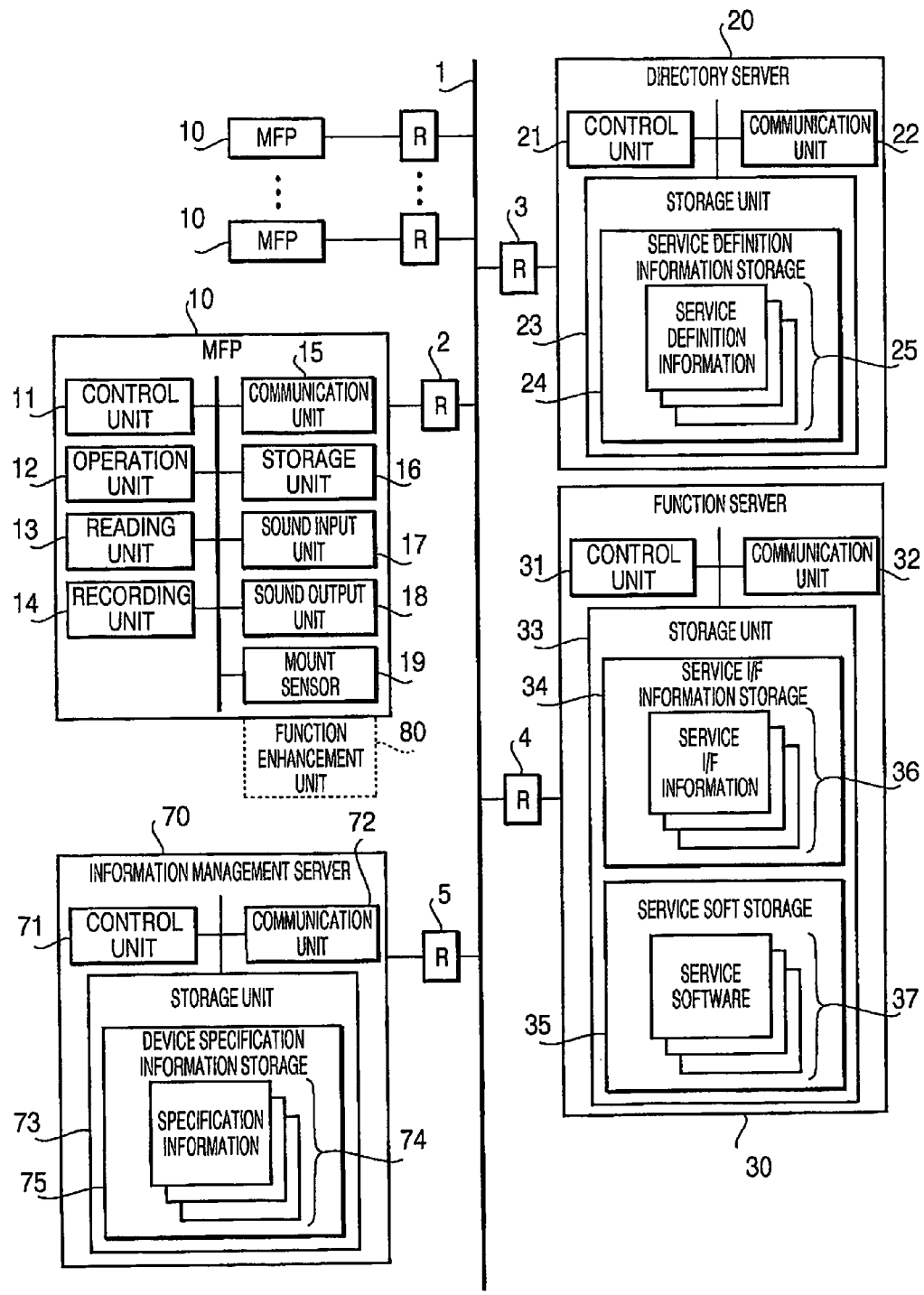
FIG. 31 is a block diagram showing a configuration of an image processing system according to a second illustrative embodiment.

The image processing system according to the second embodiment includes, as shown in FIG. 31, an MFP 10, a directory server 20, a function server 30. In addition to the above, the image processing system includes an information management server 70, which is connected to the network 1 via a router 5. Further, in this second embodiment, MFPs 10 are connected to the network 1.

The MFP 10 according to the second embodiment includes a function enhancement unit 80, which is detachably coupled to the MFP 10, and a mount sensor 19 for detecting that the function enhancement unit 80 is attached to the MFP 10. The mount sensor 19 is configured to output detection results corresponding to the type of the function enhancement unit 80 coupled to the MFP 10.

The function enhancement unit 80 in this illustrative embodiment may be a duplex printing unit enabling the MFP 10 to print images on both sides of the sheet-type recording medium, a sheet feed unit functioning to feed types of sheet-type recording medium to the recording unit 14, and a sheet discharge unit capable of separating different types of sheet-type recording medium on which images are formed by the recording unit, and discharging the same.

The information management server 70 includes a control unit 71, a communication unit 72 and a storing unit 73.

The control unit 71 includes a CPU, a ROM, and a RAM. The CPU controls the entire operation of the information management server 70 in accordance with programs stored in the ROM.

The communication unit 72 connects the information management server 70 to the network 1, and via the network, the communication unit 72 receives/transmits data.

The storage unit 73 includes a hard disk drive (not shown), and stores data on the hard disk. The storage unit 73 includes a device specification information storing unit 75 for storing specification information 74, which will be described later.

Process by MFP 10 (Second Embodiment)

Hereinafter, various processes executed by the control unit 11 of the MFP 10 will be described. Since the configuration of the MFP 10 according to the second illustrative embodiment is close to that of the first illustrative embodiment, only the differences with respect to the first embodiment will be described in detail.

MFP Process

Firstly, the MFP process which is repeatedly executed by the control unit 71 after the MFP 10 is started up will be described with reference to FIG. 32. As mentioned above, the processes and steps similar to those of the first illustrative embodiment are indicated by the same reference numbers (step numbers) and description thereof will be omitted for brevity.

When the MFP process is started up, the process executes the initializing process (S102). In the initializing process, a process including an updating process (described later) is executed as the initializing process.

After the initialization process is finished, the process transmits the specification information of the MFP 10 itself to the information management server 70 (S154), and proceeds to S158. In S154, the specification information which is stored in the storage unit 16 is transmitted to a predetermined address of the information management server 70 together with the predetermined identification information of the MFP 10.

Next, the process starts up the specification updating process (described later) in S158. The specification information updating process is a process for updating the specification information when an event requiring update of the specification information is occurring, and detailed procedure will be described later.

After the specification information updating process is started, the process proceeds to S104, and the process similar to that executed in the first illustrative embodiment is executed.

Updating Process

Next, the updating process started up in S102 of FIG. 32 will be described with reference to FIG. 33.

When the updating process is started, the process opens a port for connecting with a server (not shown) that provides the firmware, and enabling the connection with the server via the network 1 (S102). It should be noted that, in the second illustrative embodiment, the server is configured to establish a connection with the specific port of the terminal device and start transmitting the firmware, when the latest firmware is to be transmitted to the terminal device.

Next, the process pauses until the communication is established with the server (S1204: NO). When the connection is established with respect to the server (S1204: YES), the process receives data transmitted from the server (in this illustrative embodiment, the data representing the firmware) in S1206.

Next, the process judges whether the data received in S1206 is the data to be used for updating the data of the MFP 10 (S1208). In this illustrative embodiment, if the version of the firmware written in a memory (flash memory) of the control unit 11 is older than the version of the firmware represented by the data received in S1206, it is determined that the received data is to be used for updating.

If it is determined that the data is used for updating (S1208: YES), the process stores the received data in the memory of the control unit 11 (i.e., updates the firmware represented by the received data) in S1210, and then reboots the MFP 10 itself in S1212, and finishes the updating process.

Specification Information Updating Process

Figure 34:
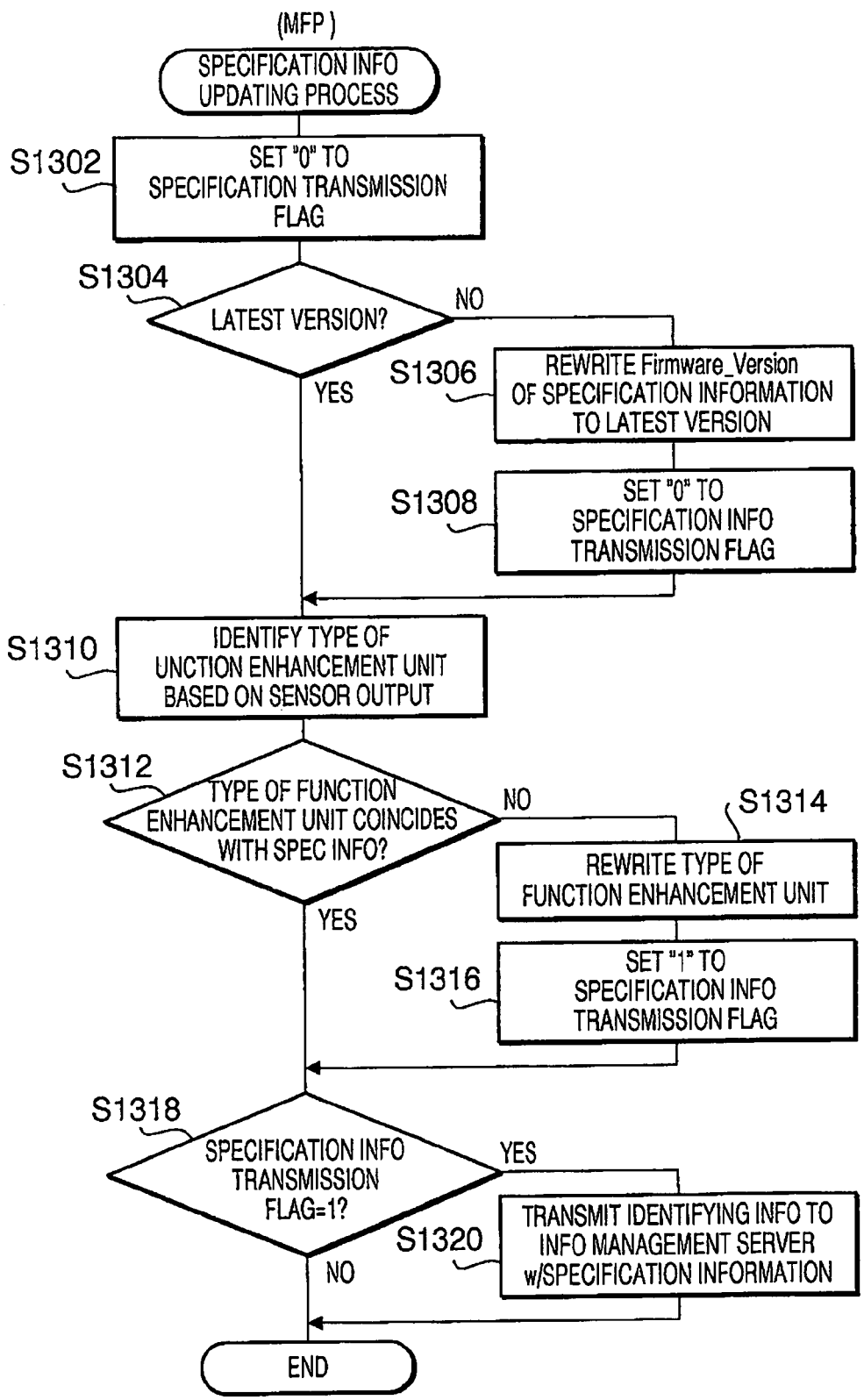
FIG. 34 shows a flowchart illustrating a specification information updating process executed by the function server according to the second embodiment.

Next, the specification information updating process which is started up in S158 of FIG. 32 will be described with reference to FIG. 34.

When the specification information updating process is started, the process sets the specification information transmission flag to zero (S1302).

Next, the process judges whether, among the setting items represented by the specification information stored in the storage unit 16, the item representing the version of the firmware coincides with the version of the firmware stored in the memory of the control unit 11 (S1304). In this illustrative embodiment, as the specification information, the item representing the firmware version (i.e., "Firmware_Version" tag), an item representing the type of the function enhancement unit 80 (i.e., "Option_Info" tag) are included in addition to the items described in the first embodiment, as shown in FIG. 35. In S1304, among the specification information, the portion sandwiched by the "Firmware_Version" tags is retrieved, and is compared with the version of the firmware written in the memory of the control unit 11.

If the item representing the firmware version of the specification information does not coincide with the firmware version in the memory (S1304: NO), the process rewrites the item representing the firmware version in the specification information (i.e., the value of the "Firmware_Version" tag) with the value of the version of the firmware stored in the memory (S1306), sets the specification information transmission flag to one (S1308), and proceeds to S1310.

If the item representing the firmware version of the specification information coincides with the version of the firmware written in the memory (S1304: YES), the process skips S1306 and S1308, and proceeds to S1310.

Next, based on the detected status of the mount sensor 19, the type of the function enhancement unit 80 coupled to the MFP 10 is identified (S1310). It should be noted that if the function enhancement unit 80 is not coupled to the MFP 10, "no unit" is detected to be coupled.

Then, the process judges whether an item representing the function enhancement unit 80 coupled to the MFP 10 among the set items represented by the specification information stored in the storage unit 16 coincides with the type of the function enhancement unit 80 identified in S1310 (S1312). Specifically, the process retrieves a portion sandwiched between the "Option" tags in the "Option_Info" section, which represents the item corresponding to the function enhancement unit 80 coupled to the MFP 10, and judges whether the retrieved value coincides with the type identified in S1310.

If it is determined that the item representing the type of the function enhancement unit 80 represented by the specification information does not coincide with the type identified in accordance with the detection result of the mount sensor 19 (S1312: NO), the process rewrites the item representing the type of the function enhancement unit 80 in the specification information with the type identified in S1310 (S1314), sets the specification information transmission flag to one (S1316), and proceeds to S1318.

If it is determined that the item representing the type of the function enhancement unit 80 represented by the specification information coincides with the type identified in accordance with the detection result of the mount sensor 19 (S1312: YES), the process skips S1314 and S1316, and proceeds to S1318.

Then, the process judges whether the specification information transmission flag is set to one (1) in S1318. If the flag is set to one (S1318: YES), the process transmits the specification information to the information management server 70 together with the identification information of the MFP 10 (S1320), and finishes the information updating process. In this step, a predetermined ID of the MFP 10 (a unique ID) is transmitted as the indemnification information together with the specification information.

If the specification information transmission flag is set to zero (0) (S1318: NO), the process skips S1320 and finishes the specification information updating process.

Session Process

In the session process according to the second illustrative embodiment, when the service is started based on the "Link_Location of the service definition information 25 (S202), the service startup instruction to be transmitted to the service address is transmitted to the function server 30 with the identification information (unique ID) of the MFP 10 being added. The identification information added to the service startup instruction is received in the function server process shown in FIG. 22 with the service startup instruction, and is referred to in the UI job after the session process shown in FIG. 24 is executed.

The process then proceeds to S204, and thereafter, processes similar to those executed in the first embodiment are executed.

Process by Function Server 30

Next, various processes executed by the control unit 31 of the function server 30 will be described. Since the processes are mostly close to those of the first embodiment, only the different portions will be described.

UI Job

Figure 24:
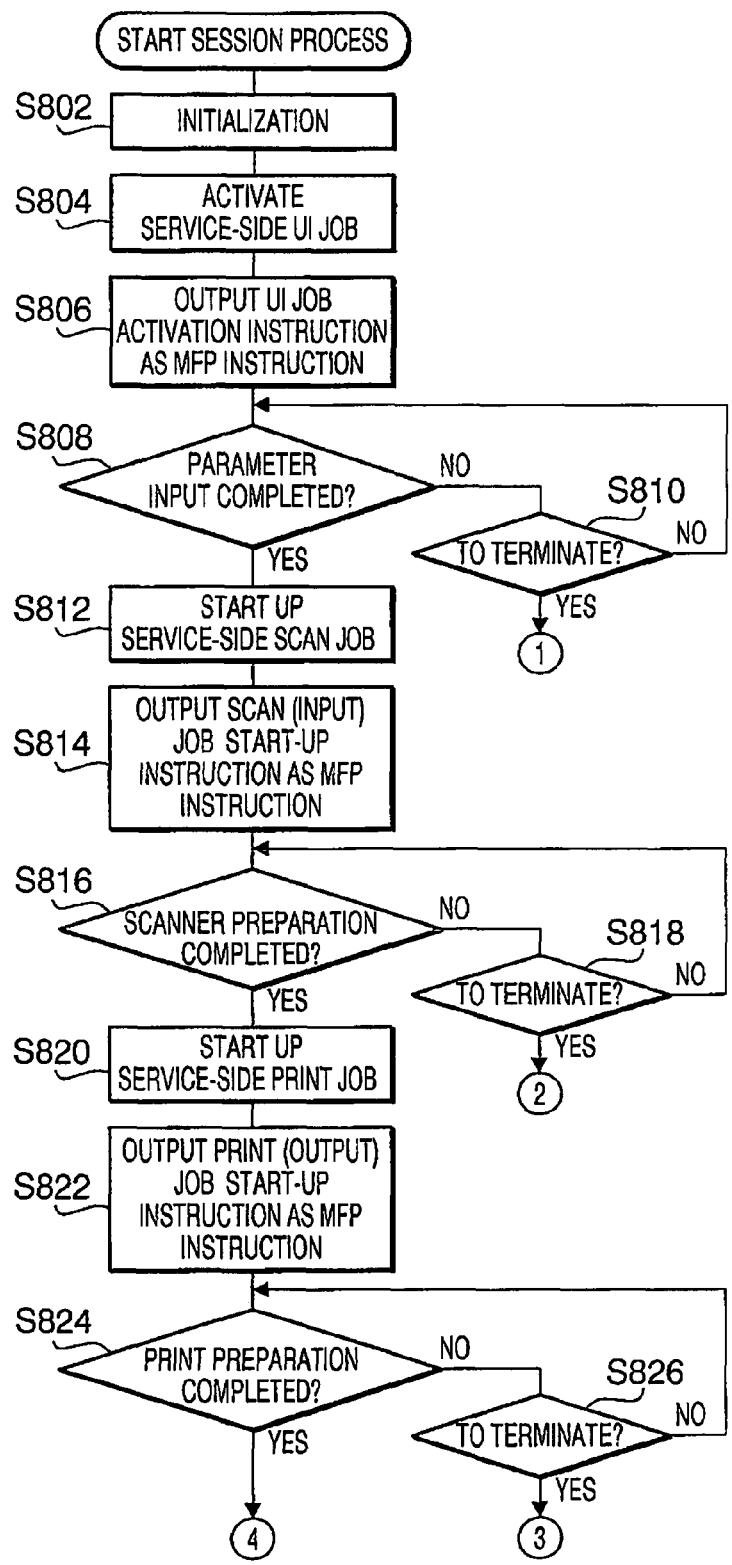
FIGS. 24 and 25 show a flowchart illustrating a session process executed by the function server according to aspects of the invention.
Figure 25:
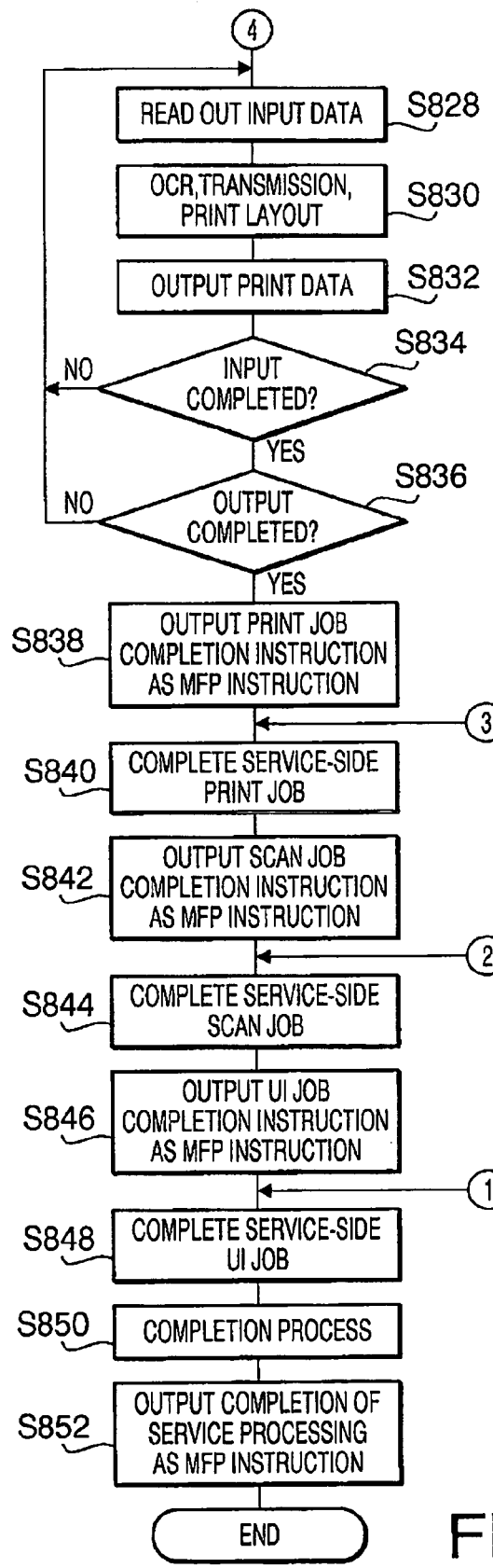

The UI job according to the second embodiment is started in S804 of FIG. 24. In the first embodiment, depending on whether the function server 30 manages the parameters regarding the input device of the MFP 10, the UI job 1 or the UI job 2 is selectively executed. In the second embodiment, only the single UI job described below is started. Note that the steps same as those of the UI job 1 and UI job 2 are indicated by the same step numbers, and detailed description thereof are omitted.

Figure 36:
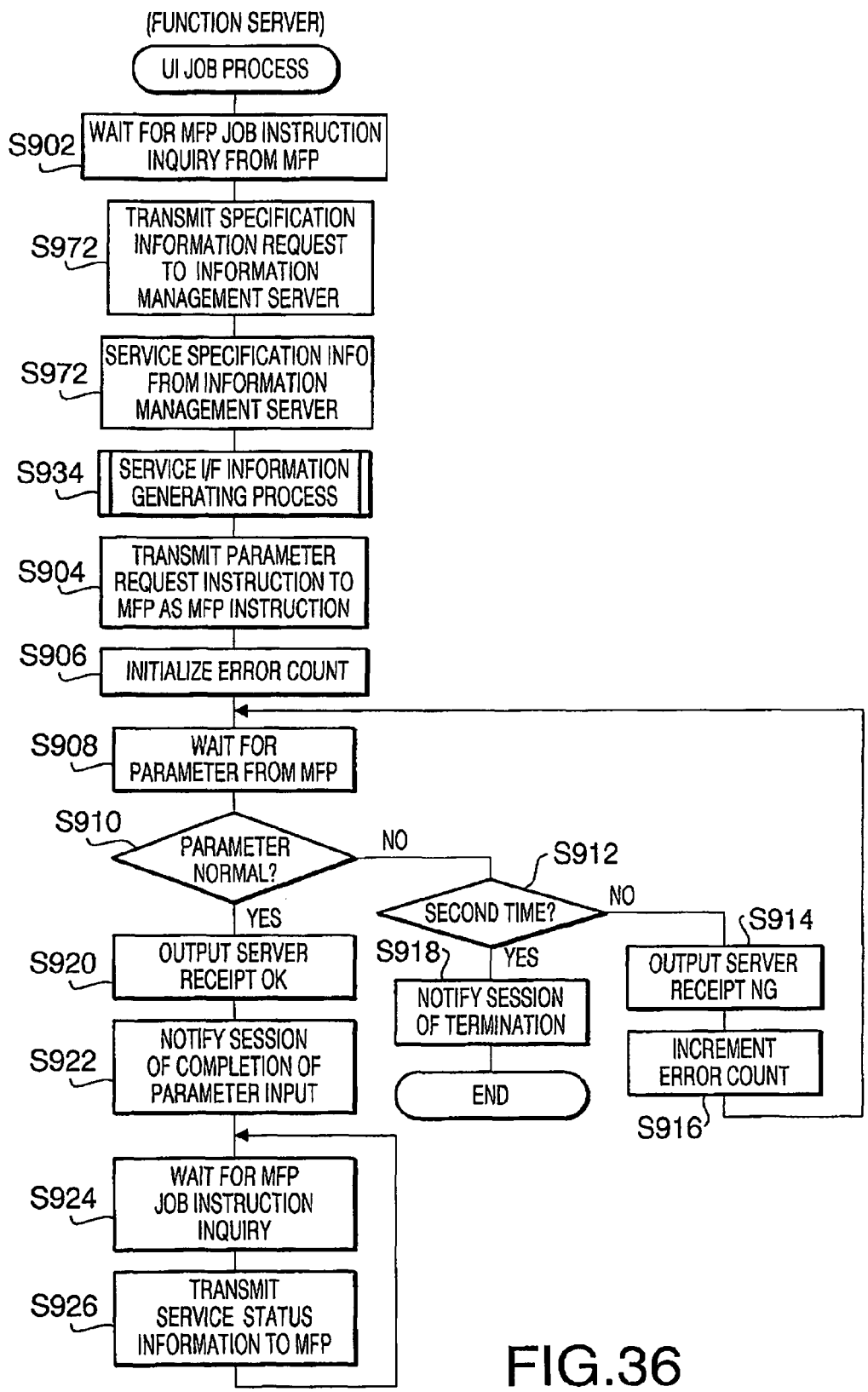
FIG. 36 shows a flowchart illustration the UI job executed by the function server according to the second embodiment.

When the UI job is started, as show in FIG. 36, the process pauses until the process receives the MFP job instruction inquiry from the MFP 10. When the MFP job instruction inquiry is received (S902), the process transmits, in S972, the specification information request which requests the specification information on the MFP 10 that is the transmission source of the MFP job instruction inquiry received in S902. In this embodiment, for the identification information added to the service startup instruction which has been received in S702 prior to startup of the UI job, the specification information request that requests for the specification information of the MFP 10 identified by the identification information, which is transmitted to the information management server 70. When the specification information request is received, the information management server 70 returns the specification information on the MFP 10 that is identified by the identification information.

When the specification information request is transmitted, and the specification information is returned from the information management server 70 (S974), the process proceeds to S934. Thereafter, the processes are similar to those of the UI job 1 and UI job 2.

Information Management Server Process by Information Management Server 70

Hereinafter, the information management server process, which is executed by the control unit 71 of the information management server 70, after the information management server 70 is started up will be described with reference to FIG. 37.

When the information management server process is started, the process pauses until data is received from outside (S1402). When data is received, the process judges whether the received data is the specification information transmitted from the MFP 10 (S1404). The specification information is transmitted in S154 of FIG. 32 or S1320 of FIG. 34 from the MFP 10.

If it is determined that the received data is the specification information transmitted from the MFP 10 (S1404: YES), the process registers the thus received specification information (S1406), and returns to S1402. In S1406, the specification information is registered such that the specification information received in S1402 is stored in association with the identification information (unique ID) received together with the specification information in the device specification information storage unit 75 of the storage unit 73. It should be noted that, if the received identification information is the same as the stored identification information, the specification information corresponding to the identification information is to be updated to the new specification information which has been received together with the identification information.

If it is determined that the received data is not the specification information (S1408: NO), the process judges whether the data is the specification information request transmitted from the function server 30 (S1408). The specification information request is transmitted from the function server 30 in S972 of FIG. 36.

If it is determined that the received data is the specification information request from the function server 30 (S1408: YES), the process transmits the specification information as requested to the function server 30 (S1410), and returns to S1402. In S1410, based on the identification information corresponding to the specification information request, the specification information stored in the device specification information storage unit 75 in relation with the identification information is retrieved, and the thus retrieved specification information is returned to the function server 30.

If it is determined that the received data is not the specification information request (S1408: NO), the process executes processing corresponding to the received data (i.e., other process) in S1412, and returns to S1402.

According to the image processing system described above, in addition to the advantages similar to those of the first embodiment, the following advantages are also obtained.

For example, the function server 30 requests the information management server 70 for the specification information on the MFP 10 (S972 of FIG. 36), and based on the specification information transmitted in response to the request, generates the service I/F information 36. Therefore, the function server 30 need not manage the specification information on MFPs 10. Therefore, even if there are MFPs on the network, the amount of data to be managed by the function server 30 will not increase.

Even if new functions are added to the MFP 10, or the function is enhanced later (e.g., by update of the firmware), only by updating the specification information correspondingly on the information management server 70, the entire system can deal with the change of the function of the MFP 10.

According to the configuration of the second embodiment, since the specification information on the MFP 10 is integrally managed on the information management server 70, it is only necessary that the specification information is stored in the information management server 70. Therefore, different from a system in which the function server 30 manages the specification information, even if there are multiple function servers on the system, only the information management server 70 may store the specification information, and it is unnecessary to have each of the multiple function servers 30 store the specification information. Accordingly, it is unnecessary to notify the multiple function servers 30 of the specification information, and the burden (traffic and processing) regarding the notification of the specification information by the MFP 10 can be suppressed.

Figure 37:
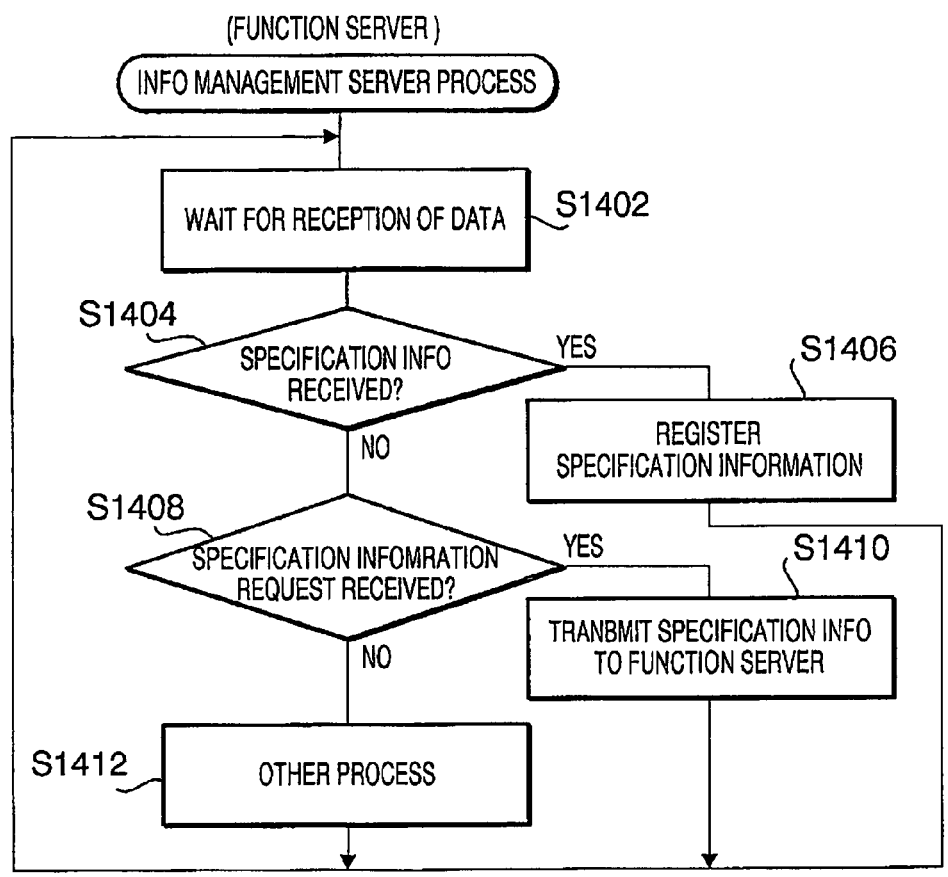
FIG. 37 shows a flowchart illustrating an information management server process executed by the function server according to the second embodiment.

Further, according to the above configuration, the information management server 70 can manage the specification information of the MFP 10 by receiving the notification from the MFP 10 and storing the specification information in the storage unit 73 (S1406 of FIG. 37). Further, the specification information thus registered can be transmitted to the function server 30 in response to a request therefrom (S1410 of FIG. 37).

Still further, in the configuration above, the MFP 10 can indicate the specification information at a predetermined timing after the MFP 10 is started up. Specifically, when the specification information in the MFP 10 is modified (S1304, S1312 or S1320 of FIG. 34), or immediately after the MFP 10 is started up, the specification information can be indicated.

Therefore, in the former case, when the MFP 10 is utilized, when the specification information is changed by modifying/updating the functions, the specification information is notified every time when such a modification/update is made. Further, the specification information of the MFP 10 can be registered with the information management server 70 by notification thereof. Further, in this case, the MFP 10 indicates the specification information only when it is modified, and it is not executed every time when the MFP 10 requests the function server 30 for a service. Therefore, the communication burden (traffic and process) between the MFP 10 and the function server 30 when the MFP 10 requests the function server 30 for a service can be suppressed.

In the latter case, when the MFP 10 is first started up, the specification information thereof is not registered with the information management server 70. However, when the MFP 10 is started up, the specification information is indicated automatically. Therefore, even the specification information of a newly started MFP 10 can be registered via the notification. Further, also in this case, the communication burden between the MFP 10 and the function server 30 when the MFP 10 receives a service from the function server 30 can be suppressed.

It should be noted that the configurations according to the embodiments is only an illustrative one and can be modified in various ways.

For example, in the second embodiment, the MFP 10 is used as the image processing device. However, the MFP 10 is only an example, and any imaging device which can receive the service from the function server 30 can be employed in the system. Such devices may include a printer, a scanner, a facsimile device, and the like.

In the illustrative embodiments described above, the parameter input window is generated in S362 or S364 of FIG. 15. However, the method of generating the parameter input window need not be limited to the method described above.

Figure 27:
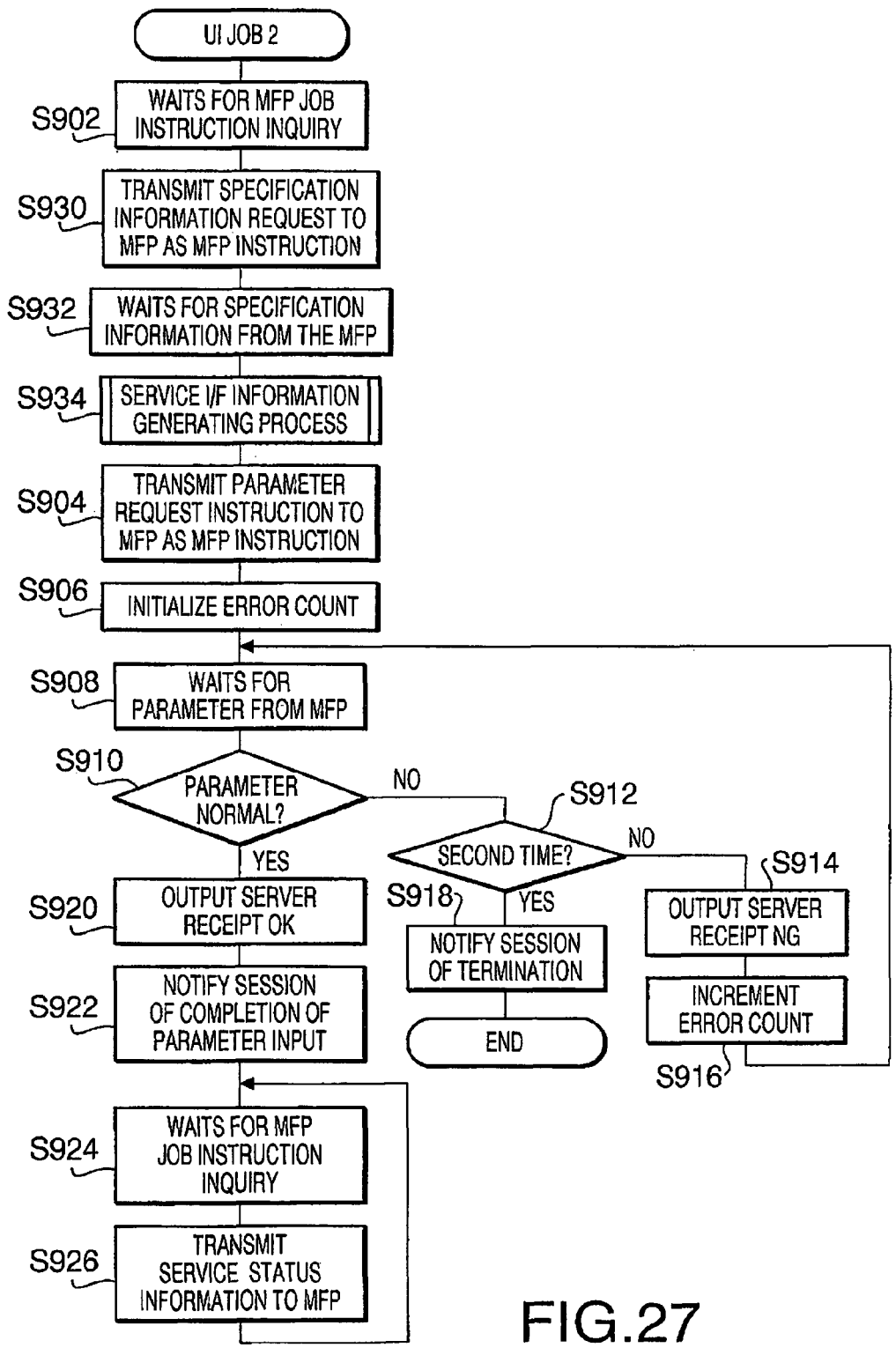
FIG. 27 shows a flowchart illustrating a UI job 2 executed by the function server according to aspects of the first embodiment of the invention.

According to the illustrative embodiments, the function server 30 transmits the parameter request instruction in S904 of FIGS. 26 and 27 together with the service I/F information 36. However, the parameter request instruction and the service I/F information 36 can be transmitted with a device different from the function server 30 (a single device or devices operating in association with each other).

In the embodiments described above, the MFP 10 first receives the top item of the service definition information 25 for selection of the category, and then receives the service information 25 regarding the selected category to allow the user to select a service. However, this configuration is only an exemplary one, and for example, the MFP 10 may be configured to receive multiple pieces of (e.g., all the pieces of) service definition information stored in the service definition storage unit 24 at a time.

As the parameter the service I/F information 36 requests may not be limited to the resolution, various items can be used. For example, a selection of monochromatic/color images, toner density (i.e., printing thickness), or volume of the sound output may be set.

In the image processing system, only one MFP 10, one directory server 20 and one function server 30 are employed. This configuration is only an exemplary one which simplifies the description of the entire system, and the system configuration can be modified in various ways. That is, there may be multiple MFPs 10, for example. In such a case, the multiple MFPs 10 receive the service definition information 25 from a common directory server 20, and may request the respective services from the common function server 30.

It is also possible to employ multiple directory servers 20 in the image processing system. In such a case, for example, a directory server for transmitting the top item of the service definition information 25 and another directory server 20 for transmitting the service definition information 25 for each category may be employed.

Further, it may be possible to employ multiple function servers 30. For example, a function server 30 for transmitting the service I/F information 36 and another function server 30 for executing the services may be employed. Furthermore, for example, a function server 30 for executing the session process and another function server for executing the job process may be employed. Alternatively, for example, a function server for executing service A, another function server for executing services B, C and D, and a further function server for executing services E and F, . . . may be employed. In such a case, the service I/F information 36 may be transmitted such that the function server 30 executing a certain service transmits the service I/F information corresponding to the executable service. Alternatively, the service I/F information may be transmitted by the function server which does not execute the service corresponding to the transmitted I/F information.

Optionally, the directory server 20 or a part of the directory server 20 and/or the function server 30 of a part of the function server 30 may be configured as a single device.

Further optionally, the directory server 20 or a part of the directory server 20 and/or the function server 30 of a part of the function server 30 may be implemented in the MFP 10 of the image processing system.

In the above-described second embodiment, the information management server 70 is described as a device separate from the function server 30. It may be possible that the information management server 70 and the function server 30 are integrated as a single device. In such a case, if the function server 30 registers the specification information in the storage unit 33 when it receives the notification from the MFP 10, the function server 30 can manage the specification information of the respective MFPs 10. Then, based on the thus registered specification information, the service I/F information 36 can be generated for the MFP 10 to which the service is to be provided.

In the second embodiment, registration of the specification information with the information management server 70 is performed based on the specification information transmitted from the MFP 10. It should be noted that the registration may be performed directly with respect to the information management server 70, or by operating the information management server 70.

Figure 32:
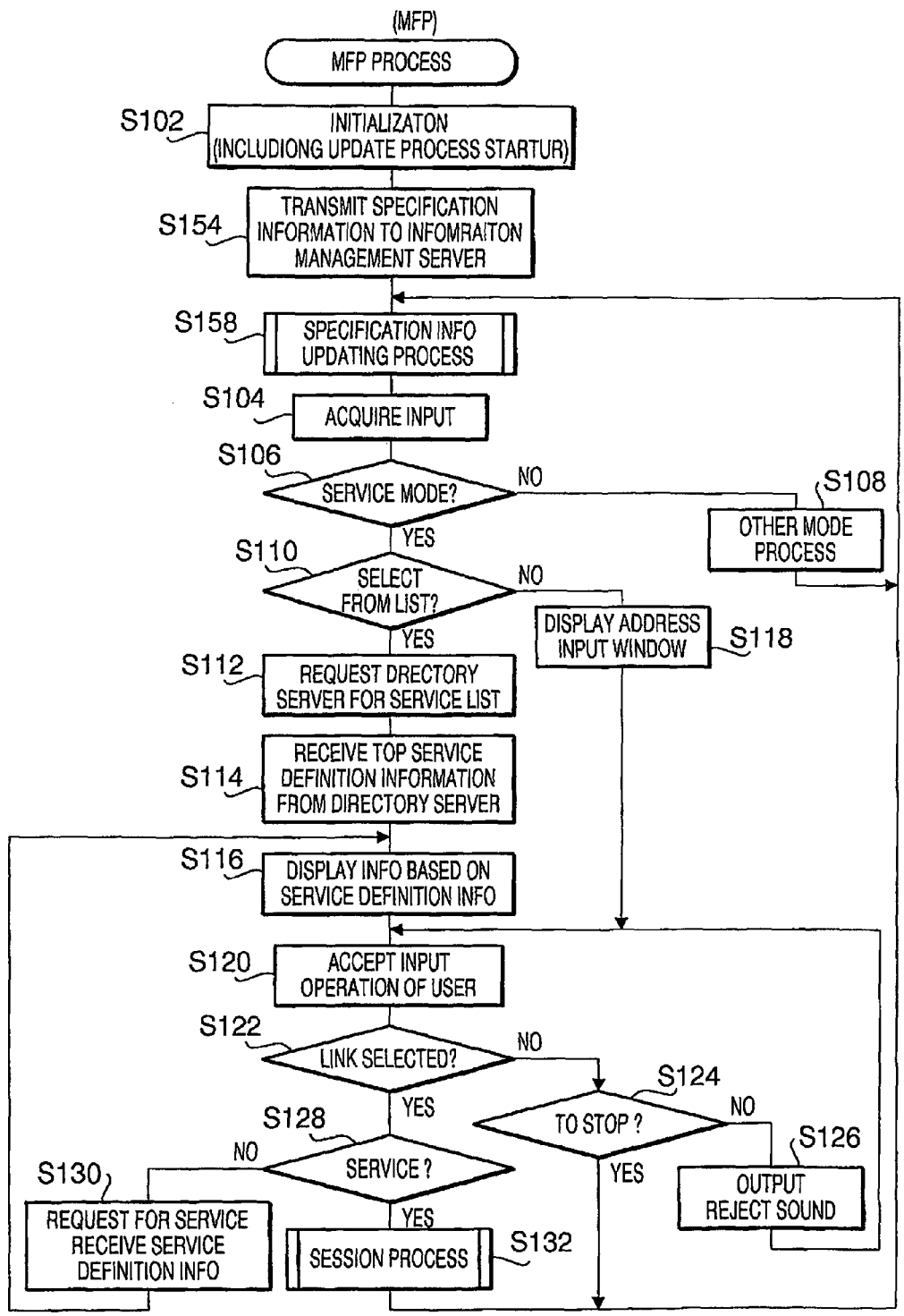
FIG. 32 shows a flowchart illustrating an MFP process executed by the MFP according to the second embodiment.
Figure 33:
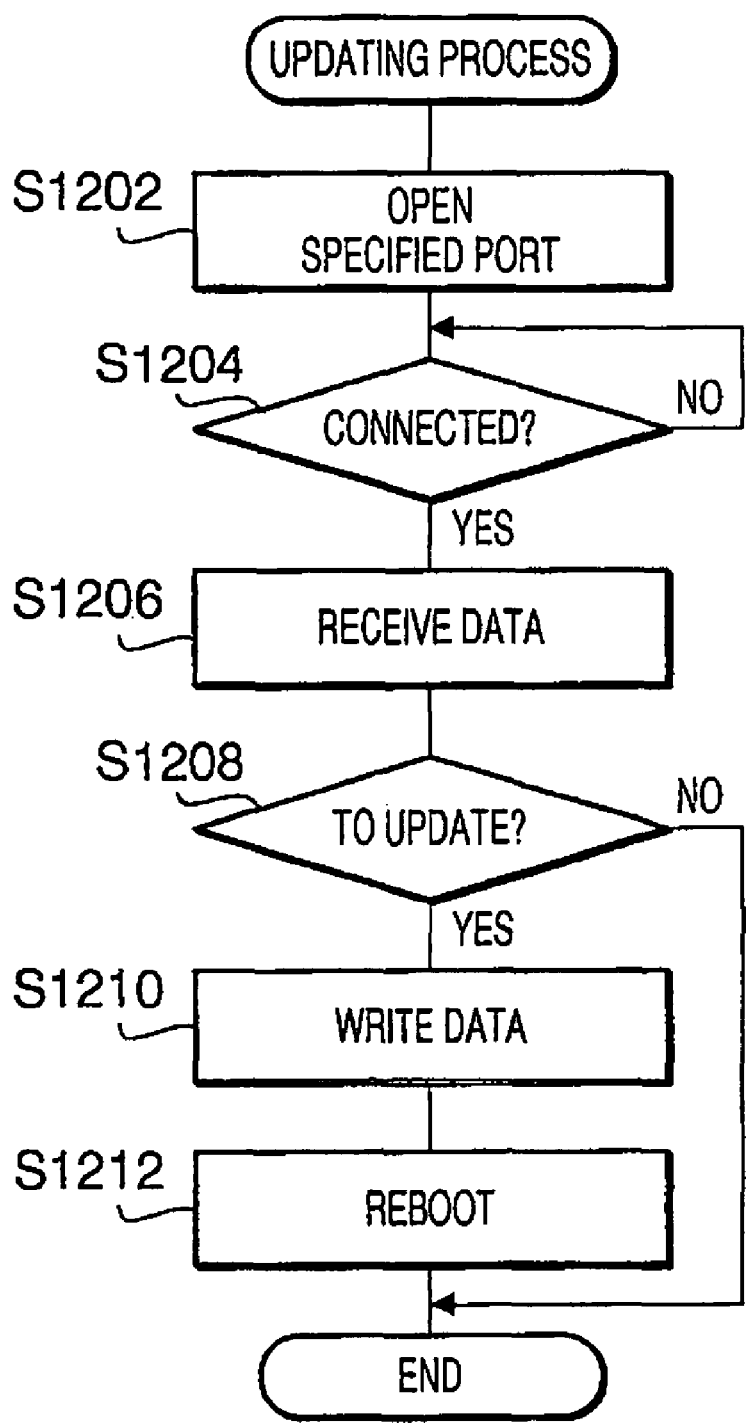
FIG. 33 shows a flowchart illustrating an update process executed by the MFP according to the second embodiment.

According to the second embodiment, the MFP 10 is configured to indicate the specification information when the specification information is changed in the MFP 10 (S1320 of FIG. 34) and immediately after the MFP 10 is started up (S154 of FIG. 32). This configuration may be modified such that the notification is performed at only one of the above times. For example, when the configuration is modified such that the notification of the specification information is performed immediately after the startup of the MFP 10 (S154 of FIG. 32), if the MFP 10 is periodically started and finished, indication of the specification information in the MFP 10 is executed periodically. Therefore, if the specification information has been changed during the period, the specification information after the change is notified, and the thus modified specification information can also be in the registered status with the information management server 70.

Further, in the above configuration, when the specification information in the MFP 10 has been changed (S1320 of FIG. 34), or immediately after the MFP 10 started up (S154 of FIG. 32), the specification information is transmitted. However, the timing of the notification of the specification information output from the MFP 10 can be set to any timing if it is after the startup of the MFP 10.

Third Embodiment

Figure 38:
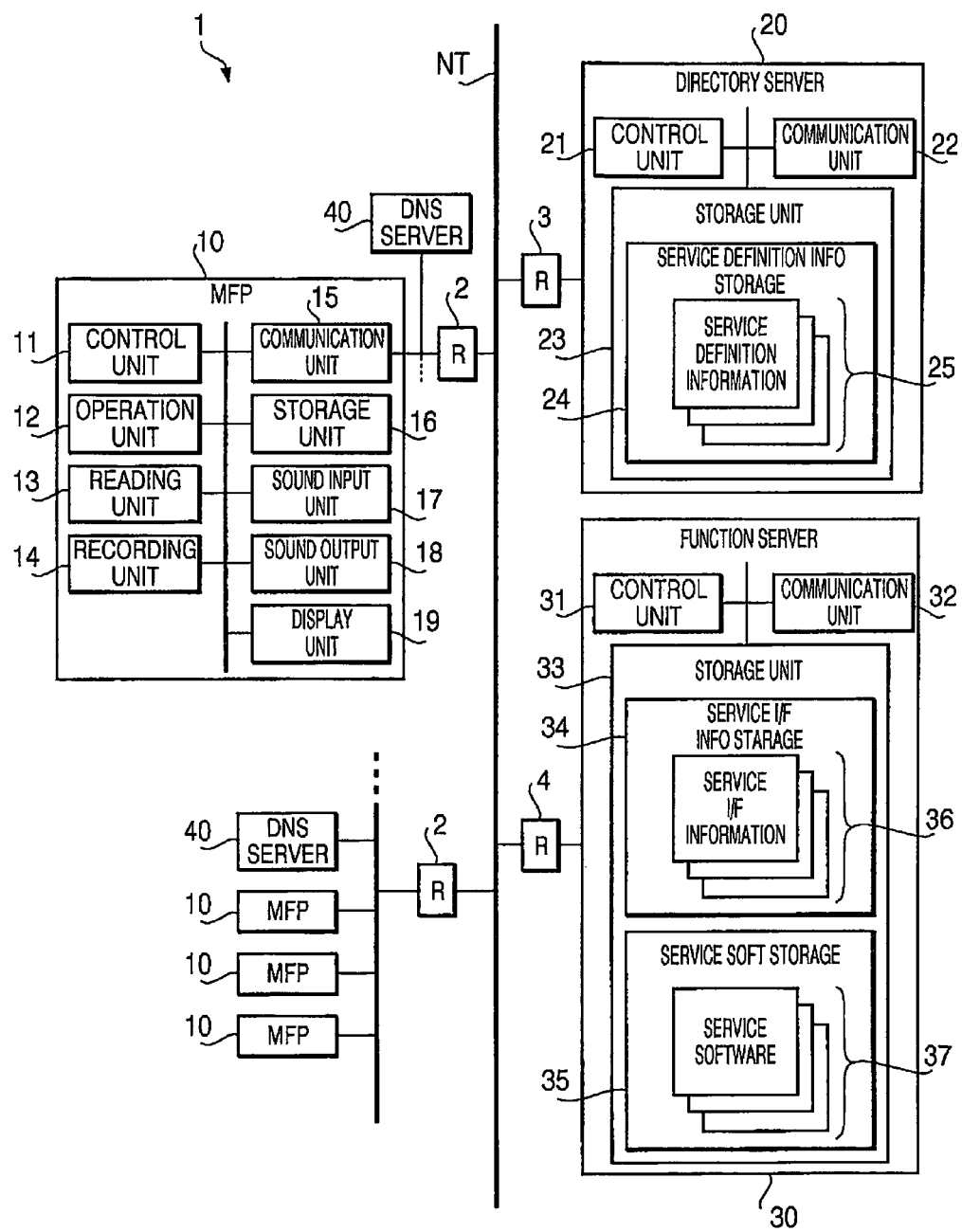
FIG. 38 is a block diagram of a system configuration of a communication system according to a third illustrative embodiment.

Next, a communication system according to a third illustrative embodiment of the invention will be described. FIG. 38 is a block diagram showing a configuration of the communication system according to the third embodiment. It should be noted that the elements, members, and units that are similar to those in the first and/or second embodiment are assigned the same reference numbers, and description thereof is omitted for brevity. As shown in FIG. 38, the communication system includes multiple digital copier devices (hereinafter, referred to as an MFP: Multi Function Peripheral) 10, a directory server 20, and a function server 30, which are connected through a WAN (Wide Area Network) 1 (e.g., the Internet). Specifically, the MFPs 10, the directory server 20 and the function server 30 are connected to the WAN 1 through routers 2, 3 and 4, respectively.

The router 2 relays a data communication between a node of a sub network including MFPs 10, etc. and a node of a WAN. Among packets transmitted from devices on the WAN to devices (e.g., MFP 10) on the sub network, the router allows packets which are responses to requests from the devices of the sub network to the devices on the WAN 1, to transmit, while preventing other packets from transmitting. With such a configuration, the router 2 functions as a fire wall, that prevents unauthorized access from the WAN 1 to the MFPs 10.

As is appreciated by comparing FIG. 38 with FIG. 1, according to the exemplary configuration of the third embodiment shown in FIG. 38, there are multiple routers 2 respectively connected to the WAN 1, and to each router 2, multiple MFPs 10 and a DNS server 40 are connected.

When the user operates the operation unit 12 of the MFP 10 to input an instruction to display a service selection window, the control unit 11 of the MFP 10 obtains service definition information 25 from the directory server via the communication unit 15. After the service definition information 25 is obtained, the control unit 11 displays the service selection window (see FIGS. 39A and 39B) indicating the types or the service on the display 19a of the display unit 19 to ask the user of the MFP 10 to select a service.

In the directory server 20, the services that can be executed by the function server 30 are categorized into types such as the "print service", "copy application service", "information providing service", etc. In the service selection window, firstly, the above multiple categories are displayed (see FIG. 39A). As the user operates the operation unit 12 to select one of the displayed categories, the services belonging to the selected category are displayed on the service selection window (see FIG. 39B).

In order to realize the above process, in the service definition information storage unit 24, service definition information 25 corresponding to the service selection window for selecting the category of the service (i.e., FIG. 39A) and the service definition information 25 corresponding to the service selection window for selecting a service (i.e., FIG. 39B) are stored. The former will be referred to as a top item of the service selection information 25.

FIGS. 40 and 41 show exemplary configurations of the service definition information 25. Specifically, FIG. 40 shows a data configuration of the top item of the service definition information 25, while FIG. 41 shows, for example, the "information providing service" which is one of the categories indicated in the service selection window shown in FIG. 39A.

As shown in FIGS. 40 and 41, the service definition information 25 is described with XML (eXtensible Markup Language). The definition of the tags is similar to those referred to in the first embodiment, and indicated in FIG. 3.

When the top item of the service definition information 25 (see FIG. 40) is received by the MFP 10, on its display 19a, the service selection window as shown in FIG. 39A is displayed. Specifically, as a title, "Directory Service" is displayed on an upper portion of the display area of the display 19a. Below the title, as selectable category items (Link_Title), "Print Service", "Copy Application Service" and "Information Providing Service" are displayed.

Each item is related to an ID of the service definition information 25 corresponding to the category (Link_Location). For example, when the operation unit 12 is operated to input a signal indicating that the selection of the item is fixed under a condition as shown in FIG. 39A, the control unit 11 displays, on the display 19a, the service selection window corresponding to the selected category based on the ID of the service definition information 25 corresponding to the selected item.

If, in the service selection window shown in FIG. 39A, the "Information Providing Service" is selected, the service selection window corresponding to the information providing service is displayed on the display 19a as show in FIG. 39B. Specifically, as a title (Title), a character string "Information Providing Service" is displayed on an upper portion of the display area of the display 19a. Below the title, as the selectable items (Link_Title), "Blog Searching Service", "News Providing Service", "X-type Information Providing Service", and "Y-type Information Providing Service" are displayed. It should be noted that if all the items cannot be displayed at a time due to the limited display area of the display 19a, the service selection window is configured to be scrollable and only a part of the list is displayed at a time.

Each item on the service selection window is associated with the URL information (Link_Location) for calling the service. When the user operates the operation unit 12 to fix the selection of an item, the control unit accesses the URL corresponding to the item via the communication unit 14, and receives the service provided by the server (i.e., the function server 30) at the URL. It should be noted that, in the above case, the MFP 10 accesses the DNS server 30 once to obtain the IP (Internet Protocol) address of the destination URL, and then accesses the URL.

Next, the function server 30 will be described. The function server 30 is, similar to that of the first embodiment, and includes the control unit 31, the communication unit 32 and the storage unit 33. The control unit 31 includes the CPU, ROM and RAM (not shown), and controls the entire operation of the functions server 30. It is noted that programs to be executed by the CPU is stored in the ROM.

The communication unit 32 is configured to execute electrical process for receiving data via the WAN 1. The storage unit 33 is provided with a hard disk drive (not shown), and stores various pieces of data on the hard disk. Specifically, in the storage unit 33, the service I/F information storage area 34 for storing the service I/F information 36, a service software storage area 35 for storing service software 37, and the like are defined.

The service software 37 is a program for executing services. In the service software storage area 35, multiple programs of service software 37 are stored. The control unit 31 executes the multiple programs to provide the services respectively corresponding to the programs to the MFP 10, which serves as the client.

Further, the service I/F information 36 is for requesting the MFP 10 for parameter information necessary to execute the services. In the service I/F information storage area 34, pieces of service I/F information 36 are stored.

When the MFP 10 receives the I/F information 36, it displays the parameter input window (see FIGS. 42A-42C) indicating the parameters to be set on the display 19a based on the received I/F information, thereby requesting the user to set the parameters.

Here, an exemplary configuration of the service I/F information 36 will be described. FIGS. 43 and 44 show exemplary configurations of the service I/F information 36. FIG. 43 is an example of the service I/F information 36 corresponding to a blog service. According to the blog service in this embodiment, the process searches posted messages published on a certain blog site for ones including keywords designated by the user, generates print data representing the contents of the posted messages, and has the recording unit 14 print the image. FIG. 44 is an example of the service I/F information 36 corresponding to a local news providing service. According to the local news providing service, the process obtains the local news data corresponding to the user-designated area from among the news data contained in a certain database, generates print data representing the obtained news data, and has the recording unit 14 print out the thus designated and obtained data.

As shown in FIGS. 43 and 44, the service I/F information 36 is described using the markup language similarly to the above-described service definition information 25. The definition of the tags used in the examples shown in FIGS. 43 and 44 are the same as those used in the first embodiment (see FIG. 4). The basic data in FIG. 4 is the same as the basic data of the service definition information 25 shown in FIG. 3.

Figure 42A:
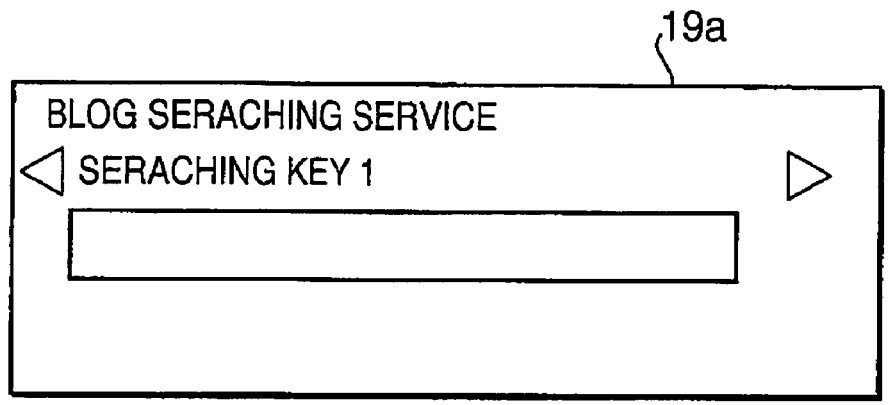
FIGS. 42A-42C show examples of parameter input windows according to aspects of the invention.

The service I/F information 36 is received by the MFP 10, and the parameter input window as shown in FIG. 42A is displayed on the display 19a. Specifically, as the display title, "Blog Service" is displayed at an upper part of the display area of the display 19a. Below the title, as input items (Disp_Name), "Search Key 1" is displayed. Further, below the "Search Key 1", an input field for search key corresponding to the "Search Key 1" is displayed. In this input field, a character string the user input is displayed.

As the input item (Disp_Name) related to the "Blog Search Service", in addition to the "Search Key 1", "Search Key 2" and "Search Key 3" are available (see FIG. 43). However, in this embodiment, due to the limited display area of the display 19a, all the items cannot be displayed at a time.

Therefore, in the MFP 10 according to the third embodiment, arrows (triangles) are displayed on both sides of the input item display position on the display 19a, and the parameter input window is configured to scrollable by operating the arrows. That is, if the user instructs the operation unit 12 to scroll through, on the display 19a parameter input window corresponding to another input item will be displayed in accordance with the operation. According to the third embodiment, the display form of the input items "Search Key 2" and "Search Key 3" is the same as the display form of the item "Search Key 1".

Figure 42B:
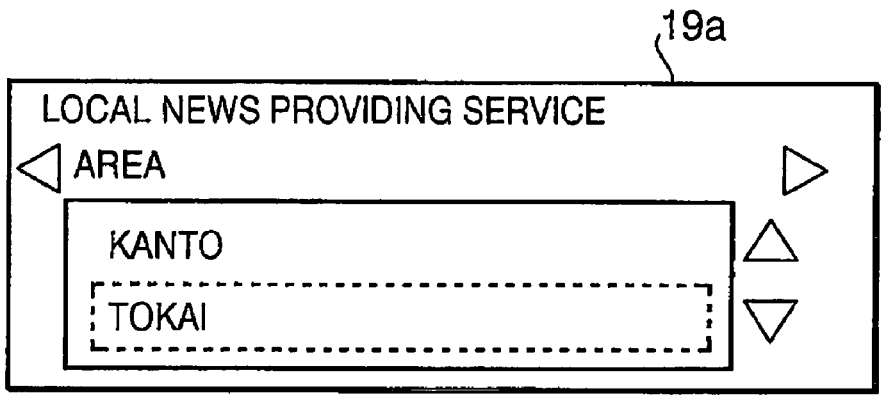
Figure 42C:
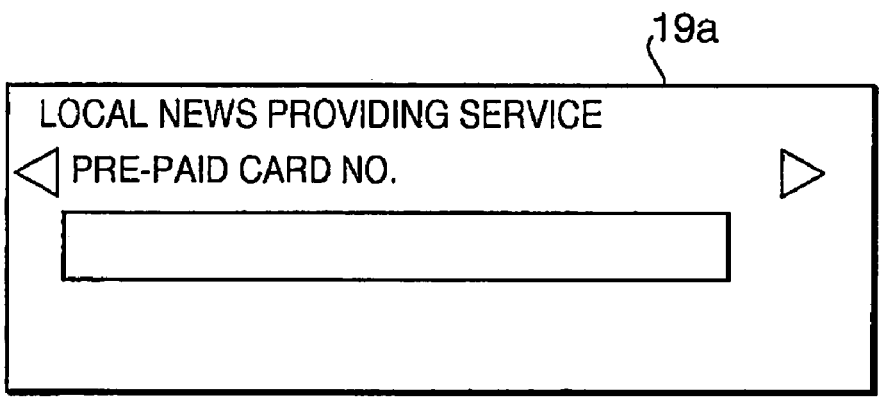

If the MFP 10 receives the I/F information 36 shown in FIG. 44, the parameter input window as shown in FIG. 42B is displayed on the display 19a.

In the parameter input window shown in FIG. 42B, as the display title (Title), "Local News Providing Service" is displayed at an upper portion, and below it, as an input item (Disp_Name), "Area" is displayed. Below the "Area", values of selectable items (Disp_Select) for the "Area", "Hokkaido", "Kanto", "Tokai", etc. are displayed. Similar to the other items, when all the items cannot be displayed on the display 19a at a time, the parameter input window is configured to be scrollable, for example, in an up-and-down direction.

As the input item (Disp_Name) for the "Local News Providing Service", in addition to "Area", "Prepaid Card No." and "The Number of Sheet Containing Information" are available (see FIG. 44). Due to the limited displaying area of the display 19a, all the input items cannot be displayed at a time.

Therefore, in the MFP 10 according to the third embodiment, similar to the "Blog Search Service", arrows (triangles) are displayed on both sides of the input item display position on the display 19a, and the parameter input window is configured to be scrollable in right-and-left direction. If the user instructs, through the operation unit 12, to scroll the display, the parameter input window corresponding to another input item will be displayed on the display 19a in accordance with the instruction. For example, if the user instructs the operation unit 12 to scroll the image rightward, an image shown in FIG. 42C (regarding the input item "Prepaid Card No.") will be displayed.

In the parameter input window for the item of "Prepaid Card No.", the input field for inputting the prepaid card number is displayed. In the input field, the character string (i.e., the prepaid card number) input by the user through the operation unit 12 is displayed. Although not shown, in the parameter input window for the "Number of Sheets", an input field in which the number of sheets when the news is printed is input by the user.

The values input in each of the parameter input windows (including the input character strings) are transmitted to a program (of a function server 30) at the destination URL (Action) which will operate in response to those parameter values when the user operates the operation unit 12 and inputs the fixing signal.

Next, a communication among the MFP 10, directory server 20 and function server 30 will be described. According to the illustrative embodiment, as a communication protocol for transmitting/receiving data among the MFP 10, directory server 20 and function server 30, HTTP 1.1 (HTTP: Hyper-Text Transfer Protocol) is employed. The MFP 10, directory server 20 and the function server 30 instruct or respond to an instruction by messages associated with an HTTP request and HTTP response.

Specifically, the MFP 10 transmits an instruction to the directory server 20 or the function server 30 by transmitting a POST command of the HTTP request, with a message associated with the POST command. On the other hand, the servers 20 and 30 respond to the inquiry by the message associated with the POST command of the HTTP request transmitted from the MFP 10 such that, if there is an MFP instruction, it is associated with the message of the HTTP response which is transmitted in response to the HTTP request received from the servers 20 and 30.

The instructions are categorized into the instructions from the MFP 10 to respective servers 20 and 30 (i.e., a server instruction), and ones from the server 20 or 30 to the MFP 10 (i.e., an MFP instruction). It should be noted that the communication for both types of instructions is configured such that the MFP 10 functions as a client in the HTTP communication (i.e., a device that transmits the HTTP request). With this configuration, even though the router 2 is located between the MFP 10 and the server 20 or 30, transmissions from the server 20 or 30 to the MFP 10 will not be shielded.

Specifically, the MFP 10 transmits an instruction to the directory server 20 or the function server 30 with a message that is associated with the POST command of the HTTP request. On the other hand, each of the servers 20 and 30 transmits the MFP instruction, if any, by attaching the instruction to the message of the HTTP response, in response to the inquiry that is associated with the POST command of the HTTP request, which has been transmitted from the MFP 10.

Next, the processes executed by the control units 11, 21 and 31 respectively provided in the MFP 10, directory server 20 and the function server 30 will be described. It should be noted that the MFP 10 performs an MFP process, which is similar to that of the first embodiment (see FIG. 5), and thus, will not be described in detail herein.

According to the third embodiment, in S108 (see FIG. 5), the service selection window as shown in FIG. 39A is displayed, for example.

Figure 46:
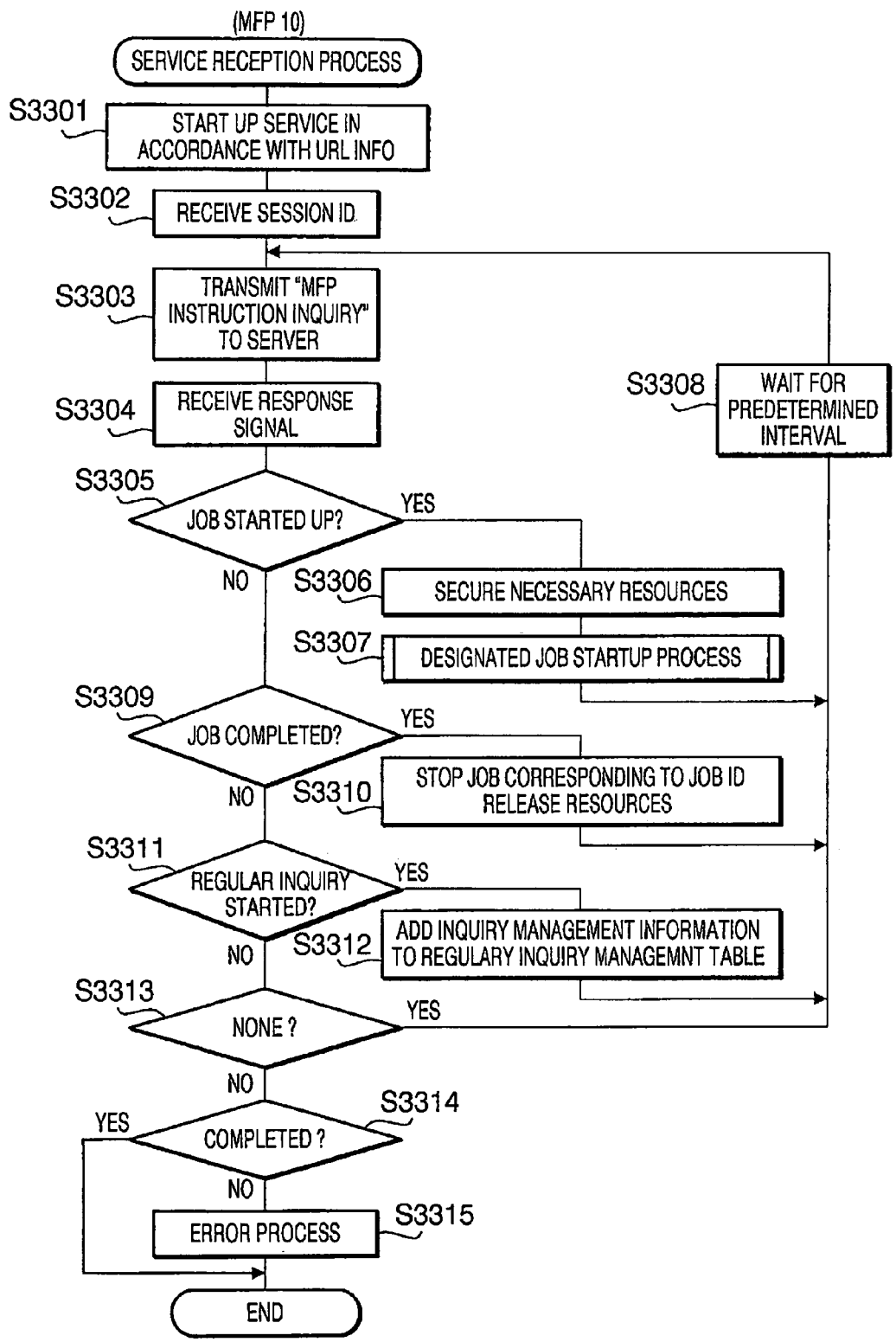
FIG. 46 shows a flowchart illustrating a service reception process executed by the MFP according to the third embodiment.

According to the third embodiment, in S116 (see FIG. 5), a service receiving process shown in FIG. 46 is executed. In this case, the URL information (i.e., the URL information described at the Link_Location tag of the service definition information 25, or the manually input URL) is set as an argument.

Prior to describing the service selection process according to the third embodiment, a request for a list of services transmitted in S106 (see FIG. 5), and an operation of the directory server when a request for the service definition information 25 is received will be described.

Directory Server Process

Figure 45:
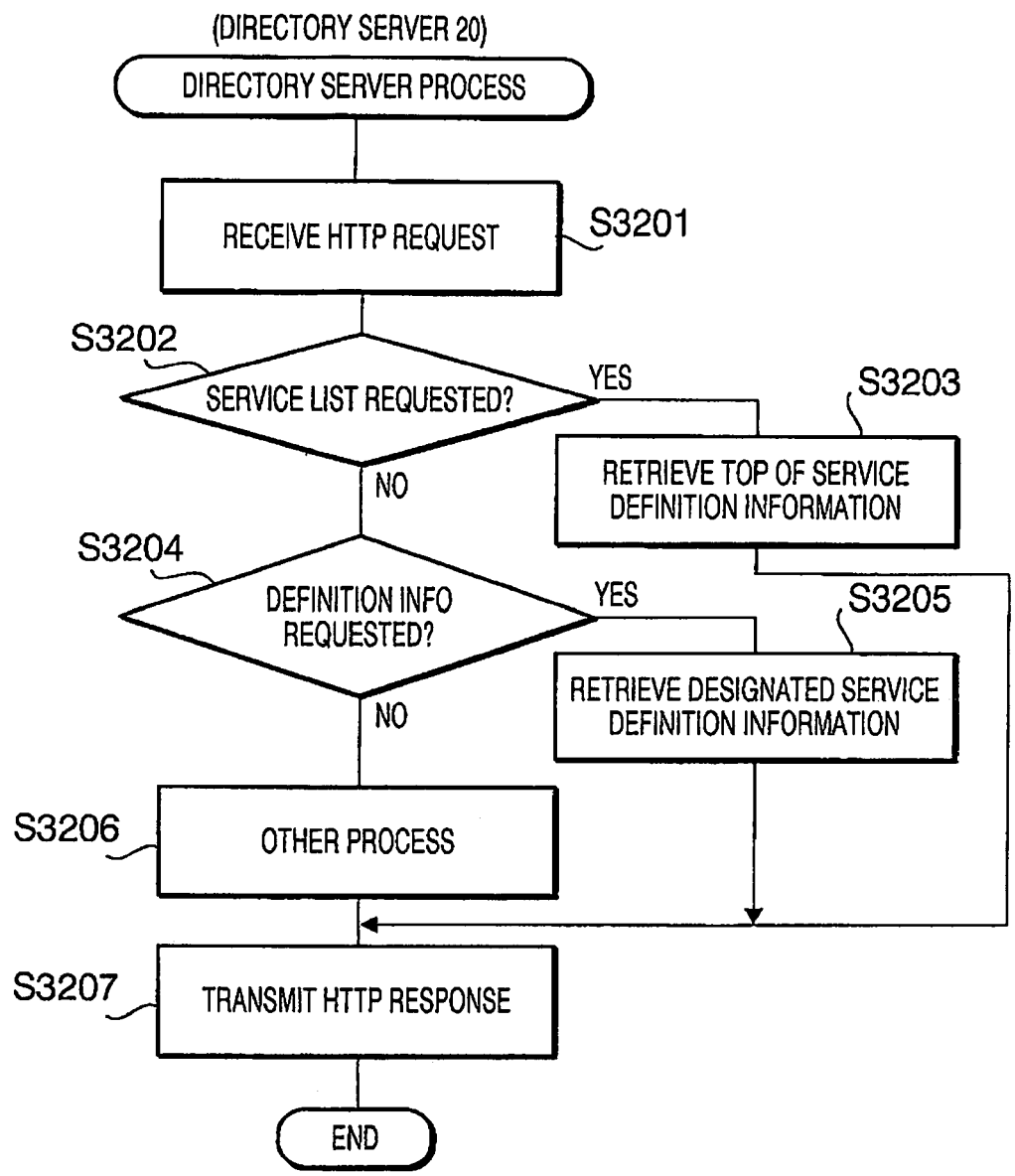
FIG. 45 shows a flowchart illustrating a directory server process executed by a directory server according to a third embodiment.

FIG. 45 shows a directory server process repeatedly executed by the control unit 21 of the directory server 20.

The control unit 21 of the directory server 20 waits for receipt of the HTTP request in S3201. When the HTTP request is received, the process proceeds to S3202, where the process judges whether the received HTTP request is a request for a list of the services. If the received request is a request for the list of the services (S3202: YES), the process proceeds to S3203, where the process retrieves the top item of the service definition information 25 from the service definition information storage area 24 of the storage unit 23. Then, the process proceeds to S3207, and transmits the HTTP response including the service definition information 25 to the sender of the HTTP request. After finishing S3207, the control unit 21 finishes the directory server process shown in FIG. 45.

If it is determined that the received request is not a request for the list of the services (S3202: NO), the process proceeds to S3204. In S3204, the process judges whether the HTTP request received in S3201 is the request for transmission of the service definition information. If it is determined that the request is for transmission of the service definition information (S3204: YES), the process proceeds to S3205 and retrieves the requested service definition information 25 from the service definition information storage area 24 of the storage unit 23. Then, the process proceeds to S3207, and transmits the HTTP response including the retrieved service definition information 25 to the sender of the HTTP request. Then, the process finishes the directory server process.

If it is determined that the HTTP request is not the request for the service definition information (S3205: NO), the process proceeds to S3206 and executes a predetermined process corresponding to the HTTP request received in S3201. Then, the process transmits the HTTP response including the results of the process to the sender of the HTTP request (S3207). Thereafter, the directory server process is finished.

Service Receiving Process

Next, referring to FIG. 46, the service receiving process according to the third embodiment, which is executed in S16 of FIG. 5, will be described.

When the service receiving process is started, the process transmits the service start instruction (HTTP request) to the destination URL which is set as the argument as described above via the communication unit 15. Then, a process for the service corresponding to the URL information (i.e., the service selected by the user) is executed by the function server at the destination URL.

Thereafter the process proceeds to S3302, where the process receives the session ID from the function server 30 of the destination URL. It should be noted that the session ID is generated at S3405 in the function server process (see FIG. 48) which is executed by the control unit 31 and transmitted in S3409 to the sender MFP 10.

In S3303, the process transmits to the function server 30 an "MFP instruction inquiry" which is a signal for inquiring whether the instruction to the MFP 10 (MFP instruction) exists. It should be noted that the "MFP instruction inquiry" includes the session ID received in S3302.

After execution of S3303, the control unit 11 receives in S3304, a response signal to the "MFP instruction inquiry" (i.e., the HTTP response) transmitted in S3303 and judges whether the response to the "MFP instruction inquiry" is the "job startup instruction" (S3305). The "job startup instruction" is output in S3603 or S3703 executed by the control unit 31 (described later). The "job startup instruction" includes the job ID for identifying the job, and communication destination URL indicating the destination URL when the job is executed.

Figure 47:
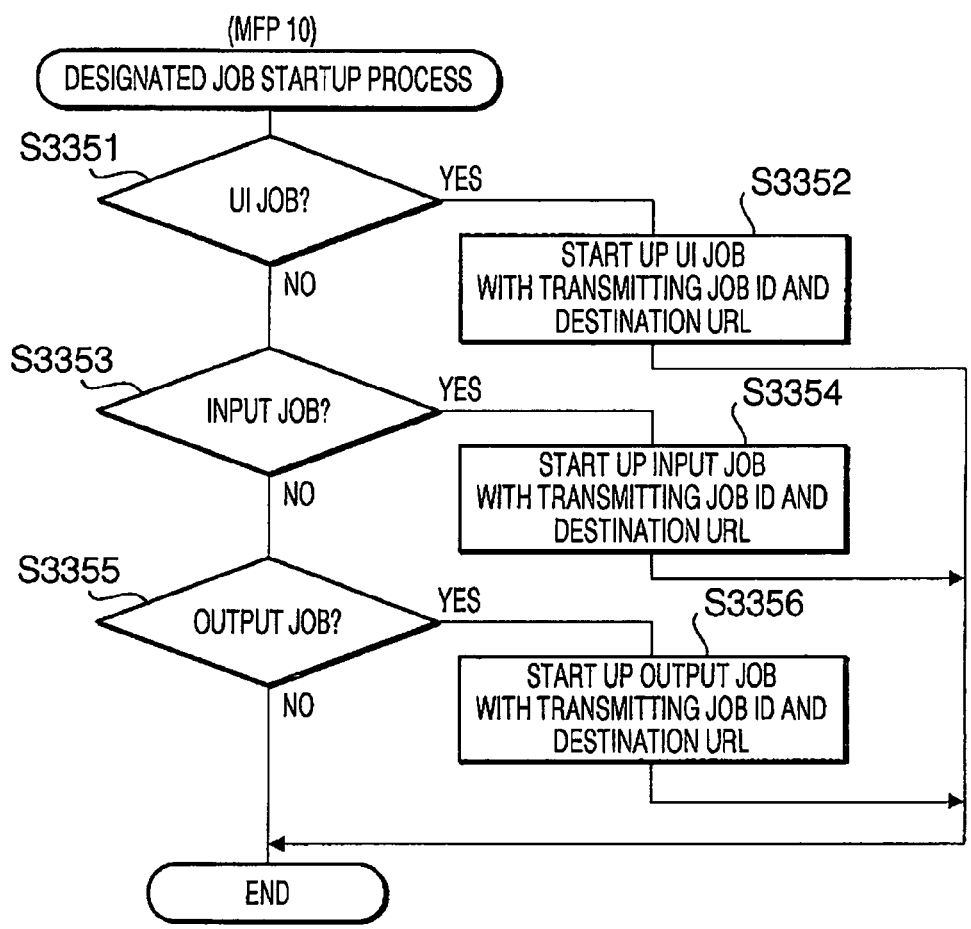
FIG. 47 shows a flowchart illustrating a designated job startup process executed by the MFP according to the third embodiment.

If it is determined that the instruction is the "job startup instruction" (S3305: YES), the control unit 11 executes S3306, where the resources necessary for executing the job are secured. Then, the process proceeds to S3307 and executes the designated job startup process (see FIG. 47). Then, the process proceeds to S3308, pauses a predetermined interval, and proceeds to S3303.

If it is determined that the instruction is not the "job startup instruction" (S3305: NO), then the process proceeds to S3309 and judges whether the response to the "MFP instruction inquiry" is the "job completion instruction". It should be noted that the "job completion instruction" is output in S3610 or S3708 executed by the control unit 31 (described later). The "job completion instruction" includes the job ID for identifying the job.

If it is determined that the instruction is the "job completion instruction", the control unit 11 proceeds to S3310, where the completion instruction is input to the job corresponding to the job ID to complete the job and releases the resource. Thereafter, the process proceeds to S3308, pauses for a predetermined interval, and proceeds to S3303.

If it is determined that the instruction is the "job completion instruction" (S3309: NO), the process proceeds to S3311, and judges whether the response to the "MFP instruction inquiry" is the "regular inquiry start instruction". It should be noted that the "regular inquiry start instruction" is output in S3609 which is executed by the control unit 31 (described later).

If it is determined that the instruction is the "regular inquiry start instruction" (S3311: YES), the control unit 11 executes S3312, and stores inquiry management information in the regular inquiry management table (see FIG. 52) stored in the storage 16, based on the information included in the "regular inquiry startup instruction". After execution of S3312 the control unit 11 executes S3308, where the process pauses for a predetermined interval, and proceeds to S3303.

If it is determined that the instruction is not the "regular inquiry startup instruction" (S3311: NO), the control unit 11 proceeds to S3313 to judge whether the response to the "MFP instruction inquiry" represents "no instruction".

If it is determined that the response to the "MFP instruction inquiry" represent "no instruction" (S3313: YES), the process proceeds to S3308, pauses for a predetermined interval and returns to S3303. If it is determined that the response to the "MFP instruction inquiry" does not represent the "no instruction" (S3313: NO), the process proceeds to S3314 to judge whether the response to the "MFP instruction inquiry" represents the "service completion instruction". It should be noted that the "service completion instruction" is output in S3611 or S3709 executed by the control unit 31.

If it is determined that the response represents the "service completion instruction" (S3314: YES), the control unit 11 completes the service receiving process. If the process has determined that the response does not represent the "service completion instruction" (S3314: NO), the process proceeds to S3315, where an error processing (e.g., displaying an error message on the display unit 19a, etc.) is executed. Thereafter, the process finishes the service receiving process.

Designated Job Process

Next, the designated job process executed in S3307 will be described in detail, with reference to FIG. 17.

When the designated job process is started, the control unit 11 judges whether the "job startup instruction" is a "UI (user interface) job startup instruction" (S3351). It is noted that the "UI job startup instruction" is an instruction notifying that the UI devices (e.g., the operation unit 12) provided to the MFP 10 is started to be used.

If the instruction is determined to be the "UI job startup instruction" (S3351: YES), the process proceeds to S3352 to output the job ID and job communication destination URL, and starts the UI job (see FIG. 54), and finishes the designating job startup process. Then the UI job communicating process is started between the MFP 10 and the function server 30. It should be noted that the UI job is executed in parallel with the service receiving process.

If the "job startup instruction" is determined to be the "UI job startup instruction" (S3351: NO), the process proceeds to S3353, where the process judges whether the "job startup instruction" is the "input job startup instruction". It should be noted that the "input job startup instruction" is for indicating that the input device (i.e., the reading unit 13 or the sound output unit 17) is started to be used.

Specifically, in S3353, it is determined that the "job startup instruction" is the "input job startup instruction" when (a) the "job startup instruction" is a "scanner job startup instruction" which instructs the reading unit (scanner) 13 of the MFP 10 to receive the service provided by the function server 30, or (b) the "job startup instruction" is a "voice job startup instruction" that instructs the sound input unit 17 to receive the service provided by the function server 30.

If the "job startup instruction" is determined to be the "input job startup instruction", the process proceeds to S3354, outputs the job ID, and job communication destination URL to start the input job, and finishes the designated startup job. It should be noted that, when the input job is started up, an input device (i.e., the reading unit 13 or the sound input unit 17) is designated for the input job.

As above, the input job communication process is started between the MFP 10 and the function server 30. Specifically, when the input job is started, the control unit 11 generates the data designated by the function server 30, using the input device (i.e., the reading unit 13 or the sound input unit 17). The generated data is transmitted to the function server 30, where a predetermined service (e.g., data publication service) is applied. It should be noted that the input job is executed in parallel with the service receiving process.

If it is determined that the "job startup instruction" is not the "input job startup process", the control unit 11 proceeds to S3355, where the process judges whether the "job startup instruction" is the "output job startup instruction". It should be noted that the "output job startup instruction" indicates that the output device (i.e., recording unit 14 or the sound output unit 18) is started to be used.

Specifically, the "job startup instruction" is determined to be the "output job startup instruction" if (a) the "job startup instruction" is a "print job startup instruction" that instructs the recording unit (printer) 14 to receive the service provided by the function server 30, or (b) the "job startup instruction" is a "speaker job startup instruction" that instructs the sound output unit 18 to receive the service provided by the function server 30.

If it is determined that the instruction is the "output job startup instruction" (S3355: YES), the process proceeds to S3356, where the job ID, and job communication destination URL are transmitted, and the output job (see FIG. 67) is started, and the designated job startup process is finished. It should be noted that, when the output job is started up, the output device (i.e., the recording unit 14 or the sound output unit 18) subjected to be controlled should be designated. Thus, the communication of the output job is started between the MFP 10 and the function server 30. This output job is also executed in parallel with the service receiving process.

If it is determined that the "job startup instruction" is not the "output job startup instruction" (S3355: NO), the control unit 11 does not start the job (i.e., UI job, input job, or output job), and the designated job startup process is finished.

Function Server Process

Figure 48:
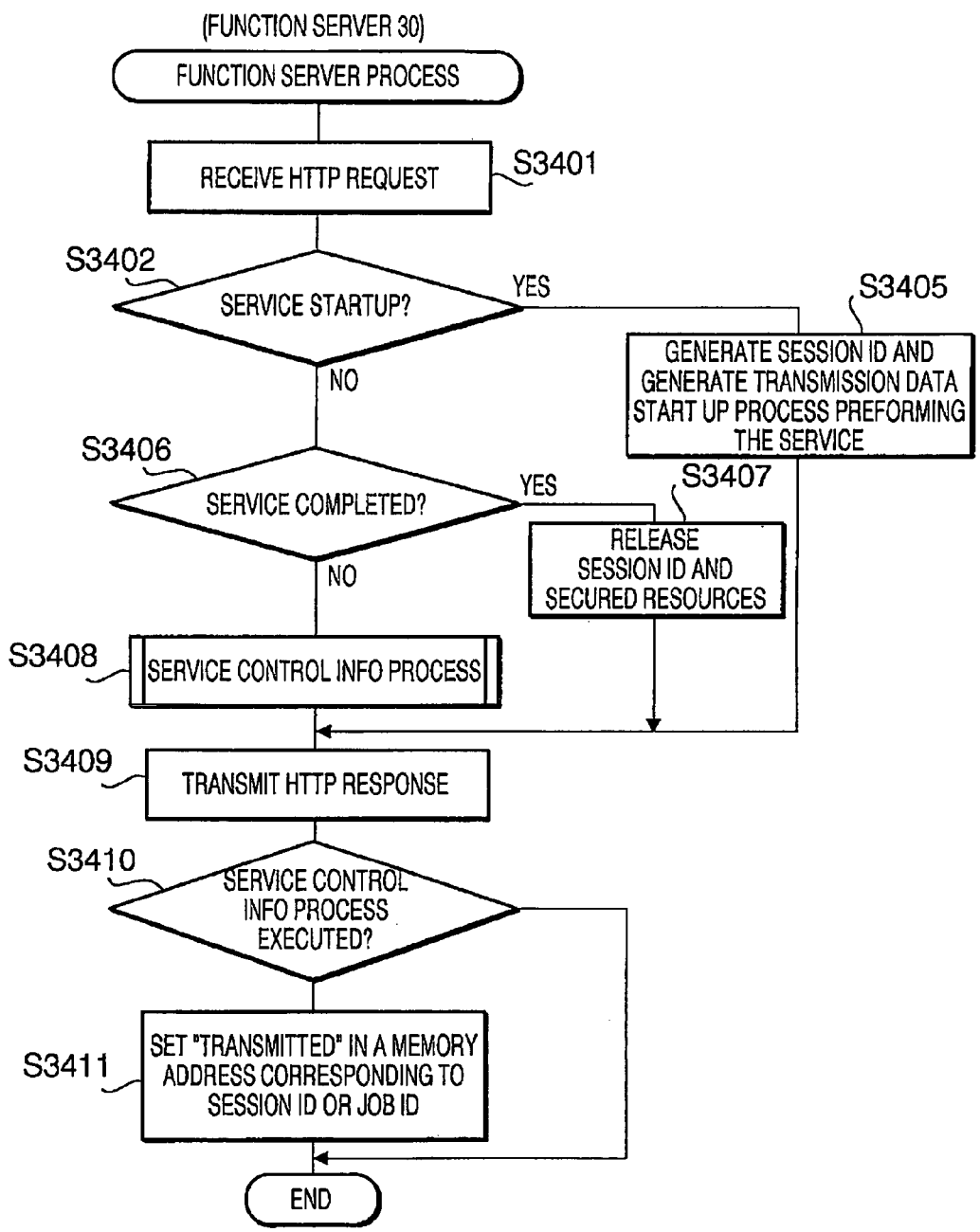
FIG. 48 shows a flowchart illustrating a function server process executed by the function server according to the third embodiment.

Next, a function server process executed by the function server 30, which receives the service startup instruction from the MFP 10 will be described. FIG. 48 shows a flowchart of the function server process executed by the control unit 31. The function server process is provided for each type of service.

Figure 50:
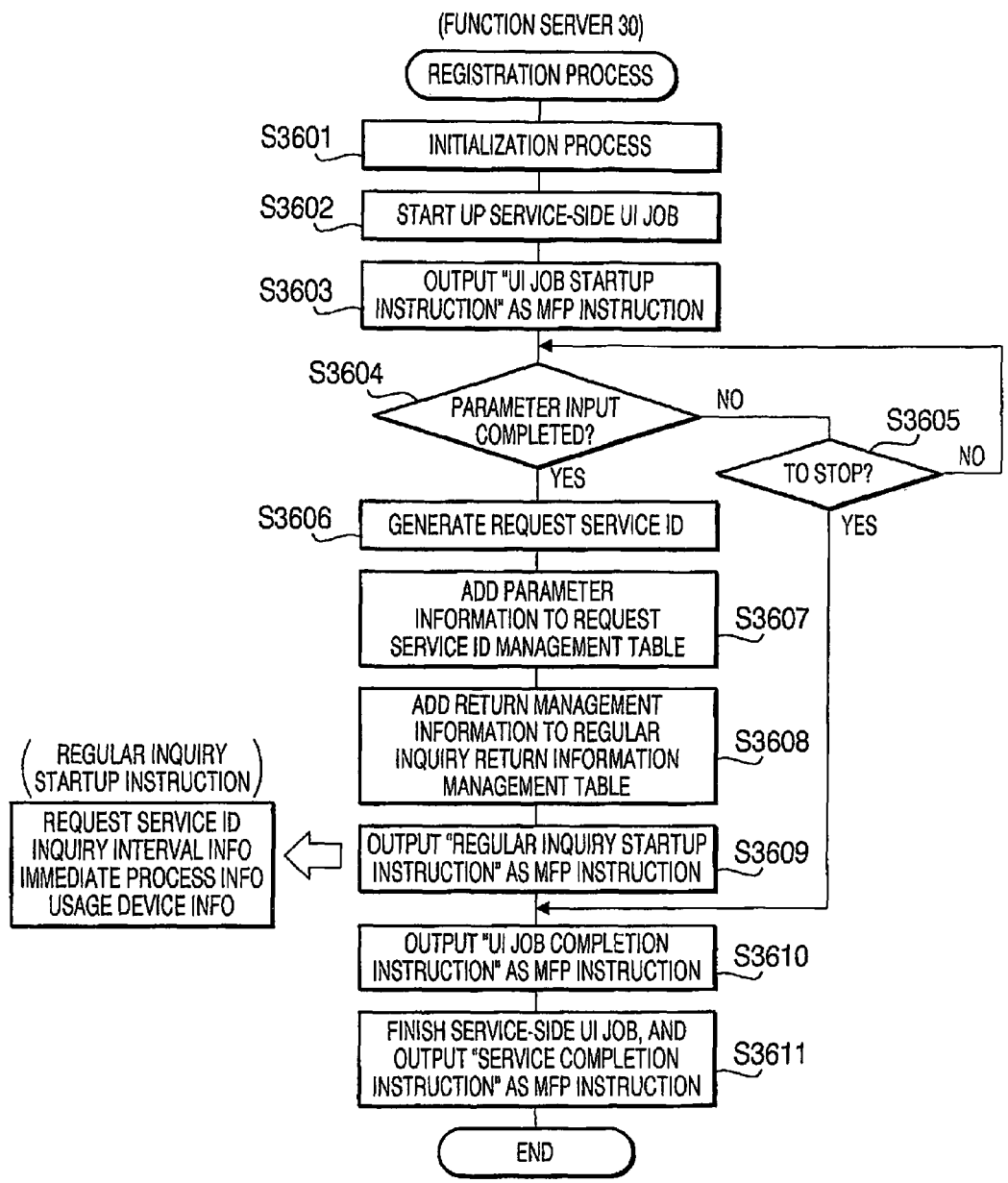
FIG. 50 shows a flowchart illustrating a registration process executed by the function server according to the third embodiment.

When the function server process is started, the process pauses until the HTTP request is received (S3401). When the HTTP request is received via the communication unit 15, the process proceeds to S3402, where it is judged whether the HTTP request received in S3401 is the service startup instruction. If it is determined that the received HTTP request is the service startup instruction (S3402: YES), the process proceeds to S3405, where the process generates a session ID, generates transmission data containing the session ID, and starts up a process for providing the service. For example, if the function server process is for accepting a usage registration of a service for providing information periodically (e.g., a blog search service, a local news providing service, etc.), a registration service shown in FIG. 50 is executed (described later). Thereafter, the process proceeds to S3409.

If it is determined that the HTTP request is not the service startup instruction (S3402: NO), the process proceeds to S3406 and judges whether the HTTP request received in S3401 is the "service completion instruction". If it is determined that the HTTP request is the "service completion instruction" (S3406: YES), the process proceeds to S3407, where the process releases the session ID and resources, and proceeds to S3409.

Figure 49:
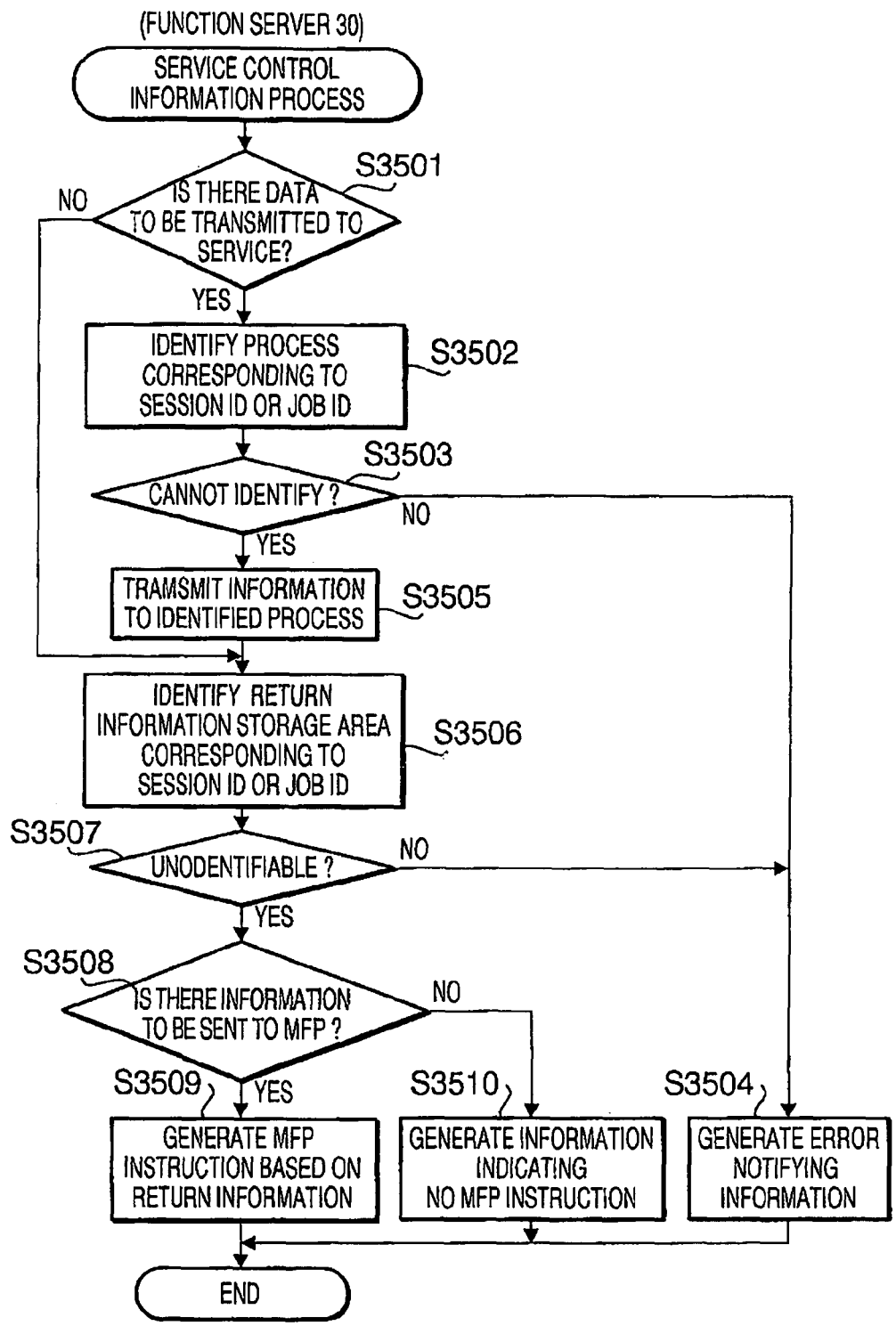
FIG. 49 shows a flowchart illustrating a service control information process executed by the function server according to the third embodiment.

If it is determined that the HTTP request is not the "service completion instruction", the process executes the service control information process (see FIG. 49). In S3409, the process generates an HTTP response containing the transmission data which has been generated in S3405, S3407 or S3408, and transmits the thus generated HTTP response to the MFP 10, which is the sender of the HTTP request.

After S3409 is executed, the process judges whether the service control information process is executed (S3410). If it is determined that the service control information process has been executed (S3410: YES), the process sets a flag indicating that the data has been "transmitted" in the memory address corresponding to the session ID or job ID (S3411), and finishes the function server process. If it is determined that the service control information process has not been executed (S3410: NO), the process skips S3411, and finishes the function server process.

Service Control Information Process

Next, the service control information process executed in S3408 of the function server process will be described with reference to a flowchart shown in FIG. 49.

When the service control information process is executed, the process judges whether information to be transmitted to the service exists in S3501. Specifically, the process judges whether information corresponding to the process realizing the service identified by the session ID or job ID is included in the HTTP request received in S3401 by the function server 30.

If the HTTP request does not include such information to be sent to the service (process) (S3501: NO), the process proceeds to S3506. If it is determined that there is information to be transmitted to the service (S3501: YES), the process proceeds to S3502. In S3502, the process identifies the process corresponding to the session ID or the job ID. That is, in this step, the process identifies the process which is the destination of the information included in the received HTTP request.

If the destination process cannot be identified (S3503: YES), the control generates error notification information as the transmission data (S3504), and finishes the service control information process. If the destination process can be identified (S3503: NO), the control proceeds to S3506 after transmitting the information to the identified destination process (S3505).

In S3506, a memory area for storing return information generated by the process corresponding to the session ID of job ID (hereinafter, the memory area being referred to as return information storing area) is specified. If the return information storing area cannot be specified (S3507: YES), the process proceeds to S3504, where, error communication data is generated as transmission data to be contained in the HTTP response. Thereafter, the service control information process is finished.

If the return information storing area can be identified (S3507: NO), the process proceeds to S3508, and judges whether the return information is stored in the specified return information storing area. If it is determined that the return information is stored, the process proceeds to S3509 and generates the "MFP instruction" based on the return information as the transmission data. Then, the service control information process is finished.

If it is determined that the return information is stored in the return information storing area (S3508: YES), control proceeds to S3509, and transmits the MFP instruction based on the return information as the transmission data. Then, the service control information process is finished.

If it is determined that the return information is not stored in the specified return information storing area (S3508: NO), the process proceeds to S3510, generates the information indicating "no MFP instruction" as the transmission data (S3510), and finishes the service control information process.

Next, a process the control unit 31 of the function server 30 started in S3405 will be described. It should be noted that the contents of the process described above are different depending on the type of the services. In the following description, as an illustrative example, a registration process for registering a service for periodically providing information (i.e., blog search service, local news providing service, etc.) will be described. FIG. 50 shows a flowchart illustrating the registration process executed by the control unit 31.

When the registration process is executed, the process executes an initialization in S3601, and starts up the service side UI job (see FIG. 53; described later) in S3602. In S3603, the process outputs the "UI job startup instruction" as the MFP instruction. Specifically, the process writes the "UI job startup instruction" in the return information storing area corresponding to the session ID generated in S3405.

Then, the "UI job startup instruction" is transmitted to the MFP 10 as the MFP instruction via the service control information process. The control unit 31 confirms the transmission of the MFP instruction by checking that the flag "transmitted" is set in S3411 of the function server process (FIG. 48). It should be noted that the "US job startup instruction" includes the job ID and job communication destination URL of the service side UI job started up in S3602.

When the process in S3603 is finished, the control unit 31 proceeds to S3604 and judges whether the values of the parameters have been input. It should be noted that whether the input of the parameter values has been completed is judged based on whether the notification indicating the completion of parameter input is transmitted to the registering process in S711 of the service-side UI job (see FIG. 53).

If the process determines that the input of the parameter values has not been completed (S3604: NO), the process proceeds to S3605 and judges whether the termination has been notified. It should be noted that the termination is notified in S709 of the service-side UI job (see FIG. 53).

In S3605, if it is determined that the termination has not yet been notified, the process returns to S3604. If it is determined that the termination has been notified (S3605: YES), the process proceeds to S3610. If it is determined that the parameter values have been input (S3604: YES), the process proceeds to S3606 and generates a request service ID.

The request service ID is used to provide the service corresponding to the input parameter values only to the MFP 10 to which the parameter values are input. The request service ID is generated as a unique ID at every usage registration of the service (i.e., at every input operation of the parameter information), and indicated only to the MFP 10 in which the parameter values are input, in S3609.

When step S3606 has been executed, the process writes the request service ID generated in S3606 and input parameter values (parameter information) in a request service ID management table which is stored in the storage unit 33. FIG. 51A shows an exemplary configuration of the request service ID management table.

The request service ID management table stores the request service IDs, and the values of the parameters (parameter information) which were input from the MFP 10 (i.e., the client device) when the request service IDs are generated in a related manner. The request ID management table is stored in the storage unit 33 for each type of service, corresponding to the processes for registration prepared for each type of service, respectively. For example, the storage unit 33 stores the request service ID management table for the blog searching service, and the request service ID management table for local news providing service.

That is, in S3607, the process inserts a request service ID and the parameters (parameter information) input through the MFP 10 are added to the request service ID management table corresponding to the present process for registration.

After execution of S3607, the process proceeds to S3608 where the process stores the reply management information corresponding to the request service ID generated in S3606 in the regular inquiry reply management table. FIG. 51B shows an exemplary configuration of the regular inquiry reply management table.

As shown in FIG. 51B, the regular inquiry reply management table has descriptions of the request service IDs and reply management information including service start information, service URL information, service status information, service cancel information, and the reply management information being provided for each request service ID.

The service start information indicates whether preparation for providing the service has been finished. If the preparation has been finished, the value of the service start information is "TRUE", while if the preparation has not been finished, the value is "FALSE".

The service URL information is URL information of the function server 30 that provides the service corresponding to the request service ID. The service status information is status information of the function server 30 that provides the service.

The service status information has a value of "0" when the status of the service corresponding to the request service ID is normal If the status is abnormal, the value of the service status information has a negative value with the absolute value representing a cause of the abnormal state.

The service cancel information represents whether the provision of the service has been finished. If the provision of the service has been finished, the service cancel information has a value "TRUE" while if the provision of the service is being continued, the value is "FALSE". It should be noted that service cancel information having the value of "TRUE" will be automatically deleted, after being retained for a predetermined period of time, by the regularly deleting program (not shown) provided to the function server 30. Further, as the automatic deletion of the reply management information, the parameter information regarding the request service ID, which is subjected to the automatic deletion above, in the request service ID management table will also be deleted.

When S3608 is finished, the control unit 31 outputs a "regular inquiry start instruction" as the MFP instruction (S3609). Specifically, in this step, the process writes the "regular inquiry start instruction" in the reply information storage area corresponding to the session ID generated in S3405. With the writing process above, the "regular inquiry start instruction" is transmitted to the MFP 10 as the MFP instruction, via the service management information.

It should be noted that the "regular inquiry start instruction" includes the request service ID, information representing a time interval of the regular inquiry designated for the MFP 10 (inquiry interval information), information representing whether the inquiry should be made immediately after elapse of the time interval (immediate process information), and information representing a type of input/output device necessary to be operated on the MFP 10 side when the service is used (used device information).

When the "regular inquiry start instruction" is received, the control unit 11 of the MFP 10 proceeds to S3312 (FIG. 10) and adds, in accordance with the information contained in the "regular inquiry start instruction", the inquiry management information containing the request service ID, request status information, inquiry interval information, remaining time information, immediate operation information, and used device information, in the regular inquiry management table stored in the storage unit 16.

It should be noted that the request service ID, the inquiry interval information, the immediate process information, and the used device information stored in the regular inquiry management table are the same as the information included in the "regular inquiry start instruction". On the other hand, the request status information is the information received as the reply to the inquiry, and represents whether the above-described service status data is obtained from the function server 30. If the request status information is to be obtained from the function server, the value of the request status information is "TRUE", otherwise its "FALSE".

In S3312, the request status information is written in the regular inquiry management table with its value being "TRUE". It is noted that, according to the third embodiment, when a request status information value change instruction is input through the operation unit 12, the value of the designated request status information in the regular inquiry management table is changed to "FALSE" (or "TRUE") in accordance with the instruction.

The remaining period information represents the remaining time period to the next inquiry. In S3312, the inquiry period information and the remaining period information having the same value as the inquiry period are written in the regular inquiry management table. The remaining period information is updated in S3901.

When the output in S3609 is finished, the process proceeds to S3610 and outputs the "UI job completion instruction" as the MFP instruction. Specifically, in this step, the "UI job completion instruction" is stored in the reply information storage area corresponding to the session ID generated in S3405. With this operation, the "US job completion instruction" is transmitted to the MFP 10 as the MFP instruction, through the service control information process.

When S3610 is finished, the process proceeds to S3611, where the process inputs the completion instruction to complete the service-side UI job, and outputs the "service completion instruction" as the MFP job. Then, the process finishes the registration process.

Service-Side UI Job and UI Job Executed by MFP

Figure 53:
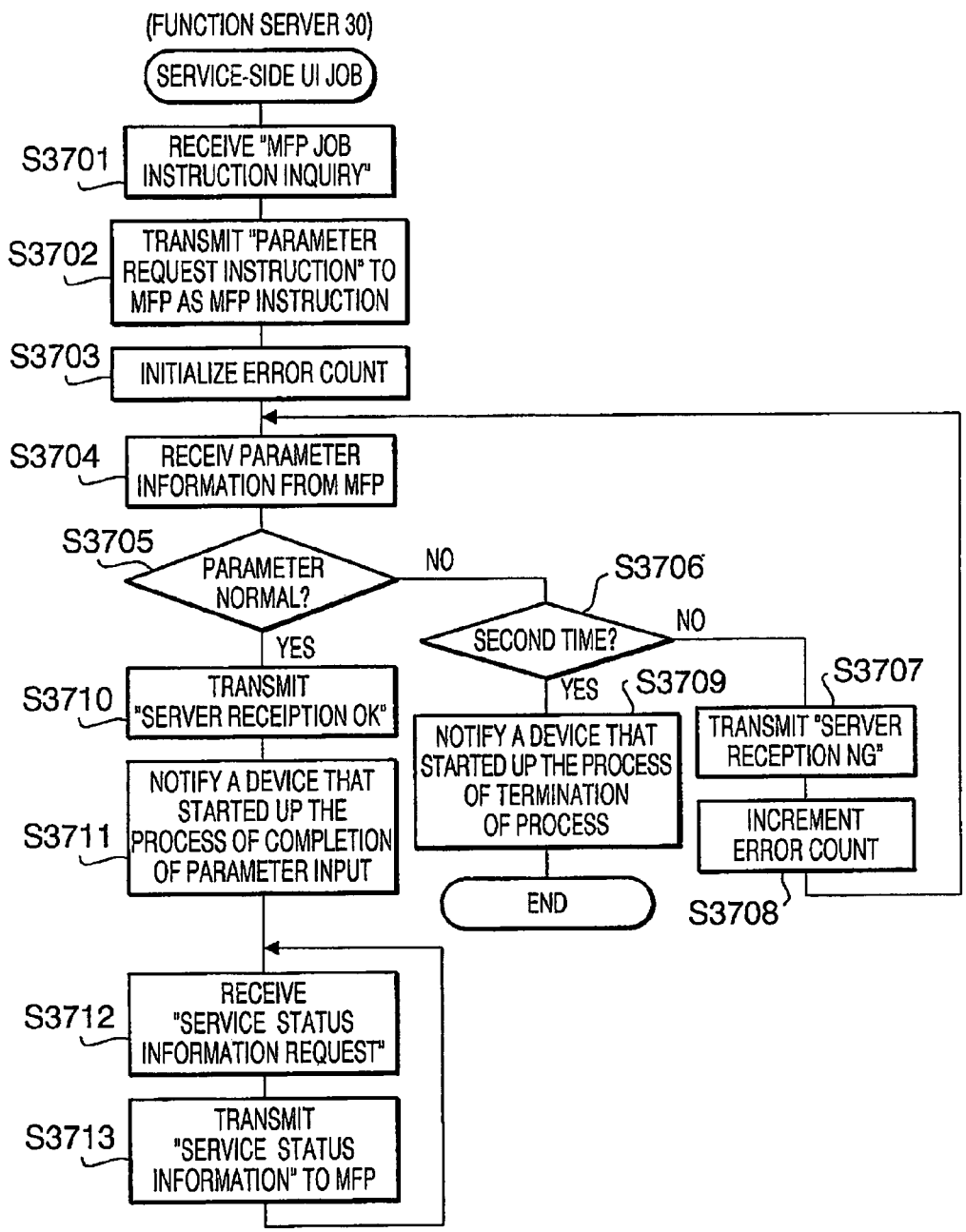
FIG. 53 shows a flowchart illustrating a service side UI job executed by the function server according to the third embodiment.
Figure 54:
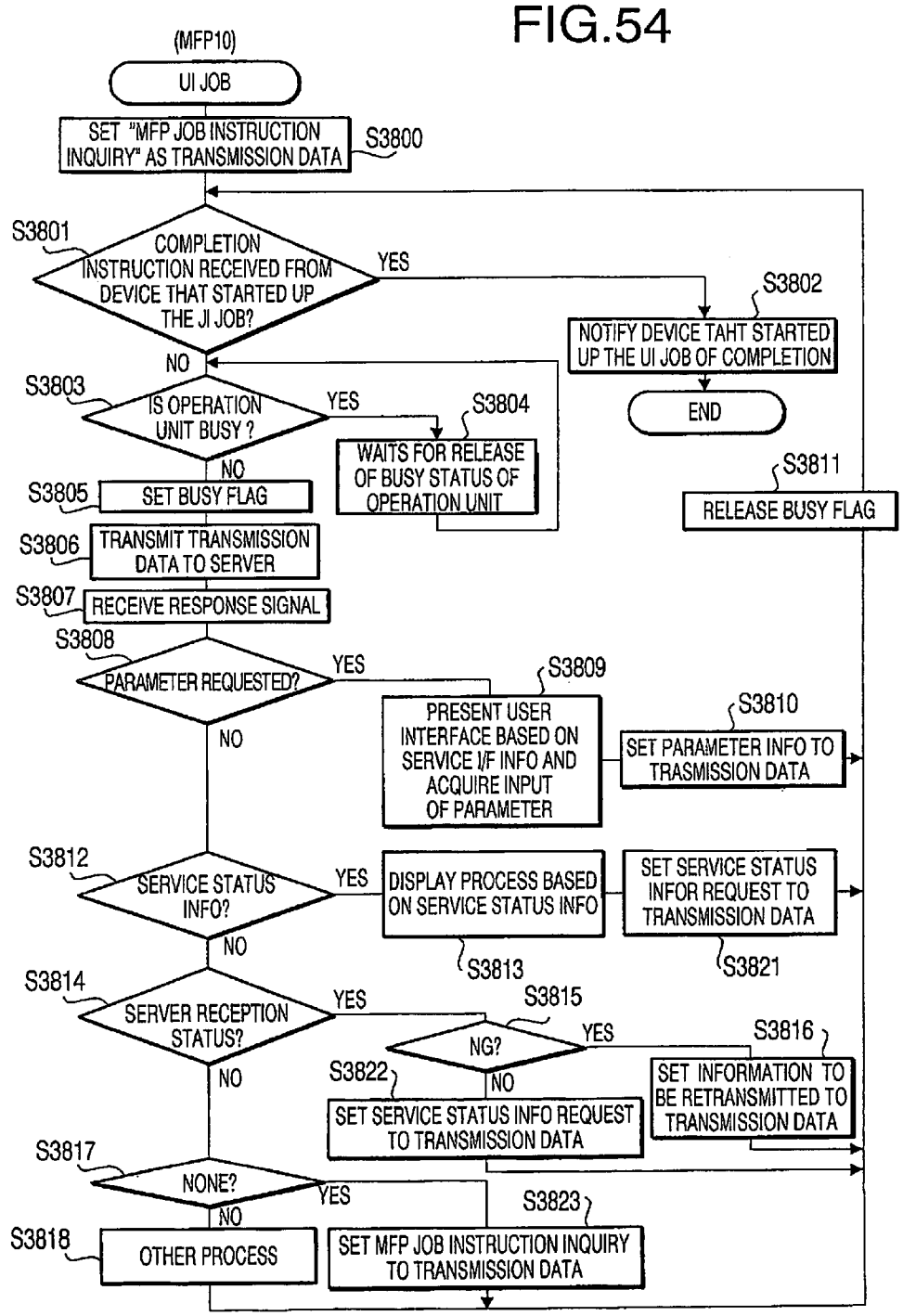
FIG. 54 shows a flowchart illustrating a UI job executed by the MFP according to the third embodiment.

Next, the service-side UI job executed by the control unit 31 of the function server 30 in S3602 will be described with reference to FIG. 53, and the UI job executed in S3352 by the control unit 11 of the MFP 10 in response to the "UI job startup instruction" output in S3603 (received in S3304) will be described with reference to FIG. 54. It should be noted that FIG. 53 shows a flowchart of the service-side UI job executed by the control unit 31 of the function server 30, and FIG. 54 shows a flowchart of the UI job executed by the control unit 11 of the MFP 10.

When the service-side UI job is started, the control unit 31 receives the "MFP job instruction inquiry" from the MFP 10 in S3701. The "MFP job instruction inquiry" is set as the transmission data in S3800 of the UI job executed by the control unit 11 of the MFP 10 (FIG. 54), and transmitted in S3806.

Next, in S3702, the process transmits the "parameter request instruction" requesting the input of the parameter necessary for executing the service to the MFP 10 as the MFP instruction. It should be noted that, together with the "parameter request instruction", the service I/F information 36 stored in the service I/F information storage area 34 is transmitted. Specifically, if the registration process that started up the service-side UI job is the process for receiving the registration of the blog search service, the service I/F information 36 shown in FIG. 43 is transmitted. If the registration process that started up the service-side UI job is the process for usage of the local news providing service, the service I/F information 36 is transmitted.

After execution of S3702, the control unit 31 proceeds to S3703 and initializes the error count. Next, the process receives (S3704) the values of the parameters input by the users via the parameter input window based on the service I/F information 36. The values of the parameters are set as the transmission data in S3810 (FIG. 54) of the UI job executed by the control unit 11 of the MFP 10, and transmitted in S3806.

When the process receives the parameter values in S3704, the process proceeds to S3705, and judges whether the parameter values received in S3703 are normal. If it is determined that the parameter values are not normal (S3705: NO), the process proceeds to S3706, and judges whether the parameter values are determined to be abnormal a second time, based on the value of the error count.

If it is determined that the determination of the abnormal values is not the second time (i.e., the first time), the process proceeds to S3707, and a server reception status which is an indication whether the function server 30 successfully received the information from the MFP 10 is transmitted to the UI job of the MFP 10, indicating a "server receipt NG (abnormal reception)".

After execution of S3707, the control unit 31 increments the error count (S3708), and proceeds to S3704. If it is determined that the abnormal reception is the second time (S3706: YES), the process proceeds to S3709. In S3709, the process notifies the process that started the service-side UI job (i.e., the registration process) of the termination thereof, and finishes the service-side UI job.

In S3705, if it is determined that the parameter values are normal, the process proceeds to S3710, and transmits the server reception status indicating "server receipt OK (normal reception)" to the UI job of the MFP 10.

When S3710 is executed, the process proceeds to S3711 and notifies the process that started the service-side job (registration process) of "completion of parameter input". Then, the process proceeds to S3712 and waits for receipt of the "service status information request". When the "service status information request" is received, in S3713, the process transmits the "service status information" to the UI job of the MFP 10. Then, the process returns to S3712.

As above, the steps of (1) receiving the "service status information request" from the MFP 10 and (2) transmitting the "service status information" in response to the receipt of the "service status information request" are repeated until the service-side UI job is finished (S3611). It should be noted that the "service status information" is information representing that the parameter values have been input normally.

The control unit 11 of the MFP 10 executes the following process when the UI job is started (S3352) in response to the "UI job startup instruction" issued in S3603.

When the UI job is executed, the control unit 11 of the MFP 10 sets the "MFP job instruction inquiry" which is the inquiry for the instruction directed to the MFP 10 in S3800, and judges whether the completion instruction is received from the process that booted the UI job. It should be noted that the completion instruction is output in S3310.

If it is determined that the completion instruction was received (S3801: YES), the control unit 11 proceeds to S3802 and notifies the process that booted the UI job (i.e., the service reception process) of completion of the process, and finishes the UI job.

If it is determined that the completion instruction has not been received (S3801: NO), the process proceeds to S3803 and judges whether the operation unit 12 or the display unit 19 is in a busy state. Specifically, based on the busy flag Fu indicating whether the operation unit 12 or the display unit 19 is busy not, the judgment is made. If the busy flag Fu is on, the process determines that the operation unit 12 or the display unit 19 is busy, or otherwise, not busy.

If it is determined that the operation unit 12 or the display unit 19 is busy, the process proceeds to S3804 and pauses until the busy state of the operation unit 12 or the display unit 19 is released. Then, the process returns to S3803. If it is determined that the operation unit 12 or the display unit 19 is not busy, the process proceeds to S3805, and sets the busy flag Fu.

Next, the process transmits the transmission data, which has been set in S3800 or the like to the function server 30 (S3806). After transmitting the transmission data, the process receives, in S3807, a response signal to the transmission in S3806. In S3808, the process judges whether the received response signal is the "parameter request instruction". It should be noted that the "parameter request instruction" has been transmitted by the control unit 31 in S3702.

If it is determined that the received response signal is the "parameter request instruction" (S3808: YES), the process proceeds to S3809, where the process displays the parameter input window on the display 19a of the display unit 19 based on the service I/F information 36 to request the user to input parameters and accept the input values.

When a confirmation signal regarding the input parameter values accepted in S3809 is input through the operation unit 12, the input parameter values are set to the transmission data (S3810) in order to provide the values to the service-side UI job executed by the function server 30. Then, in S3811, the process releases the busy flag Fu, and returns to S3801.

If it is determined that the instruction is not the "parameter request instruction" (S3808: NO), the process proceeds to S3812, and judges whether the response signal received in S3807 represents the "service status information". It should be noted that the "service status information" is transmitted in S3713 executed by the control unit 31 of the function server 30.

If it is determined that the response signal represents the "service status information" (S3812: YES), the process proceeds to S3813 and displays the information related to the "service status information" on the display 19a of the display unit 19 (S3821). Thereafter, the process sets the "service status information request" for obtaining the service status information from the function server 30 to the transmission data (S3821). Then, the process proceeds to S3811 to release the busy flag Fu, and returns to S3801.

If it is determined that the response signal does not represent the "service status information" (S3812: NO), the process judges whether the response signal received in S3807 is the "server reception status" representing whether the function server 30 has received the information from the MFP 10 successfully (S3814). If it is determined that the response signal is the "server reception status" (S3814: YES), the process proceeds to S3815 and judges whether the "server reception status" represents the "server reception NG" (S3815).

If it is determined that the "server reception status" represents the "server reception NG" (S3815: YES), the process proceeds to S3816. In S3816, the process sets the re-transmission information (parameter information) which is the same information as the previously transmitted information to the transmission data in order to provide the previously transmitted information to the service-side UI job executed by the function server 30. Then, the process proceeds to S3811, releases the busy flag Fu, and returns to S3801.

If it is determined that the "server reception status" does not represent the "server reception NG" (S3815: NO), the process sets the "service status information request" to the transmission data. Then, the process proceeds to S3811, releases the busy flag Fu, and returns to S3801.

If it is determined that the response signal does not represent the "server reception status" (S3814: NO), the process judges whether the response signal received in S3807 represents the "no instruction" in S3817.

If it is determined that the MFP instruction represent the "no instruction" (S3817: YES), the process proceeds to S3823, where the "MFP job instruction inquiry" to the transmission data. Then, the process proceeds to S3811, releases the busy flag Fu, and returns to S3801. If it is determined that the MFP instruction does not represent the "no instruction" (S3817: NO), the process proceeds to S3818 and executes other process. When S3818 is executed, the process sets appropriate data corresponding to the process to be executed to the transmission data. For example, after executing a process corresponding to the response signal, the "MFP job instruction inquiry" is set to the transmission data. Thereafter, the process proceeds to S3811, the busy flag Fu is released and the process returns to S3801.

Regular Inquiry Process

Figure 55:
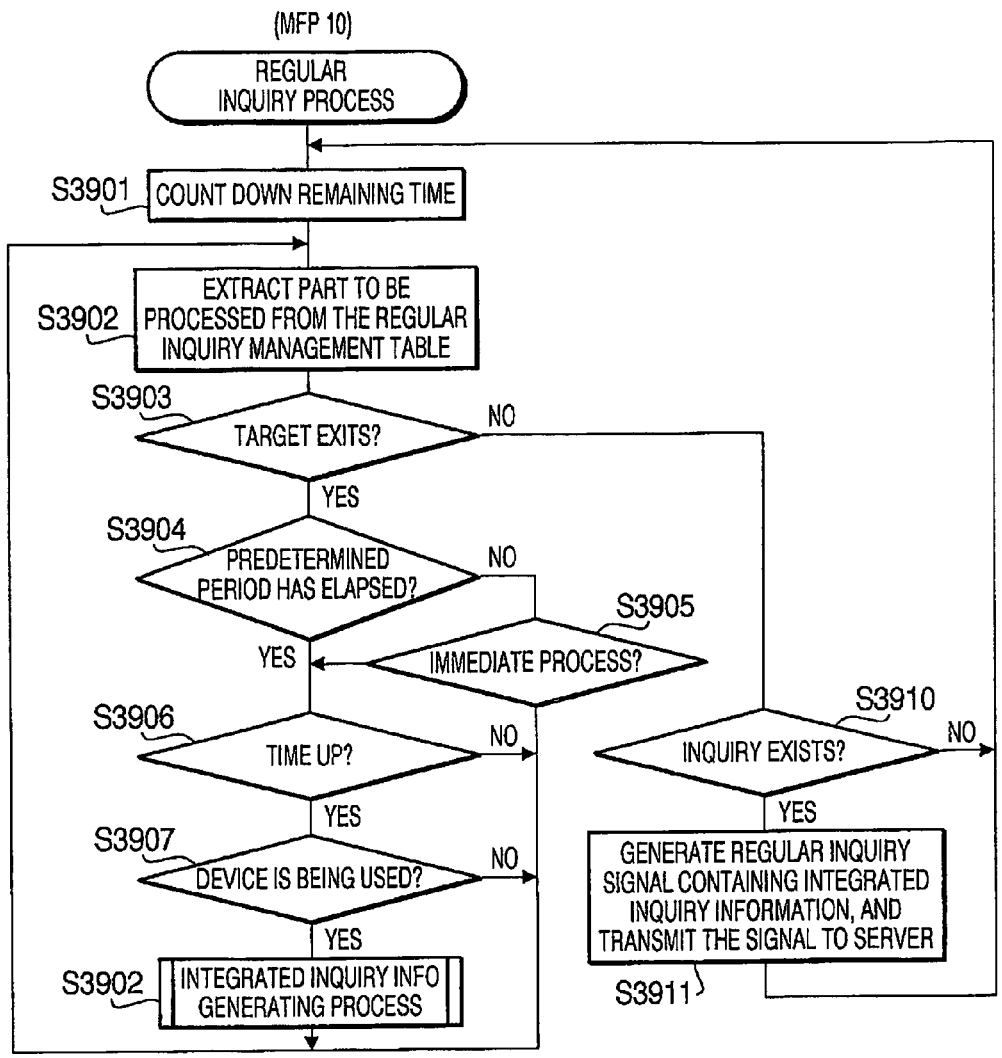
FIG. 55 shows a flowchart illustrating a regular inquiry process executed by the MFP according to the third embodiment.

Next, the regular inquiry process executed by the control unit 11 of the MFP 10 for realizing the above-described regular inquiry will be described. FIG. 55 is a flowchart illustrating the regular inquiry process. This process is started when the MFP 10 is powered on, and continuously executed until the MFP 10 is powered off.

When the regular inquiry process is started, the controller 11 updates the remaining period information in the regular inquiry management table. Specifically, in this process, a difference between a previous value (time) of an inner clock and current value of the value (time) of the inner clock is obtained, and the result (i.e., a countdown amount) is subtracted from the value represented by the remaining time information to update the remaining time information. Thus, in S3901, the countdown of the remaining period and acquisition of the inner clock value, temporary storing the same are executed.

It should be noted that, since S3901 is repeated (at a high speed) as will be described later, a certain error of the countdown amount of the remaining time information for the inquiry management information newly added to the regular inquiry management table between the previous countdown and the current countdown is allowed. Further, when S3901 is executed the first time, the countdown amount may be calculated based on the value of the inner clock obtained lastly before the MFP 10 was previously powered off, or the countdown process may be skipped and only the value of the inner clock is stored.

When S3901 is executed, the process selects one of the multiple pieces of the inquiry management information for the subjected device from the regular inquiry management table (S3902). If there is no inquiry management information for the target device, that is, if there is unprocessed inquiry management information which is not subjected to the process after S3904 (described later) (S3903: NO), and proceeds to S3910. If there is inquiry management information (i.e., unprocessed inquiry information) for the target device (S3903: YES), the process proceeds to S3904. In S3904, the process judges whether a predetermined inquiry renewal period (retaining period) (i.e., a predetermined period after the last regular inquiry signal was transmitted) has elapsed.

If it is determined that the predetermined renewal period has not elapsed (S3904: NO), the process proceeds to S3905, and judges whether the inquiry should be made immediately based on the immediate process information included in the inquiry management information of the target device. If it is determined that the immediate inquiry is unnecessary (S3905: NO), the process returns to S3902. If it is determined that immediate inquiry is necessary (S3905: YES), the process proceeds to S3906.

In S3906, based on the remaining time information contained in the inquiry management information of the selected target device, the process judges whether the transmission time of the regular inquiry for the service of the request service ID corresponding to the inquiry management information has come. If the transmission time has not yet come (S3906: NO), the process proceeds to S3902. It should be noted that, in S3906, if the remaining time information value is zero or negative, it is determined that the transmission time has come, while the remaining time information value is positive, it is determined that the transmission time has not come.

If it is determined that the transmission time has come (S3906: YES), the process judges, based on the used device information contained in the inquiry management information of the selected target device, whether the input/output device to be used when the service corresponding to the inquiry management information is occupied by other process which is being executed in parallel with the current process (S3907).

For example, if the used device information included in the inquiry management information of the target device is a "Printer", the process judges whether the recording unit 14 is used. If the used device information is the "Scanner", the process judges whether the reading unit 14 is being used. Further, if the used device information is the "Speaker", the process judges whether the audio output unit 18 is used. If the used device information is the "Microphone", the process judges whether the sound input unit 17 is used.

If the multiple input/output devices are indicated in the used device information, the process judges whether all the multiple devices are being used. If at least one of the multiple devices are used, the process judges that the input/output device necessary for receiving the service corresponding to the inquiry management information is used.

If it is determined that the input/output device is being used (S3907: YES), the process proceeds to S3908 and executes the integrated inquiry information generating process.

Integrated Inquiry Information Generating Process

Figure 56:
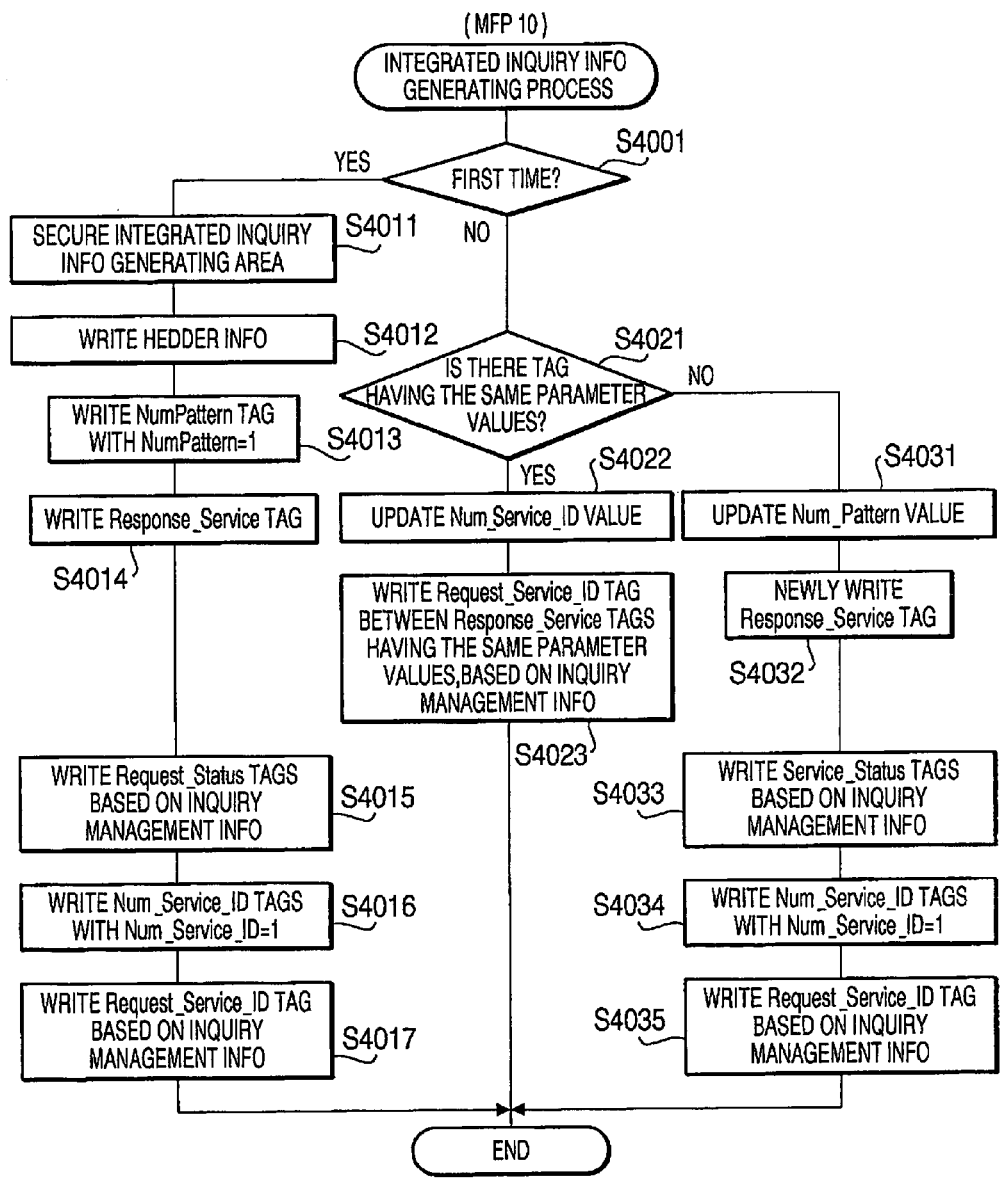
FIG. 56 shows a flowchart illustrating an integrated inquiry information generating process executed by the MFP according to the third embodiment.

FIG. 56 is a flowchart illustrating the integrated inquiry information generating process executed by the control unit 11 of the MFP 10. FIG. 57 shows the configuration of the integrated inquiry information. As shown in FIG. 57, according to the third embodiment, the integrated inquiry information is described with a markup language. The definition of the tags used in the integrated inquiry information generating process is shown in Table 1.

TABLE 1

| Data Name | Data Type | Description |
| --- | --- | --- |
| Num_Pattern | integer | the number of types of inquiring information |
| Request_Service[ ] | array of returning information | inquiry information of the same type |
| Request_Status | TRUE or FALSE | TRUE: status required FALSE: status not required |
| Num_Service_ID | integer | the number of inquiring information |
| Response_Service_ID | integer | identifier of service |

When the integrated inquiry information generating process is executed, the process judges whether the execution of the integrated inquiry information generating process is executed a first time after S3901 has been executed (S4001). If it is determined that the execution is the first time (S4001: YES), the process proceeds to S4011 and secures an area used to generate the integrated inquiry information in the RAM, and writes header information in the secured area (S4012).

According to the third embodiment, since the integrated inquiry information is transmitted with the POST command of the HTTP protocol, information related to the protocol, the destination URL, and the like are written as the header information. It should be noted that the destination of the integrated inquiry information is preliminarily determined, and in the header information, the information of the destination URL is written.

After execution of S4012, the control unit 11 generates NumPattern tags (i.e., character strings <NumPattern>1 </NumPattern>), which are added to the integrated inquiry information (integrated inquiry information generating area) in S4013. Further, a Request_Service tag is added to the integrated inquiry information (S4014).

Thereafter, between Request_Service tags (i.e., between <Request_Service> and </Request_Service>), Request_Status tags are written based on the inquiry management information request status information (S4015).

For example, when the value of the request status is "FALSE", the value of the parameter Request_Status is set to "FALSE", and Request_Status tags (character string<Request_Status>FALSE</Request_Status>) are generated, and stored in the integrated inquiry information.

When S4015 is completed, the process sets the parameter Num_Service_ID to "1", generates Num_Service_ID tags (i.e., character string of <Num_Service_ID>1</Num_Service_ID>) and writes the same between the Request_Service tags of the integrated inquiry information (S4016).

When S4016 is finished, the process sets the value of the request service ID represented by the inquiry management information of the target device to the value of the parameter Request_Service_ID, and generates Request_Service_ID tags (i.e., character strings <Request_Service_ID> (request service ID)</Request_Service_ID>), which is written between the Request_Service tags in the integrated inquiry information (S4017). Thereafter, the process finishes the integrated inquiry information generating process.

If it is determined that the execution of the integral inquiry information generating process, after execution of S3901, is the second execution or later (S4001: NO), the process judges whether there are tags having the same parameter values (S4021). That is, it is judged whether there is the Request_Status tag having the same value as the request status information contained in the inquiry management information of the target device that has already been stored in the integral inquiry information.

If it is determined that there is a tag having the same parameter value (Request_Status), the process updates the value of the Num_Service_ID tag which is located between the tag and another tag having same Request_Service tag (S4022). For example, when the tag, Num_Service_ID tag in the integral inquiry information is the character string <Num_Service_ID>1</Num_Service_ID> and has not been updated, it is updated to <Num_Serv_ID>2</Num_Service_ID>.

After S4022, the process sets the value of the request service ID indicated by the inquiry management information of the target device to the value of the parameter Request_Service_ID, and generates Request_Service_ID tags, which are written between the Request_Service tags of the integrated inquiry information (S4023). Then, the process finishes the integrated inquiry information generating process.

If it is determined that there are tags having the same parameter values (Request_Status) (S4021: NO), the process proceeds to S4031, and updates the value of the parameter NumPattern in the NumPattern tags of the integrated inquiry information. That is, when the NumPattern tag of the integrated inquiry information is the character string <NumPattern>1</NumPattern>, the character string is updated to <NumPattern>2</NumPattern>.

When S4031 is executed, the process proceeds to S4032 and writes new Request_Service tags in an area following the Request_Service tag having already been written in the integral inquiry information, and further, between the new Request_Service tags, a Request_Status tag based on the value of the request status information contained in the inquiry management information of the target device (S4033).

For example, if the value of the request status information is "TRUE", the process sets the value of the parameter Request_Status to "TRUE", and generates Request_Status tags (character string <Request_Status>TRUE</Request_Status>) and writes the character string in the integrated inquiry information.

After executing S4033, the process sets the value of the parameter Num_Service_ID to "1", generates Num_Service_ID tags (character string <Num_Service_ID>1</Num_Service_ID>), and writes the character string between new Request_Service tags in the integrated inquiry information (S4034).

After execution of S4034, the process generates Request_Service_ID tags, when setting the value of the request service ID indicated by the inquiry management information of the target device as the value of the parameter Request_Service_ID, and writes the tag between the new Request_Service tags of the integrated inquiry information (S4035). Thereafter, the process finishes the integrated inquiry information generating process, and proceeds to S3902 (see FIG. 55).

After execution of S3902, if it is determined that there is no inquiry management information of the target device (that is, the steps after S3904 are executed for all the inquiry management information indicated in the regular inquiry management table), the process proceeds to S3910, and judges whether the integrated inquiry information has been generated. If the integrated inquiry information has been generated, the process generates a regular inquiry signal storing the integrated inquiry in the integrated inquiry information generating area of the RAM, and transmits the regular inquiry signal to the function server 30 of the destination through the communication unit 15 (S3911). Then, the process returns to S3901.

If it is determined that the integral inquiry information has not been generated (i.e., S3908 has not been executed) (S3910: NO), the process proceeds to S3901 without executing S3911, and re-executes counting down of the remaining time period.

Regular Inquiry Replying Process

Figure 58:
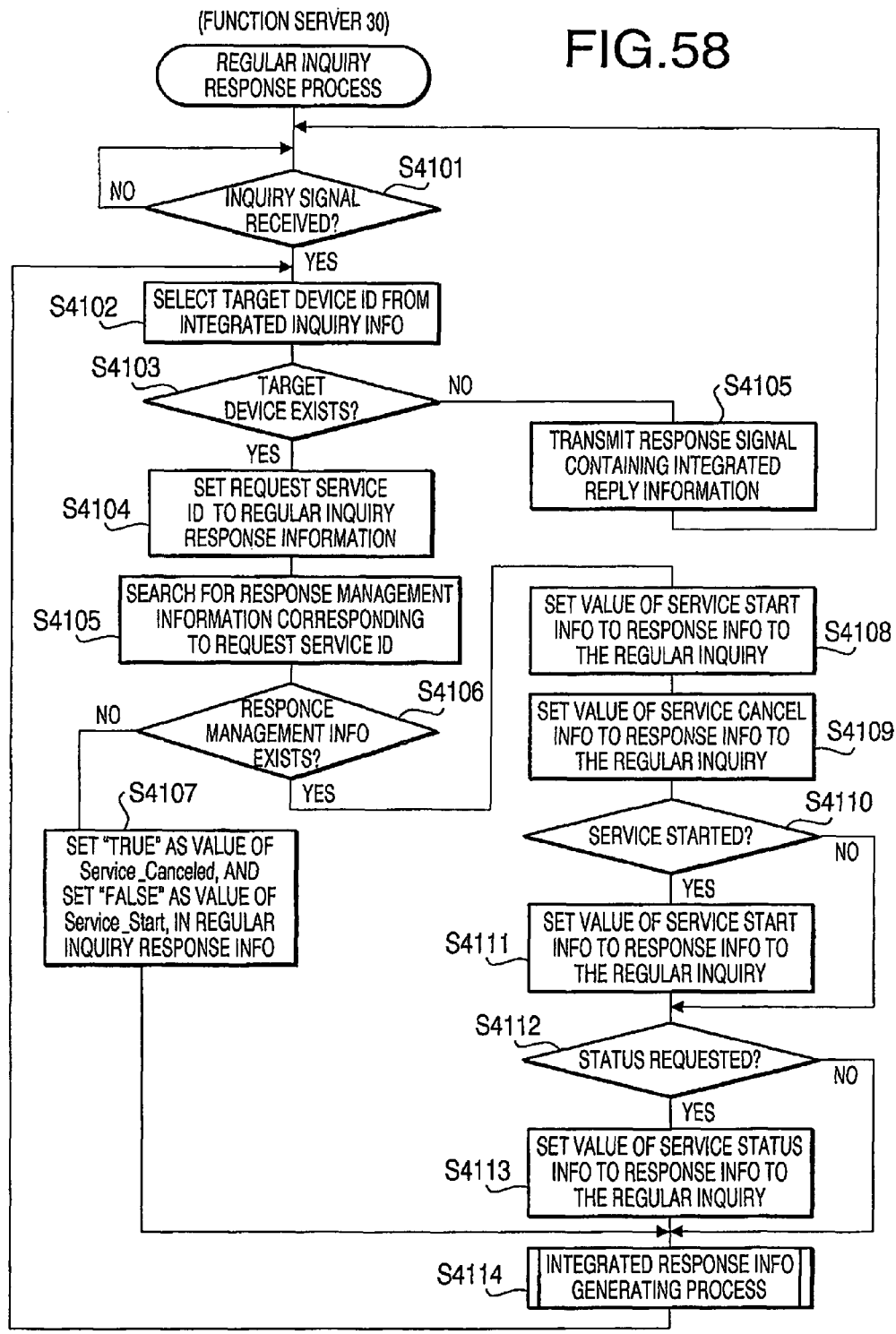
FIG. 58 shows a flowchart illustrating a regular inquiry reply process executed by the function server according to the third embodiment.

Next, a regular inquiry replying process executed by the function server 30 that receives the regular inquiry signal transmitted from the MFP 10 in S3911 will be described. FIG. 58 is a flowchart of the regular inquiry replying process executed by the control unit 31 of the function server 30. The regular inquiry replying process is executed continuously during operation of the function server 30.

When the inquiry replying process is executed, the process pauses until it receives the regular inquiry signal from the MFP 10 (S4101). When the process receives the regular inquiry signal, the process selects one request service ID to be processed from among the integrated inquiry information included in the regular inquiry signal (S4102).

If the request service ID to be processed is not included, that is, if the unprocessed request service ID is not included in the regular inquiry signal (S4103: NO), the process proceeds to S4115. If there are unprocessed request service IDs (S4103: YES), the process proceeds to S4104. In S4104, the process secures, in the RAM, a regular inquiry replying information generating area used for generating the regular inquiry replying information representing the reply to the request service ID, and the request service IDs to be processed are stored as the value of the parameter Request_Service_ID in the regular inquiry replying information generating area.

Next, the process searches for the reply management information corresponding to the request service ID to be processed in the reply management table stored in the storage unit 33 (S4105). If the request service ID has not be searched, the process determines that the reply management information corresponding to the request service ID to be processed is not included in the regular inquiry replying management table (S4106: NO), and proceeds to S4107. Then, the process writes, in the above-described regular inquiry replying information generating area, "TRUE" as the value of the parameter Service_Canceled. Further, the process writes, as the value of the parameter Service_Start, "FALSE". When S4107 has been finished, the process proceeds to S4114, where the integrated reply information generating process, which is shown in FIG. 55, is executed.

If the reply management information corresponding to the request service ID to be processed can be identified (searched) in the regular inquiry reply management table stored in the storage unit 33 (S4106: YES), the process stores the value of the service start information contained in the reply management information corresponding to the request service ID to be processed, as the parameter Service_Start, in the regular inquiry replying information generating area (S4108).

When S4108 is executed, the process proceeds to S4109, where the process writes the value of the service cancel information contained in the reply management information corresponding to the request service ID to be processed as the value of the parameter Service_Canceled.

When S4109 is executed, the process proceeds to S4110. In S4110, the process judges whether the value of the parameter Service_Start written in the regular reply information generating area is "TRUE". If it is determined that the value of the parameter Service_Start is "TRUE" (S4110: YES), the process proceeds to S4111, where the process stores the value (character string) of the service URL information, which the reply management information includes, in the regular inquiry replying area as the value of the parameter Service_URL (S4111). Then, the process proceeds to S4112.

If it is determined that the value of the parameter Service_Start written in the regular inquiry replying information generating area is not "TRUE" (i.e., is "FALSE"), the process proceeds to S4112 without executing S4111.

In S4112, the process judges whether the value of the Request_Status tag (the Request_Status tag between the Request_Service tags where the request service ID to be processed is described) is "TRUE". If the value is "TRUE" (S4112: YES), the process proceeds to S4113. In S4113, the process writes the value of the service status information contained in the reply management information corresponding to the request service ID to be processed, as the value of the parameter Service_Status, in the regular inquiry reply information generating area.

If it is determined that the value of the Request_Status which is related to the request service ID to be processed in the integrated reply information is not "TRUE" (i.e., is "FALSE") (S4112: NO), the process proceeds to S4114 without executing S4113.

Integrated Reply Information Generating Process

Figure 59:
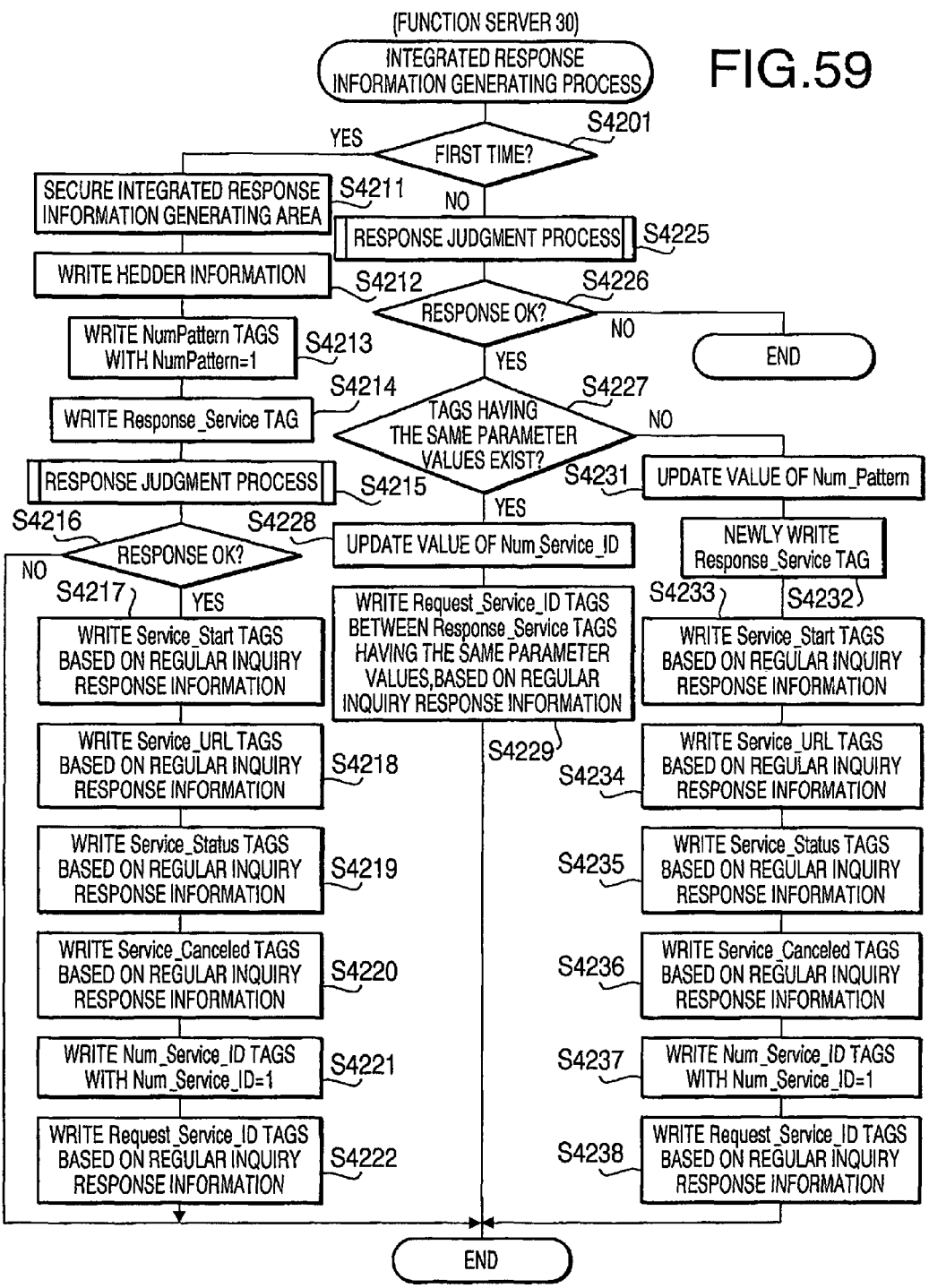
FIG. 59 shows a flowchart illustrating an integrated reply information generating process executed by the function server according to the third embodiment.
Figure 60:
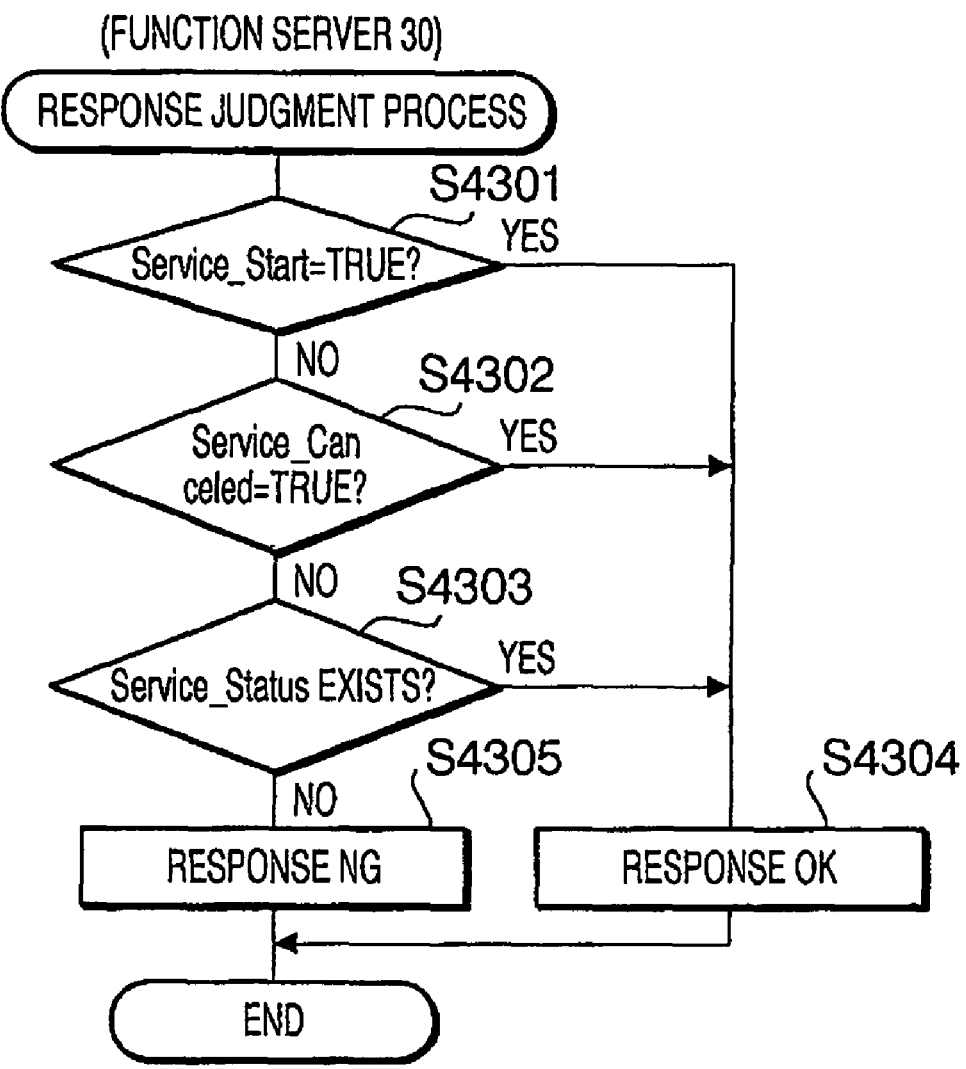
FIG. 60 shows a flowchart illustrating a reply judgment process executed by the function server according to the third embodiment.

In S4114, the control unit 31 executes the integrated reply information generating process. FIG. 59 shows a flowchart of the integrated reply information generating process executed by the control unit 31. FIG. 60 is a flowchart illustrating a reply judgment process called in the integrated reply information generating process. FIG. 61 shows a configuration of the integrated reply information. The integrated reply information is described using the markup language as shown in FIG. 61. The definition of the tags used in the integrated reply information is explained in Table 2.

TABLE 2

| Data Name | Data Type | Description |
| --- | --- | --- |
| Num_Pattern | integer | the number of types of returning information |
| Response_Service[ ] | array of returning information | returning information of the same type |
| Service_Start | TRUE or FALSE | TRUE: ready to provide service<br>FALSE: not ready to provide service |
| Service_URL | URL character string | address of service program to start the service |
| Service_Status | integer | status number (error: negative) |

TABLE 2-continued

| Data Name | Data Type | Description |
| --- | --- | --- |
| Service_Canceled | TRUE or FALSE | TRUE: service stopped FALSE: service not stopped |
| Num_Service_ID | integer | the number of returning information |
| Response_Service_ID | integer | identifier of service |

When the integrated reply information generating process is started, the process judges whether the process is executed a first time after the regular inquiry signal has been received in S4101. If the execution is the first time (S4201: YES), the process proceeds to S4211, where the process secures an integrated reply information generating area for generating the integrated reply information in the RAM, and writes the header information in the integrated reply information area (S4212).

After execution of S4212, the process generates NumPattern tags (character string <NumPattern>1</NumPattern>) with the value of the parameter NumPattern being one (1), and add the tags to the integrated reply information (i.e., integrated reply information generating area of the RAM) in S4213. Further, the process adds the Response_Service tag in the integrated reply information (S4214). Thereafter, the process executes the reply judgment process (see FIG. 60).

When the reply judgment process is executed, the control unit 31 judges whether the value of the parameter Service_Start represented by the regular inquiry reply information (i.e., the information written in the regular inquiry reply information generating area) corresponding to the request service to be processed is "TRUE" in S4301. If it is determined that the value of the parameter Service_Start is "TRUE" (S4301: YES), the process determines that reply is OK (S4304).

If it is determined that the value is not "TRUE" (S4301: NO), the process proceeds to S4302, and judges whether the parameter Service_Canceled represented by the regular inquiry reply information is "TRUE" (S4302).

If it is determined that the value of the parameter Service_Canceled is "TRUE" (S4302: YES), the process proceeds to S4304, and determines that the reply is OK. If it is determined that the parameter Service_Canceled is not "TRUE" (S4302: NO), the process proceeds to S4303 and judges whether the value of the parameter Service_Status is included in the regular inquiry reply information. If it is determined that the parameter value exists (S4303: YES), the process proceeds to S4304, and determines that the reply is OK. If it is determined that the parameter value is not included in the regular inquiry reply information, the process proceeds to S4305, determines that reply is NG, and finishes the reply judging process.

When the reply judgment process is finished in S4215, the process judges, in S4216 (FIG. 59), whether the judgment in the reply judgment process is "reply OK". If the result is not "OK" (i.e., "reply NG") (S4216: NO), the process finishes the integrated reply information generating process. If the result is "reply OK" (S4216: YES), the process proceeds to S4217.

In S4217, the process writes the Service_Start tag between the Response_Service tags (i.e., between <Response_Service> and </Response_Service>) based on the regular inquiry replying information corresponding to the request service ID to be processed (i.e., the information stored in the regular inquiry reply information generating area).

For example, if the value of the parameter Service_Start of the regular inquiry reply information is "TRUE", as the Service_Start tag, the character string <Service_Start>TRUE</Service_Start> is generated, and stored in the integrated reply information.

When S4217 is executed, the process writes the Service_URL tag between the Response_Service tags based on the regular inquiry reply information corresponding to the request service ID to be processed in S4218. It should be noted that, if the value of the parameter Service_URL is not included in the regular inquiry reply information, the process generates a character string <Service_URL></Service_URL> as the Service_URL tags, and if the value of the parameter Service_URL exists, the process generates the Service_URL tags having the value, and writes the same in the integrated reply information.

When S4218 is executed, the process writes the Service_Status tag between the Response_Service tags based on the regular inquiry reply information corresponding to the request service ID to be processed (S4219).

In this case, if the value of the parameter Service_Status does not exist in the regular inquiry reply information the process generates a character string <Service_Status></Service_Status> as the Service_Status tags, and if there is a value for the parameter Service_Status, generates the Service_Status tags with the value being described, and write the tags in the integrated reply information.

After execution of S4219, the process writes the Service_Canceled tags between the Response_Service tags based on the regular inquiry reply information corresponding to the request service ID corresponding to the request service ID to be processed (S4220).

For example, when the value of the parameter Service_Canceled of the regular inquiry reply information is "FALSE", the process generates the character string <Service_Canceled>FALSE</Service_Canceled> as the Service_Canceled tags, and stores the same in the integrated reply information.

When S4220 is executed, the process generates Num_Service_ID tags (character string <Num_Service_ID>1</Num_Service_ID>) with the value of the parameter Num_Service_ID being one (1). The Num_Service_ID tag is written between the Response_Service tags of the integrated reply information (S4221).

When S4221 is executed, the process proceeds to S4222, where the process generates the Request_Service_ID tags (i.e., the character string <Request_Service_ID>(request service ID)</Request_Service_ID) using the value of the request service ID to be processed as the value of the parameter Request_Service_ID. Then, the Request_Service_ID tags are stored between the Response_Service tags in the integrated reply information. Then, the process finishes the integrated reply information generating process.

If it is determined that execution of the integrated reply information generating process is the second time or later (S4201: NO), the process executes the reply judgment process in S4225 (see FIG. 60), and judges whether the result of the reply judgment process is OK (i.e., reply OK) (S4226). If it is determined that the result is not OK (i.e., reply NG) (S4226: NO), the process finishes the integrated reply process.

If it is determined that the result is "reply OK" (S4226: YES), the process proceeds to S4227, and judges whether the Response_Service tag having the parameter value that is the same as the regular inquiry reply information of the request service ID to be processed exists. That is, it is judged whether there is Response_Service tag having a value which is the same as the information other than the request service ID contained in the regular inquiry reply information of the request service ID to be processed (e.g., values of the parameters Service_Start, Service_URL, Service_Status, Service_Canceled).

If it is determined that there is a Response_Service tag having the same parameter values, the process updates the value of the Num_Service_ID tags between the Response_Service tags (S4228). For example, if the Num_Service_ID tags before updated are represented by the character string <Num_Service_ID>1</Num_Service_ID>, the character string is updated to <Num_Service_ID>2</Num_Service_ID>.

After executing S4228, the process generates the Request_Service_ID tags using the value of the request service ID to be processed as the value of the parameter Request_Service_ID, and stores the same between the Response_Service tag which has the same parameter value (S4229). Thereafter, the integrated reply information generating process will be finished.

If it is determined that there is no Response_Service tag having the same parameter values (S4227: NO), the process proceeds to S4231, and updates the value of the parameter NumPattern of the NumPattern tag of the integrated reply information. For example, when the NumPattern tag of the integrated reply information is a character string <NumPattern>1</NumPattern>, the process updates the character string to <NumPattern>2</NumPattern>.

It should be noted that, in S4231, if the integrated reply information includes a null Response_Service tag (e.g., when S4231 is executed first time after the judgment in S4216 is "NO"), the value of the parameter NumPattern is not updated, as an exception.

When S4231 is executed, the process proceeds to S4232, and writes new Response_Service tags in an area following the Response_Service tags already included in the integrated reply information. It should be noted that, when S4232 is executed, if the integrated reply information includes a null Response_Service tag, the new Response_Service tag will not be written as an exception.

When S4232 is executed, the process proceeds to S4233, where the process writes the Service_Start tags between the new Response_Service tag (null Response_Service tag) based on the regular inquiry reply information corresponding to the request service ID to be processed.

For example, if the value of the parameter Service_Start in the regular inquiry reply information is "FALSE", the process generates a character string <Service_Start>FALSE</Service_Start>, which will be written in the integrated reply information.

When S4233 is executed, the process writes the Service_URL tags between the Response_Service tags (S4234), based on the regular inquiry reply information corresponding to the request service ID to be processed. Further, the process writes the Service_Status tags between the Response_Service tags (S4235) based on the regular inquiry reply information corresponding to the request service ID to be processed.

When S4235 is executed, the process writes the Service_Canceled tags between the Response_Service tags (S4235) based on the regular inquiry reply information corresponding to the request service ID to be processed. Then, the process sets the value of the parameter Num_Service_ID to "1" and generates the Num_Service_ID tags, and writes the same between the Response_Service tags in the integrated reply information (S4237).

When S4237 is executed, the process generates the Request_Service_ID tags using the value of the request service ID to be processed as the value of the parameter Request_Service_ID, and writes the same between the Response_Service tags of the integrated reply information (S4238). Then, the process finishes the integrated reply information.

As above, the integrated reply information generating process is executed in S4114 (FIG. 58), the process proceeds to S4102 and selects the next subject (unprocessed request service ID) from among the integrated inquiry information. If there is no unprocessed request service ID, the process proceeds to S4115, and generates the response signal containing integrated reply information stored in the integrated reply information. The information is transmitted to the MFP 10 that is the source of the regular inquiry signal, via the communication unit 32. Then, the process proceeds to S4101, where the process pauses until the next regular inquiry signal is received.

Blog Searching Process

Figure 62:
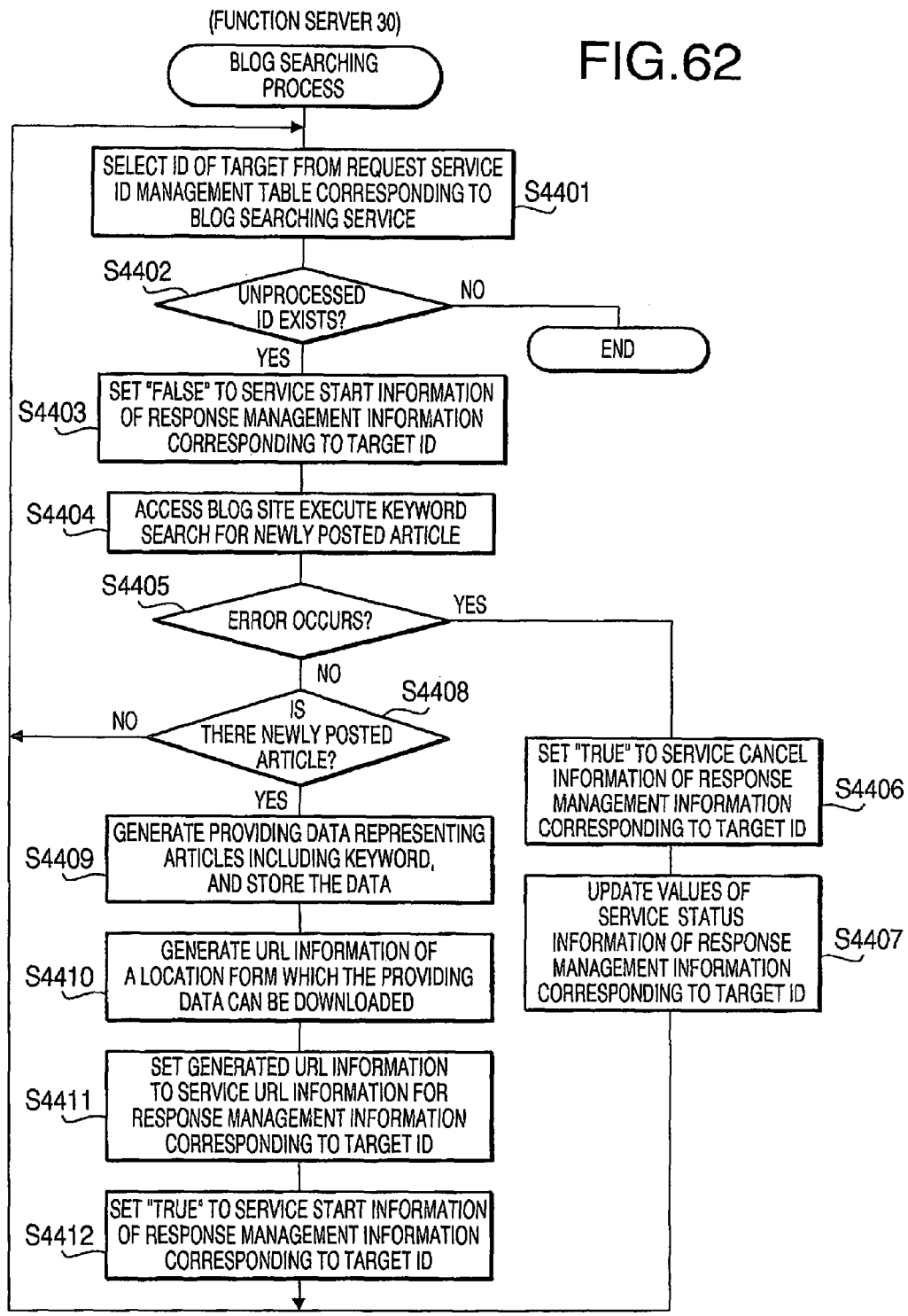
FIG. 62 shows a flowchart illustrating a blog search process executed by the function server according to the third embodiment.

Next, a blog searching process which generates information to be provided to a registered MFP 10 will be described. FIG. 62 is a flowchart illustrating the blog searching process executed by the control unit 31 of the function server 30. The blog searching process is repeatedly executed at every predetermined period during operation of the function server 30.

When the blog searching process is executed, the process selects one of the request service IDs to be processed from the request service ID management table corresponding to the blog searching service. It should be noted that if there is no request service IDs in the request service ID management table (i.e., there is no request service IDs to be processed in the processing after S4403), the judgment in S4402 is NO, and the process finishes the blog searching process.

If there are request service IDs to be processed (i.e., unprocessed), the judgment in S4402 is YES. In this case, the process sets the service status information, which is included in the reply management information in the regular inquiry reply management table corresponding to the request service ID to be processed to "FALSE" (S4403).

Then, the process sets the value of the parameters which are stored, in relation to the request service IDs to be processed, in the request service ID management table as keywords, accesses a predetermined blog site, and searches for posted articles containing the keywords from among news articles (S4404).

If an error occurs during the search as the values of the parameters stored in the request service ID management table are inappropriate (S4405: YES), the process updates the service cancel information contained in the reply management information in the regular inquiry reply management table corresponding to request service ID to be processed to "TRUE" (S4406).

Further, the process obtains the value of the service status corresponding to the cause of the error, and the obtained value is reflected in the service status information in the regular inquiry reply management table corresponding to the request service ID to be processed (S4407). Thereafter, the process proceeds to S4401, and selects an unprocessed request service ID from the request service ID management table.

If the searching operation in S4404 has been finished normally (S4405: NO), the process proceeds to S4408, and determines whether newly posted articles are found in the blog site as a result of the search. If there is no newly posted article, the process proceeds to S4401.

If a newly posted article includes one of the above-set keywords is found (S4408: YES), the process proceeds to S4409 and generates providing data indicating the contents of the posted article. Then, the providing data is stored in the storage unit 33. Further, the process proceeds to S4410, where the process generates a URL (e.g., a character string such as "http://**.cojp/cgi/blog?F=***") from which the providing data can be downloaded. Further, the service URL information corresponding to the request service ID to be processed in the regular inquiry reply management table is updated to the above-described URL information from where the data can be downloaded (S4411).

When S4411 is executed, the process changes service status information corresponding to the request service ID to be processed in the regular inquiry reply management table is changed to the value "TRUE" (S4412). Thereafter, the process proceeds to S4401, and selects one of unprocessed request service IDs. When, for all the request service IDs indicated in the request service ID management table, the processing after S4403 is executed, the judgment in S4402 becomes "NO", and the process finishes the blog search process.

Local News Providing Service

Figure 63:
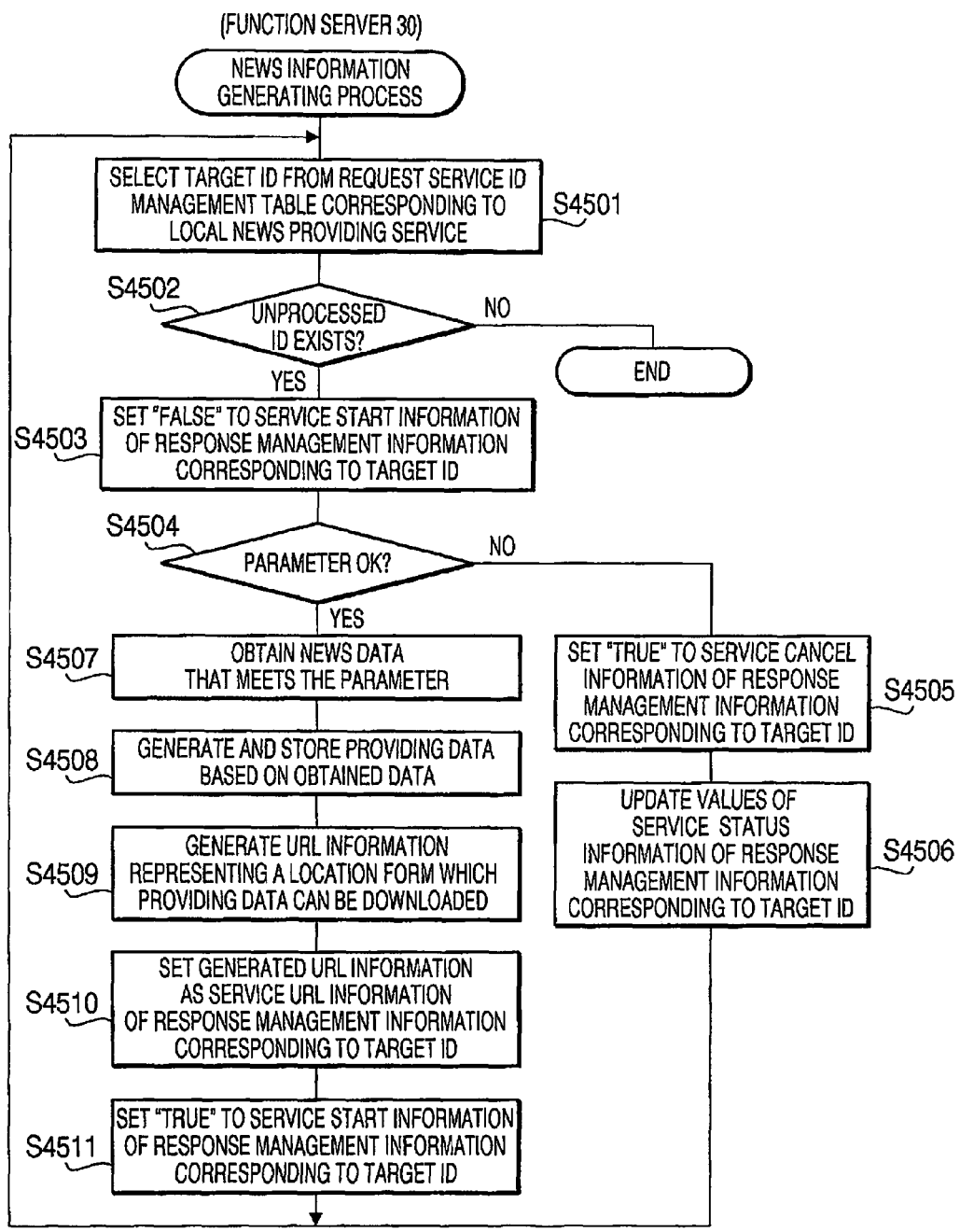
FIG. 63 shows a flowchart illustrating a news information generating process executed by the function server according to the third embodiment.

Next, a local news providing service will be described. FIG. 63 shows a flowchart illustrating a news information generating process to be executed by the control unit 31 of the function server 30. The news information generating process is repeatedly executed, during operation of the function server 30, at every predetermined interval.

When the news information generating process is executed, the process selects a request service ID from the request service ID management table corresponding to the local news providing service (S4501). If there is no request service ID to be processed, that is, if there is no unprocessed request service ID that is not subjected to be processed in S4503, the judgment in S4502 becomes "NO", and the process finishes the news information generating process.

If there are request service IDs to be processed (i.e., if there are unprocessed request service IDs), the judgment in S4502 is "YES", and the process updates the service status information included in the reply management information in the regular inquiry reply management table to "FALSE" (S4503).

Thereafter, the process judges whether the values of the parameters stored in the request service ID management table in relation to the request service have inappropriate values (S4504). If the values are inappropriate (S4504: NO), it is determined that an error has occurred. In such a case, the process updates the service cancel information in the regular inquiry reply management table corresponding to the request service ID to be processed to have the value of "TRUE" (S4505).

Further, the process detects the value of the service status corresponding to the cause of the error, and reflects the detected value to the service status information in the regular inquiry reply management table corresponding to the request service ID to be processed (S4506). Then, the process proceeds to S4501, and selects an unprocessed request service ID from the request service ID management table.

If it is determined that the value of each parameter is not an inappropriate value (i.e., appropriate value) (S4504: YES), process proceeds to S4507, and the process obtains local news data which meets the value of the parameter Address (see FIGS. 44, 51A and 51B) stored in the request service ID management table in relation to the request service ID to be processed from predetermined database (not shown). After S4507 is executed, the process proceeds to S4508 and converts the local news data obtained above into providing data (e.g., PDF data) having the number of pages that meets the parameter NumPages (see FIGS. 44, 51A, 51B), thereby generating the providing data. Then, the process stores the providing data in the storage unit 33.

After S4508 is executed, the process generates the URL information of the location from which the providing data, stored above, can be downloaded (S4509), and changes the service URL information corresponding to the request service ID to be processed in the regular inquiry reply management table into the URL information from which the data can be downloaded, which is generated above (S4510).

When S4510 is finished, the process changes the service status information corresponding to the request service ID to be processed in the regular inquiry reply management table to "TRUE" (S4511). Then, the process proceeds to S4501, and selects an unprocessed request service ID from the request service ID management table. When the steps after S4503 are executed for all the request service IDs listed in the request service ID management table, judgment in S4502 is "NO", and the news information generating process is finished.

Integrated Reply Information Receiving Process

Figure 64:
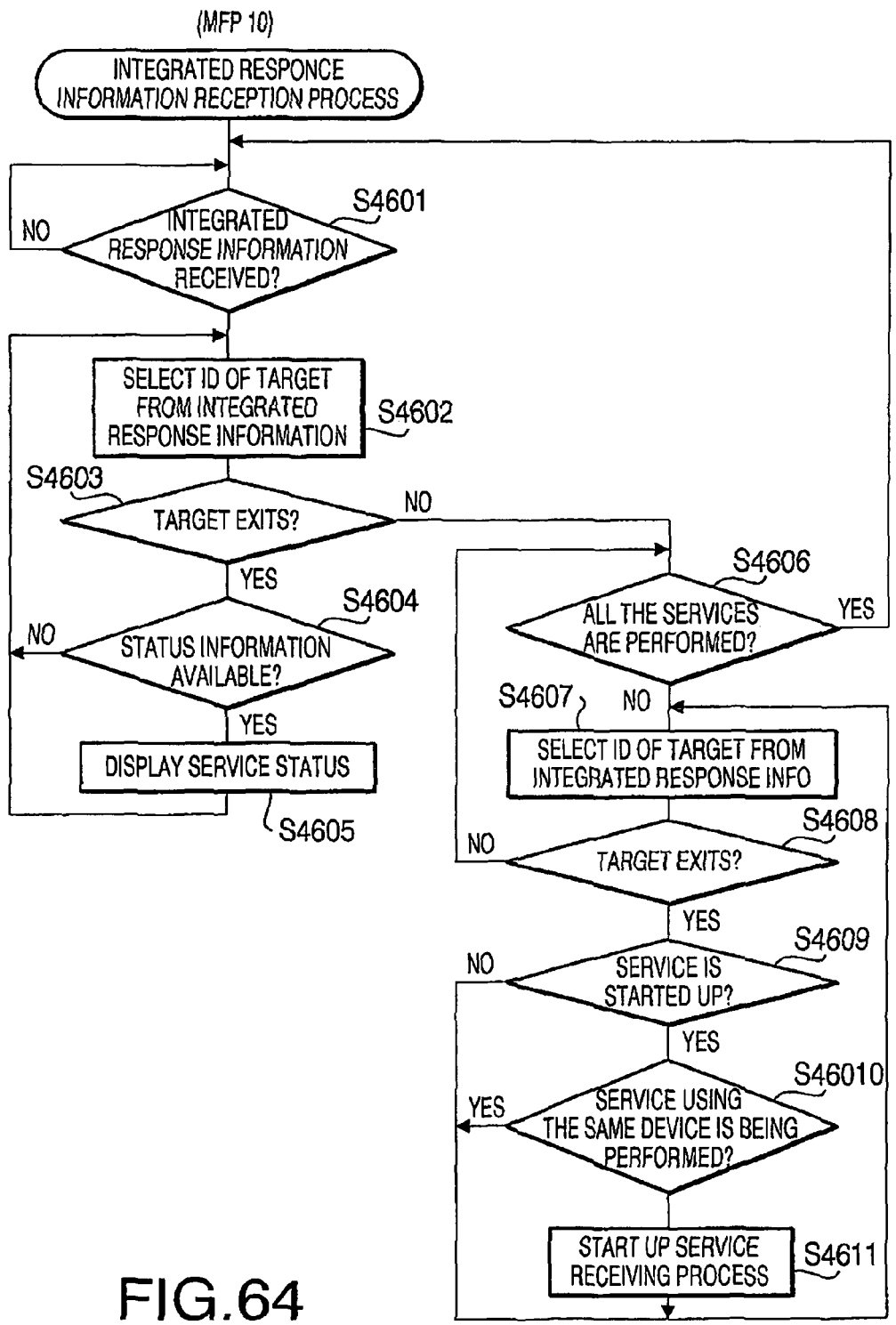
FIG. 64 shows a flowchart illustrating an integrated reply information receiving process executed by the MFP according to the third embodiment.

Next, an integrated reply information receiving process for receiving the integrated receiving information and receiving a service based on the integrated reply information will be described. FIG. 64 is a flowchart illustrating the integrated reply information receiving process executed by the control unit 11 of the MFP 10.

When the integrated reply information receiving process is executed, the control unit 11 pauses (S4601) until it receives a reply signal (integrated reply information), in response to the regular inquiry signal, transmitted from the function server 30 via the communication unit 15. When the process receives the reply signal, the process selects one request service ID to be processed from the integrated reply information included in the reply signal as received (S4602). If there is no request service ID to be processed (i.e., if there is no unprocessed request service ID which is not subjected to be processed in steps S4604 onwards), judgment in S4603 is "NO", and the process proceeds to S4606. If there is unprocessed request service ID, judgment in S4603 is "YES" and the process proceeds to S4604.

When the process proceeds to S4604, the process judges whether the value of the parameter Service_Status is included in the Service_Status tags described in the integrated reply information. That is, the process judges whether the value of the parameter Service_Status is described between the Response_Status tags that are described between the Response_Service tags including the request service ID to be processed.

If it is determined that the parameter Service_Status has no values (i.e., <Service_Status></Service_Status>, the process proceeds to S4602. If the parameter Service_Status has a value, the process proceeds to S4605, and displays the status information corresponding to the value of the parameter Service_Status on the display 19a of the display unit 19. Thereafter, the process proceeds to S4602, selects another unprocessed request data ID to be processed, and executes steps S4604 onwards again.

When, for all the request service IDs described in the integrated reply information, the process in S4604 onwards is executed, the process determines "NO" in S4603, and proceeds to S4606. Then, for all the request service IDs related to the Service_Start tags in which "TRUE" is described, the process judges whether the service corresponding to the request service ID is received from the function server 30.

If there is a request service ID that has not received the service from the function server 30 within the request service IDs related to the Service_Start tags in which "TRUE" is described, the decision in S4606 is "NO" and the process proceeds to S4607. Then, the process selects one of the request service IDs to be processed in the integrated reply information.

If there is no request service ID to be processed, such that is no unprocessed request service ID is subjected to the process in S4609 onward, the judgment in S4608 is "NO", and the process proceeds to S4606. If there is unprocessed request service ID, the judgment in S4608 is "YES" and the process proceeds to S4609.

If it is determined that the value "TRUE" is not described in the Service_Start tags (S4609: NO), the control unit 11 proceeds to S4607. If it is determined that the value "TRUE" is described in the Service_Start tags (S4609: YES), the process proceeds to S4610. In S4610, the process judges whether input/output devices (e.g., reading unit 13, recording unit 14, sound input unit 17, sound output unit 18) to be used when the process receives the service corresponding to the request service ID to be processed from the function server 30 are being used based on the device information in the regular inquiry management table.

If it is determined that the input/output devices are being used (S4610: YES), the process proceeds to S4607. If the input/output devices are not being used (S4610: NO), the process proceeds to S4611, where the process sets the value of the Service_URL tags of the integrated reply information related to the request service ID to be processed to arguments, and starts up the service reception process (FIG. 46).

Thereafter, the process proceeds to S4607, selects the unprocessed request service ID from the integrated reply information. If the value "TRUE" is described in the Service_Start tags described in the integral reply information related to the request service ID, in parallel with the service receiving process previously started up, another service receiving process is started up. It should be noted, however, the parallel processing is done only when the judgment in S4610 is "NO". That is, the parallelly executed process is a process using an input/output device different from one currently used for the receiving service.

That is, in S4607 through S4611, services corresponding to the request service ID in which the value "TRUE" is described and using different input/output devices can be executed parallelly.

On the contrary, the service receiving processes using the same input/output devices, the judgment in S4608 is "NO", and the judgment in S4606 is "NO", and the process after S4607 is executed, thereby, multiple processes being executed subsequently.

If, for all the request service IDs related to the Service_Start tags including the value "TRUE", the services corresponding to the request service IDs are received from the function server 30 (i.e., the service receiving processes are started), the judgment in S4606 is "YES" and the control unit 11 proceeds to S4601. Then, the process pauses until the next integrated reply information is received.

Figure 65:
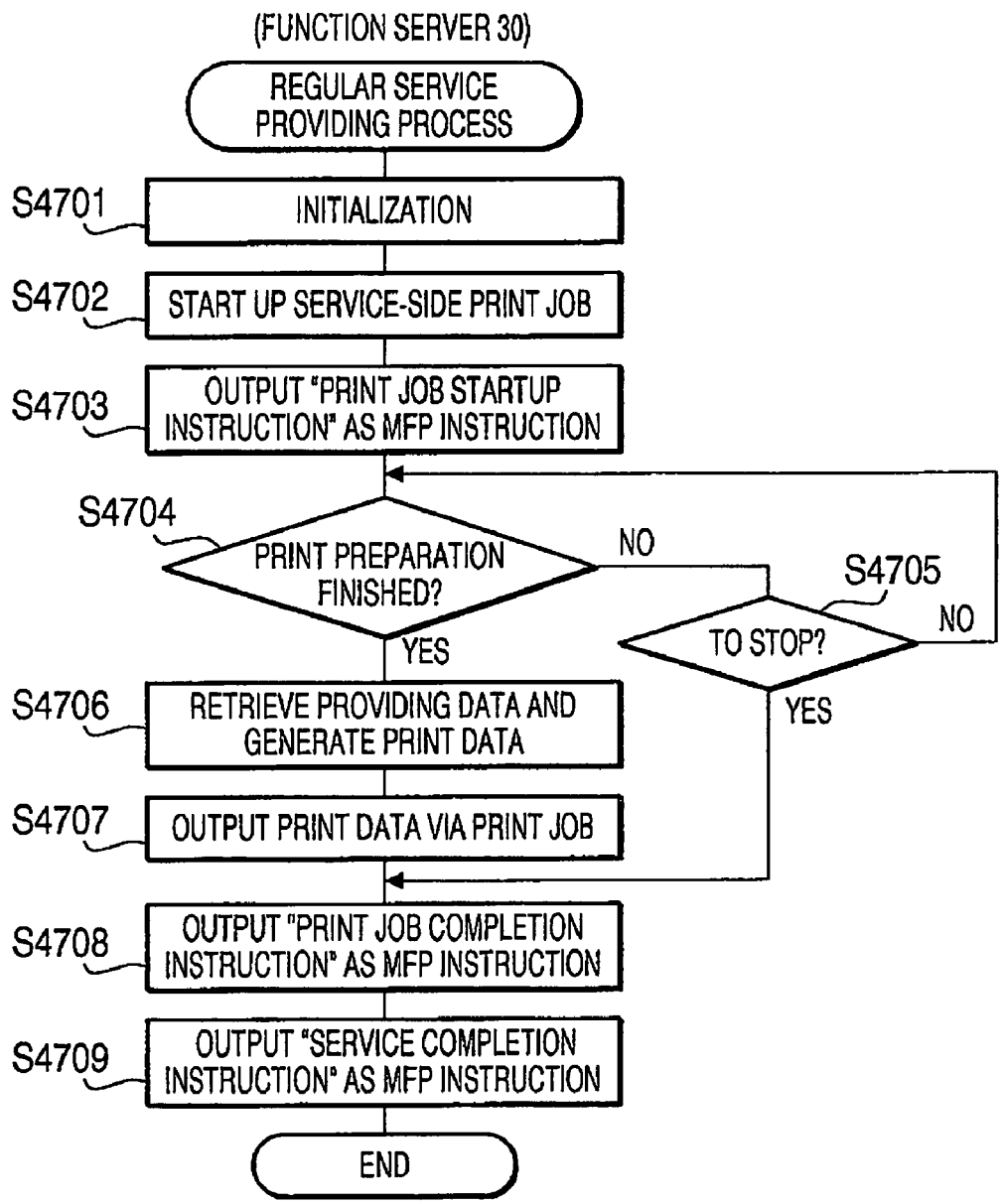
FIG. 65 shows a flowchart illustrating a regular service providing process executed by the function server according to the third embodiment.

Next, the process regarding provision of the service executed in the function server 30 will be described. The control unit 11 of the MFP 10 processes the request service ID corresponding to the blog searching service or local news providing service, and when the control unit 11 starts the service receiving process in S4611, the control unit 11 can access the function server 30 based on the service URL information, and have the function server 30 execute the regular service providing process shown in FIG. 65 (S3301). Here, FIG. 65 is a flowchart illustrating the regular service providing process. It should be noted that, according to the third embodiment, in the service URL information, the URL information of the function server 30 (e.g., the URL information of the function server 30 when the regular service providing process shown in FIG. 65 is started at S3405 of FIG. 48), by which the regular service providing process for realizing the blog searching service and local news providing service are executed, is described.

As the regular service providing process is executed, the control unit 31 executes the initialization in S4701, and starts up the service-side print job (see FIG. 66) in S4702. Next, in S4703, the control unit 31 outputs the "print job startup instruction" as the MFP instruction. Specifically, in the reply information storage area corresponding to the session ID generated in S3405, the "print job startup instruction" is written.

With the above processing, the "print job startup instruction" is transmitted to the MFP 10, via the service control information process, as the MFP instruction. In the "print job startup instruction", the job ID and job communication URL regarding the service-side print job started up in S4702 are included.

When S4703 is executed, the control unit 31 proceeds to S4704, and judges whether it receives the print preparation completion notification from the service-side print job. If the notification has not been received (S4704: NO), the process proceeds to S4705, and judges whether it has received termination notification from the service-side print job. If the termination notification has not been received (S4705: NO), the process is returned to S4704, to pause until the preparation notification or termination notification is received from the service-side print job. If the process receives the termination notification (S4705: YES), the process proceeds to S4708. If the print ready notification is received (S4704: YES), the process proceeds to S4706.

In S4706, the control unit 31 retrieves the providing data for download, which is designated with the URL information from the MFP 10 side when the regular service providing process is started. Then, the retrieved providing data is converted into the print data suitable to the function of the recording unit 14 of the MFP 10. Then, the control unit 31 provides the converted print data to the service-side print job. Then, the converted print data is transmitted to the MFP 10 which has accessed the function server 30 via the service-side print job (S4707).

When S4707 is executed, the control unit 31 proceeds to S4708, and pauses unit the service-side print job is finished. When the print job is finished, the control unit 31 outputs the "print job completion instruction" as the MFP instruction. Specifically, the control unit 31 writes the "print job completion instruction" in the reply information storage area corresponding to the session ID generated in S3405.

With the above operation, the "print job completion instruction" is transmitted to the MFP 10 as the MFP instruction via the service control information process. It should be noted that the "print job completion instruction" includes the job ID and job communication URL.

When the "print job completion instruction" has been output, the control unit 31 proceeds to S4709 and output "service completion instruction" as the MFP instruction. Then, the "service completion instruction" is received by the MFP 10. When S4709 is finished, the control unit 31 of the function server 30 finishes the regular service providing process.

Service-Side Print Job

Figure 66:
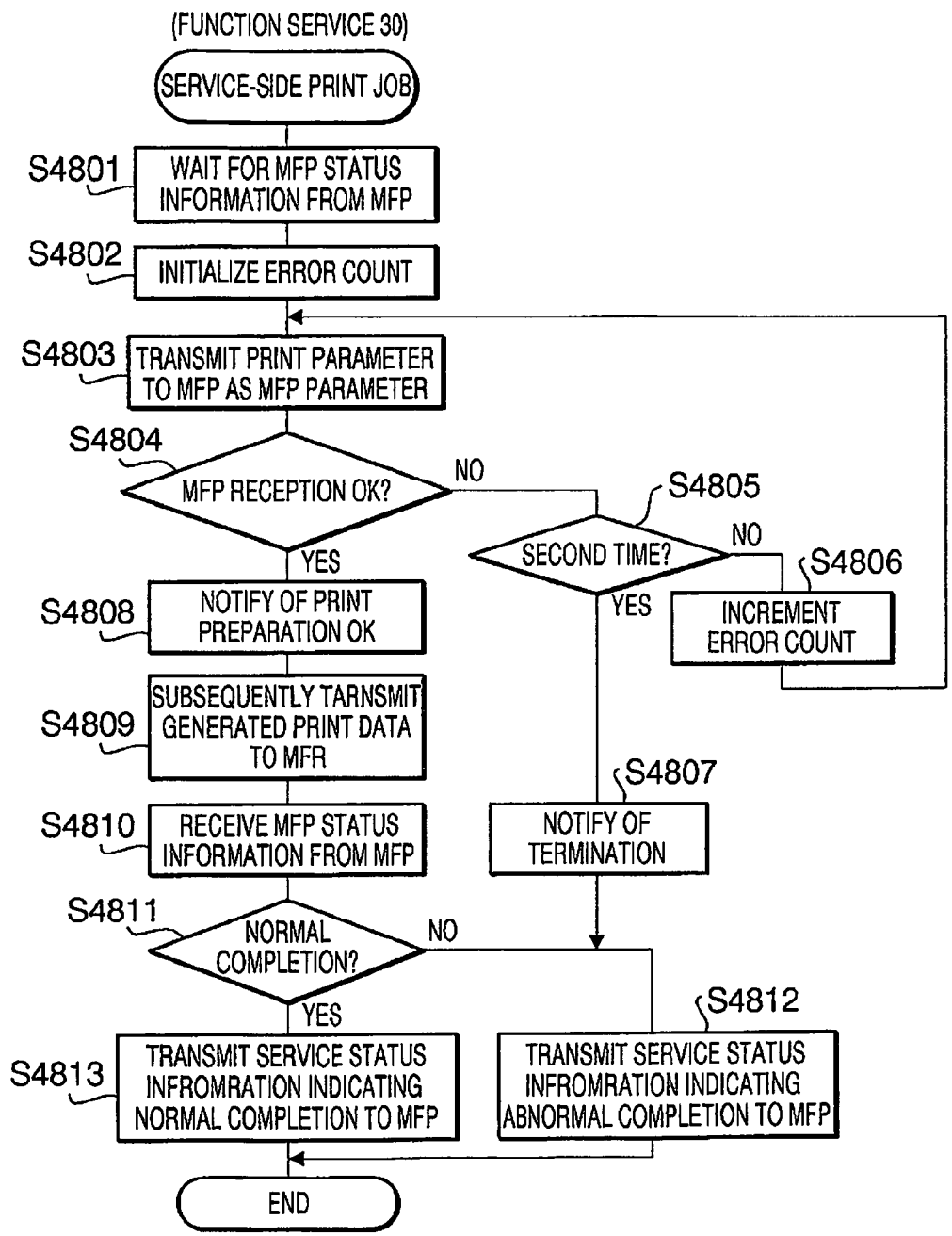
FIG. 66 shows a service side print job executed by the function server according to the third embodiment.

Next, the service-side print job executed in S4702 of FIG. 65 will be described. FIG. 66 shows a flowchart of the service-side print job, which is executed by the control unit 31 of the function server 30. The service-side print job can be executed in parallel with other processes.

When the service-side print job is started, the control unit 31 pauses until the "MFP status information" is received from the MFP 10 (S4801). It should be noted that the "MFP status information" is transmitted in S4904 of the output job (described later) shown in FIG. 67 executed by the control unit 11 of the MFP 10.

When the process receives the "MFP status information", the process proceeds to S4802 and initializes the error count. Further, the process transmits the parameters to be set in the recording unit 14 (S4803).

After execution of S4803, the control unit 31 proceeds to S4804 and judges whether the MFP parameters have been normally received by the MFP 10. Specifically, in the output job (FIG. 67) executed by the control unit 11 of the MFP 10, the "MFP reception status" is transmitted. If the MFP 10 has transmitted the "normal reception" in S4909 as the "MFP reception status", the control unit 31 determines that the MFP parameters have been received normally. On the other hand, if the MFP 10 has transmitted the "abnormal reception" in S4908, the control unit 31 determines that the MFP parameters have not been received by the MFP 10 normally.

If it is determined that the MFP parameters have not been normally received by the MFP 10 (S4804: NO), the control unit 31 proceeds to S4805. In S4805, the control unit 31 determines whether the number of times when the MFP parameters have not been normally received by the MFP 10 is two, which is detected based on the value of the error count initialized in S4802.

If the number of times is not two (i.e., one) (S4805: NO), the process proceeds to S4806, and increments the error count by one, and the process returns to S4803. If the number of times is two (S4805: YES), the process proceeds to S4807, and notifies the process that started the current service-side print process (i.e., the regular service providing process) of the termination of the print job. Then, in S4811, the process determines the abnormal completion (S4811: NO), and transmits the abnormal completion as the service status information to the MFP 10 in S4812, and finishes the service-side print job.

If it is determined that the MFP parameters have been received normally (S4804: YES), the process proceeds to S4808 and notifies the process that started the current process (i.e., the regular service providing process) of the print preparation completion. Then, in S4809, the print data generated in S4706 is transmitted to the MFP 10 subsequently.

When S4809 is executed, the control unit 31 pauses in S4810 until the "MFP status information" is received from the MFP 10. When the "MFP status information" is received, the process proceeds to S4811. It should be noted that the "MFP status information" is transmitted in S4913 of the output job (FIG. 67) executed by the control unit 11.

In S4811, the control unit 31 judges whether the print data transmission has completed normally. If it is determined that the transmission has not completed normally (S4811: NO), the process proceeds to S4812. If the transmission has completed normally (S4811: YES), the process proceeds to S4913. In S4812, the abnormal completion is notified to the MFP 10 as the service status information. In S4813, the normal completion is notified to the MFP 10 as the service status information.

Output Job

Figure 67:
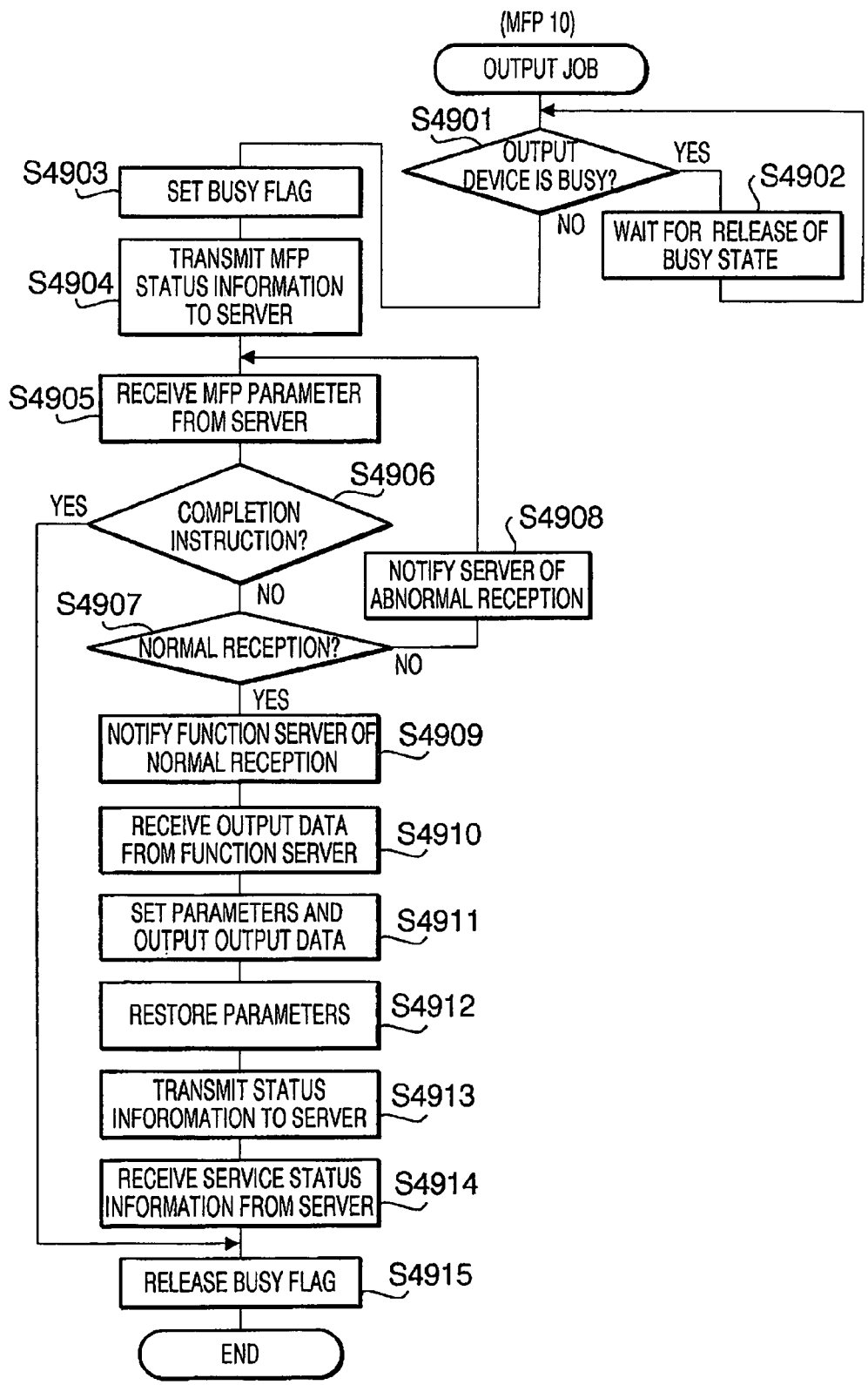
FIG. 67 shows a flowchart illustrating an output job executed by the MFP according to the third embodiment.

Next, an output job which is executed by the control unit 11 of the MFP 10 in S3356 in response to the "print job startup instruction" output in S4703 of the regular service providing process will be described. FIG. 67 shows a flowchart of the output job executed by the control unit 11 of the MFP 10.

When the output job is started, the control unit 11 judges whether output devices (recording unit 14 when the print job startup instruction is received; and sound output unit 18 when the speaker job startup instruction is received) are busy in S4901. Specifically, based on the busy flag Fo indicating whether the output device is busy, the control unit 11 makes a judgment. Specifically, when the busy flag Fo is set, the control unit 11 determines that the output device is busy, while, when the busy flag Fo is released, the control unit 11 determines that the output device is not busy.

If the output device is determined to be busy, the control unit 11 proceeds to S4902 and pauses until the busy state of the output device is released. Thereafter, the control unit 11 returns to S4901. If it is determined that the output device is not busy (S4902: NO), the control unit 11 proceeds to S1903 and sets the busy flag Fo. Then, the control unit 1 transmits the "MFP status information" to the function server 30 (S4904). It should be noted that the "MFP status information" transmitted in S4904 includes the session ID and job ID.

After S4094 is executed, the control unit 11 proceeds to S4905, and receives the MFP parameters that are transmitted from the function server 30 as a response signal to the "MFP status information". It should be noted that the MFP parameters are transmitted in S4803 of the service-side print job executed by the control unit 31 of the function server 30.

After S4095, the control unit 11 judges, in S4906, whether the completion instruction is received from the service reception process, which started the current process. It should be noted that the completion instruction is output in S3310 of the service reception process (FIG. 46) executed by the control unit 11 of the MFP 10. If it is determined that the completion instruction has not been input, the control unit 11 proceeds to S4907, and judges whether the MFP parameters have been received normally in S4905.

If it is determined that the MFP parameters have not been received normally (S4907: NO), the control unit 11 proceeds to S4908. In S4908, the control unit 11 transmits "abnormal reception" as an "MFP reception status" which is an indication whether the MFP 10 have received data from the function server 30 normally. Then, the control unit 11 proceeds to S4905. It should be noted that the "MFP reception status" includes the session ID and job ID.

If it is determined that the MFP parameters have been received normally (S4907: YES), the control unit 11 proceeds to S4909, and transmits "normal reception" as the "MFP reception status" to the function server 30. Next, in S4910, the control unit 11 receives the output data (print data or sound data) from the function server 30. It should be noted that the print data is transmitted from the function server 30 as the control unit 31 executes the service-side pint job process (FIG. 66: S4809).

When S4910 is finished, the control unit 11 proceeds to S4911, and sets the MFP parameters to the output device (recording unit 14 or the sound output unit 18) to output the output data.

For example, if the output job is started in response to the "print job startup instruction" output by the function server 30 in the regular service providing process, the recording unit 14 is used as the output device, and a print process is executed based on the print data supplied from the function server 30.

For example, if the regular service providing process is a process for providing the blog searching service to the MFP 10, and the output job is a process for receiving the blog searching service, the posted articles searched by the blog searching process is printed out using the recording unit 14.

For another example, if the regular service providing process is a process for proving the local news providing service to the MFP 10, and the output job is a process for receiving the local news providing service, the information based on news data generated by a news information generating process may be printed out through the recording unit 14.

When S4911 is executed, the control unit 11 restores the parameters set to the output device in S4911 to the original values (S4912), and transmits the "MFP status information"

to the function server 30 (S4913). After S4913, the control unit 11 proceeds to S4914, and receives the "service status information" from the function server 30. Then, in S4915, the control unit 11 releases the busy flag Fo that was set in S4903, and finishes the output job.

The communication system according to the third embodiment has been described. According to the communication system described above, by executing the HTTP communication between the function server 30 and MFP 10 (as a client device), multiple services (e.g., blog searching service, local news providing service) can be provided from the function server 30 to the MFP 10.

The function server 30 is configured to provide multiple types of services, which can be provided periodically. The MFP 10 is configured to have information regarding timing of inquiry of each service (specifically, each request service ID). As the information representing the inquiry, the MFP 10 includes the inquiry interval information, remaining time information, immediate execution information, which are stored in a regular inquiry management table. Based on the inquiry interval information, remaining time information and immediate execution information, the MFP 10 can judge whether the regular inquiry signal is received for each service provided by the function server 30 in S3904-S3906. When it is determined that the transmission time has come (S3906: YES), in S3908, an integrated inquiry information including the request service IDs which are identification information of the services available is generated, and transmitted to the function server 30 (S3911) via the communication unit 15.

Further, when the MFP 10 receives the response signal to the regular inquiry signal from the function server 30 via the communication unit 15, it judges whether the parameter Service_Start of the request service ID described in the integrated reply information included in the response signal is "TRUE", thereby judging whether the service corresponding to the request service ID is ready on the function server 30 (S4609). If the function server 30 is ready to provide a service, the MFP 10 can execute a necessary service reception process to receive the service from the function server 30.

The function server 30 is configured to receive the regular inquiry signal regarding multiple types of services, which is transmitted from the MFP 10 through the communication unit 32 (S4101). Further, when the function server 30 has received the regular inquiry signal, based on the request service ID included in the received signal, the regular inquiry reply information is generated, and by collecting the regular inquiry reply information, the integral reply information is generated (S4114). Then, the response signal containing the integrated reply information is transmitted to the MFP 10 (S4115), which is the source of the inquiry.

As above, according to the communication system described above, when there are inquiries, the information regarding the inquiries are collected into an integrated inquiry signal and transmitted to the function server 30. Therefore, in comparison with a case where the respective inquiry signals are generated and transmitted, the network traffic can be suppressed, and the inquiry can be made efficiently. Further, replies to inquiries can be integrated into the integrated reply information. Therefore, the reply can also be made efficiently.

Further, according to the third embodiment, in S3904, elapse of a predetermined renewal time is monitored, and in S3905, based on the immediate execution period information, each device for each service, judges whether the inquiry should be made immediately. Further, in S3906, based on the remaining time information stored in the regular inquiry table, each device can judge whether the inquiry time has come.

In S3906, if there is not a service for which the inquiry time has come, the regular inquiry signal is prevented from being transmitted (S3911), and when there are services for which the inquiry time has come, and when the renewal time has passed, the regular inquiry is transmitted (S3911).

Therefore, according to the communication system, the inquiry can be made efficiently using the integrated inquiry information, and further, for the service requiring the immediate inquiry, it is also done.

According to the communication system described above, the request service ID of a subjective service is collectively described based on the values of the parameter, and for the collectively described request service IDs, the parameter values are described in a related manner to form the integrated inquiry information. Therefore, according to the third embodiment, it is not necessary to describe the parameter values by multiple times, which reduces the amount of the data of the inquiry information and can suppress the network traffic.

Further, in the communication system according to the third embodiment, request service IDs having the same values of the parameters Service_Start, Service_URL, Service_Status, Service_Canceled are collectively described and further the values of the parameters are described in relation to the collectively described IDs to generate the integrated reply information. Therefore, according to the third embodiment, the amount of data of the integrated reply information can be suppressed, and the network traffic can be suppressed.

According to the third embodiment, information regarding the services that respond predetermined parameter (Response_Service) is stored in the integrated reply information and the response signal is transmitted. Further, information regarding the service related to a different response is not included in the response signal. Therefore, the data amount of the response signal can be suppressed efficiently, and the network traffic can be suppressed.

According to the third embodiment, the service provided by the function server 30 is received by the MFP 10, which uses the reading unit 13, recording unit 14, sound input unit 17 and sound output unit 18. One or more of such units is used when the service is provided by the function server 30. According to the third embodiment, if an input/output device for executing a service is busy, the request service ID corresponding to the busy device is not included in the integrated inquiry information. Therefore, only the available services are included in the integrated inquiry information with the input/output devices necessary for executing the services. Thus, the regular inquiry can be made very efficiently.

According to the third embodiment, services are executed in parallel as far as the input/output devices are used separately (i.e., one input/output device being used only in one service). If a device is to be used in multiple services, by executing S4607-S4611 until S4606 is "YES", the services are executed serially.

Therefore, via the MFP 10, the services can be provided to the user efficiently.

In the above description, the "speaker job startup instruction" is not described in detail. However, the algorithm for the speaker job and that of the print job are substantially the same, and only by replacing "print" and "print data" with "speaker" and "sound data" in FIGS. 65 and 66, the speaker job startup instruction can be understood.

In the above description, the service of the function server 30 outputting the "input job startup instruction" is not described in detail. The regular service providing process of the function server 30 outputting the input job start up instruction transmits the input job startup instruction to the MFP 10.

Then, the MFP 10 executes an input job using an input device (e.g., reading unit 13 or sound input unit 17). Then, the function server 30 receives data from the MFP 10, which generates the data using the reading unit 13 or sound input unit 17.

The communication system according to the third embodiment can be modified in various ways without departing from the scope of the invention.

For example, in the third embodiment, for the request service IDs having the same parameter values, for a group of the request service IDs, a tag indicating the parameter value is commonly provided to generate the integrated inquiry information and the integrated reply information. This configuration can be modified such as shown in FIGS. 68 and 69. That is, regardless of whether the parameters have the same values, the parameter values may be described for every request service ID.

What is claimed is:

1. A communication system, comprising:
   a server that is configured to provide a plurality of services, each of the services being associated with corresponding URL information for requesting the service; and
   a client device that is configured to have a communication unit configured to receive the services provided by the server via the corresponding URL information,
   wherein the server includes
      a receiving unit configured to receive an inquiry signal concerning the services transmitted from the client device, and
      a replying unit configured to generate reply information concerning a service when the receiving unit receives the inquiry signal and to transmit a response signal including reply information to the client device, based on identifying information included in the inquiry signal, the identifying information for each service including the URL information associated with the service,
   wherein the client device includes:
      a storage unit configured to store
         information indicating scheduled times at which the client device is to transmit an inquiry for each service to be received among the plurality of services provided by the server, and
         immediate inquiry information indicating whether an immediate inquiry is required for each of the services provided by the server;
      a processing unit;
      a memory storing instructions that, when executed by the processing unit, cause the client device to provide:
         a clock unit configured to measure current time;
         a timing judging unit configured to judge whether the current time is a time to transmit the inquiry signal for each of the services by comparing the current time and the information indicating the scheduled times to transmit the inquiry for each of the services;
         an inquiring unit configured to generate the inquiry signal including the identifying information of the service that is judged to be at the appropriate timing for transmitting the inquiry signal, and configured to transmit the inquiry signal to the server; and
         a receiving unit configured to receive the response signal transmitted from the server to the client device in response to the inquiry signal,
      wherein, when there exists only one service judged by the timing judging unit for which the time to transmit the inquiry signal has occurred for the service, the inquiring unit is configured to generate inquiry information including the identifying information of the service judged by the timing judging unit for which the time to transmit the inquiry signal has occurred for the service, and configured to transmit the inquiry signal including the inquiry information to the server,
      wherein, when there exists a plurality of services judged by the timing judging unit for which the time to transmit the inquiry signal has occurred for the services, the inquiring unit is configured to generate converged inquiry information including the identifying information for each of the services judged by the timing judging unit for which the time to transmit the inquiry signal has occurred for the services, and configured to transmit the inquiry signal including the converged inquiry information to the server,
      wherein when the immediate inquiry information of a service indicates that an immediate inquiry is required, the inquiring unit transmits the inquiry signal including the identifying information of the service when it is judged to be at the appropriate timing for transmitting the inquiry signal, and
      wherein, when the immediate inquiry information of a service indicates that an immediate inquiry is not required, the inquiring unit does not transmit the inquiry signal including the identifying information of the service when it is judged to be at the appropriate timing for transmitting the inquiry signal, and transmits the inquiry signal after a predetermined extension period has elapsed.

2. The communication system according to claim 1, wherein the storage unit is configured to store a value for a parameter indicating a content of the inquiry associated with the scheduled time of the service provided by the server, and
wherein the inquiring unit is configured to store the value of the parameter stored in the storage unit associated with the identifying information of the service for which the inquiry signal is transmitted along with the identifying information.

3. The communication system according to claim 2, wherein the inquiring unit is configured to generate the converged inquiry information in which identifying information for each service that it is judged to be time to transmit the inquiry signal is collectively described based on the identifying information each of the services, each of the identifying information including an identical value for the parameter stored in the storage unit, when the timing judging unit judges that it is time to transmit the inquiry signal for the services, wherein an amount of the collectively described identifying information is less than a sum of the identifying information individually described for each of the services that is judged to be time to transmit the inquiry signal.

4. The communication system according to claim 1, wherein the client device including a plurality of input/output units is configured to receive the service from the server by utilizing the communication unit and at least one of the plurality of input/output units,
wherein the inquiring unit is provided with a device operation judging unit, which is configured to judge whether the at least one of the plurality of input/output units is required to be driven to receive the service for each service that the timing judging unit judges to be at the time for transmitting the inquiry signal, and wherein the inquiring unit is configured to selectively include the identifying information of the service wherein the input/output units to receive the service are not busy, and to transmit the inquiry signal to the server when a service exists that is judged to be at the time for transmitting the inquiry signal based on a result from the device operation judging unit, and the input/output units required to be driven to receive the service are not busy.

5. The communication system according to claim 4, wherein the client device is provided with at least two input/output units including at least one image processing device, which is configured to form an image on a recording medium.

6. The communication system according to claim 1, wherein the replying unit is configured to judge whether the server is ready to provide the service responsive to the inquiry signal received from the client device, to generate reply information when the server is judged to be ready, and to include the reply information in the response signal, wherein the instructions executed by the processing unit further cause the client device to provide a readiness judging unit, which is configured to judge, based on the response signal from the replying unit, whether the service indicated in the reply information in the response signal is the service that is ready to be provided by the server, and wherein the instructions executed by the processing unit further cause the client device to receive the service, which is judged to be ready by the readiness judging unit, when the server judges the service is ready to be provided.

7. The communication system according to claim 1, wherein the replying unit is configured to generate converged reply information, which collectively describes the reply information of the services for which it was judged to be time to transmit the inquiry signal when the inquiry signal received by the receiving unit of the server includes identifying information for each of the services for which it was judged to be time to transmit the inquiry signal as the identifying information, and to transmit the response signal including the converged reply information to the client device that transmitted the inquiry signal.

8. The communication system according to claim 7, wherein the converged reply information includes reply information for each of the services for which it was judged to be time to transmit the inquiry signal, the converged reply information being associated with identifying information for each of the services for which it was judged to be time to transmit the inquiry signal corresponding to the reply information.

9. The communication system according to claim 7, wherein the replying unit is configured to generate the converged reply information in which identifying information for each service that it was judged to be time to transmit the inquiry signal is collectively described based on the identifying information of each of the services, each of the identifying information including identical reply information, when identifying information for each of the services is included as the identifying information in the inquiry signal received by the receiving unit of the server.

10. The communication system according to claim 7, wherein the replying unit is configured to judge whether the server is ready to provide the service for each service that it is judged to be time to transmit the inquiry signal, to generate reply information when the server is determined to be ready, and to include the reply information in the response signal, wherein the instructions executed by the processing unit further cause the client device to provide a readiness judging unit, which is configured to judge, based on the response signal from the replying unit, whether the service indicated in the response signal is the service that is ready to be provided by the server, and wherein the instructions executed by the processing unit further cause the client device to receive the service, which is judged to be ready by the readiness judging unit, when the server judges the service is ready to be provided.

11. The communication system according to claim 10, wherein the instructions executed by the processing unit further cause the client device in parallel to receive each service, which is determined to be ready to be provided by the server, when the reply signal received by the receiving unit of the client device includes reply information and the readiness judging unit determines that the service is ready to be provided by the server.

12. The communication system according to claim 10, wherein the client device including a plurality of types of input/output units excluding the communication unit is configured to receive the service from the server by utilizing the communication unit and at least one of the plurality of types of input/output units, and wherein the response signal received by the client device includes reply information, and services exist that are judged to be ready to be provided by the readiness judging unit, then the instructions executed by the processing unit further cause the client device to receive in parallel each of the services, which utilizes an input/output unit that is required by one service, and to receive sequentially each of the services, which utilizes an input/output unit that is required by more than one service.

13. The communication system according to claim 12, wherein the client device is provided with at least two input/output units including at least one image processing device, which is configured to form an image on a recording medium.

14. The communication system according to claim 7, wherein the replying unit is configured to generate the response signal, which includes only reply information that is a predetermined reply concerning the services being stored and transmitted to the client device.

15. A communication device comprising:
a storage unit configured to store
information indicating scheduled times at which the communication device is to transmit an inquiry for each service to be received among a plurality of services provided by a server, each of the services being associated with corresponding URL information for requesting the service, and
immediate inquiry information indicating whether an immediate inquiry is required for each of the services provided by the server;
a processing unit;
a memory storing instructions that, when executed by the processing unit, cause the communication device to provide:
a clock unit configured to measure current time;
a timing judging unit configured to judge whether the current time is a time to transmit the inquiry signal for each of the services by comparing the current time and the information indicating the scheduled times to transmit the inquiry for each of the services;

an inquiring unit configured to generate the inquiry signal including identifying information of the service that is judged to be at the time for transmitting the inquiry signal, and configured to transmit the inquiry signal to the server; and a receiving unit configured to receive a response signal transmitted from the server in response to the inquiry signal, and wherein, when there exists only one service judged by the timing judging unit for which the time to transmit the inquiry signal has occurred for the service, the inquiring unit is configured to generate inquiry information including the identifying information of the service judged by the timing judging unit that the time to transmit the inquiry signal has occurred for the service, and configured to transmit the inquiry signal including the inquiry information to the server, wherein, when there exists a plurality of services judged by the timing judging unit for which the time to transmit the inquiry signal has occurred for the services, the inquiring unit is configured to generate converged inquiry information including the identifying information for each of the services judged by the timing judging unit for which the time to transmit the inquiry signal has occurred for the services, and configured to transmit the inquiry signal including the converged inquiry information to the server, wherein when the immediate inquiry information of a service indicates that an immediate inquiry is required, the inquiring unit transmits the inquiry signal including the identifying information of the service when it is judged to be at the appropriate timing for transmitting the inquiry signal, and wherein, when the immediate inquiry information of a service indicates that an immediate inquiry is not required, the inquiring unit does not transmit the inquiry signal including the identifying information of the service when it is judged to be at the appropriate timing for transmitting the inquiry signal, and transmits the inquiry signal after a predetermined extension period has elapsed.

16. A non-transitory computer readable storage medium comprising computer readable instructions that cause a computer system to function as a communication system, wherein the communication system includes:

a storage unit configured to store
information indicating scheduled times at which the communication device is to transmit an inquiry for each service to be received among a plurality of services provided by a server, each of the services being associated with corresponding URL information for requesting the service, and immediate inquiry information indicating whether an immediate inquiry is required for each of the services provided by the server;

a clock unit configured to measure current time;

a timing judging unit configured to judge whether the current time is a time to transmit the inquiry signal for each of the services by comparing the current time and the information indicating the scheduled times to transmit the inquiry for each of the services;

an inquiring unit configured to generate the inquiry signal including identifying information of the service that is judged to be at the time for transmitting the inquiry signal, and configured to transmit the inquiry signal to the server; and a receiving unit configured to receive a response signal transmitted from the server in response to the inquiry signal, and wherein, when there exists only one service judged by the timing judging unit for which the time to transmit the inquiry signal has occurred for the service, the inquiring unit is configured to generate inquiry information including the identifying information of the service judged by the timing judging unit for which the time to transmit the inquiry signal has occurred for the service, and configured to transmit the inquiry signal including the inquiry information to the server, wherein, when there exists a plurality of services judged by the timing judging unit for which the time to transmit the inquiry signal has occurred for the services, the inquiring unit is configured to generate converged inquiry information including the identifying information for each of the services judged by the timing judging unit for which the time to transmit the inquiry signal has occurred for the services, and configured to transmit the inquiry signal including the converged inquiry information to the server, and wherein when the immediate inquiry information of a service indicates that an immediate inquiry is required, the inquiring unit transmits the inquiry signal including the identifying information of the service when it is judged to be at the appropriate timing for transmitting the inquiry signal, and wherein, when the immediate inquiry information of a service indicates that an immediate inquiry is not required, the inquiring unit does not transmit the inquiry signal including the identifying information of the service when it is judged to be at the appropriate timing for transmitting the inquiry signal, and transmits the inquiry signal after a predetermined extension period has elapsed.

* * * * *